United States Patent
Nakatani et al.

(10) Patent No.: US 7,725,082 B2
(45) Date of Patent: May 25, 2010

(54) RADIO COMMUNICATION APPARATUS, RADIO COMMUNICATION METHOD, ANTENNA APPARATUS AND FIRST DUPLEXER

(75) Inventors: Toshifumi Nakatani, Osaka (JP); Atsushi Yamamoto, Osaka (JP); Hisashi Adachi, Osaka (JP)

(73) Assignee: Panasonic Corp., Osaka (JP)

( * ) Notice: Subject to any disclaimer, the term of this patent is extended or adjusted under 35 U.S.C. 154(b) by 552 days.

(21) Appl. No.: 11/766,389

(22) Filed: Jun. 21, 2007

(65) Prior Publication Data

US 2007/0243833 A1    Oct. 18, 2007

Related U.S. Application Data

(62) Division of application No. 10/738,421, filed on Dec. 17, 2003, now Pat. No. 7,245,883.

(30) Foreign Application Priority Data

Dec. 18, 2002    (JP)    .............................. 2002-366623

(51) Int. Cl.
*H04B 1/44*    (2006.01)
*H04B 1/46*    (2006.01)

(52) U.S. Cl. ............................ 455/78; 455/83; 370/282

(58) Field of Classification Search ................... 455/73, 455/78, 82, 83; 370/278, 282; 333/25, 32, 333/132

See application file for complete search history.

(56) References Cited

U.S. PATENT DOCUMENTS

| | | | |
|---|---|---|---|
| 5,815,803 A | 9/1998 | Ho et al. | |
| 5,910,756 A | 6/1999 | Ella | |
| 6,085,071 A | 7/2000 | Yamada et al. | |
| 6,308,051 B1 | 10/2001 | Atokawa | |
| 6,507,728 B1 * | 1/2003 | Watanabe et al. | ............. 455/78 |
| 6,567,648 B1 * | 5/2003 | Ahn et al. | ..................... 455/83 |
| 6,721,544 B1 | 4/2004 | Franca-Neto | |
| 6,891,450 B2 | 5/2005 | Nakamura et al. | |
| 7,038,557 B2 * | 5/2006 | Nakamura et al. | .......... 333/132 |
| 7,123,591 B1 | 10/2006 | Ostertag et al. | |
| 7,151,918 B2 * | 12/2006 | Ikuma | ........................ 455/308 |
| 7,633,435 B2 * | 12/2009 | Meharry et al. | ............. 342/198 |

(Continued)

FOREIGN PATENT DOCUMENTS

EP    0 987 825    3/2000

(Continued)

*Primary Examiner*—Sonny Trinh
(74) *Attorney, Agent, or Firm*—RatnerPrestia

(57) ABSTRACT

Radio communication apparatus comprising an antenna, a transmitting circuit of outputting a transmitting signal in a first frequency band. A duplexer connected to the antenna and having a single-phase input terminal and a balanced output terminal, conveying the transmitting signal inputted to the single-phase input terminal to the antenna. The duplexer outputs a receiving signal in a second frequency band different from the first frequency band received from the antenna substantially as a differential signal from the balanced output terminal. A receiving circuit connected to the balanced output terminal and having a circuit in which a gain of a signal of a differential component is higher than that of a signal of an in-phase component, or a loss of the signal of the differential component is lower than that of the signal of the in-phase component.

14 Claims, 35 Drawing Sheets

U.S. PATENT DOCUMENTS

| | | |
|---|---|---|
| 2001/0022544 A1 | 9/2001 | Endoh et al. |
| 2002/0101296 A1 | 8/2002 | Uriu et al. |
| 2002/0171508 A1 | 11/2002 | Harada et al. |
| 2002/0186757 A1 | 12/2002 | Nakamura et al. |
| 2003/0054791 A1 | 3/2003 | Sayers |
| 2003/0060170 A1 | 3/2003 | Tikka et al. |
| 2003/0112768 A1 | 6/2003 | Frank |
| 2004/0032706 A1 | 2/2004 | Kemmochi et al. |
| 2004/0056819 A1 | 3/2004 | McCarthy et al. |

FOREIGN PATENT DOCUMENTS

| | | |
|---|---|---|
| JP | 9-98046 A | 4/1997 |
| JP | 9-232909 A | 9/1997 |
| JP | 10-322105 A | 12/1998 |
| JP | 11-274968 | 10/1999 |
| JP | 2000-138552 A | 5/2000 |
| JP | 2000-261279 A | 9/2000 |
| JP | 2000-286746 | 10/2000 |
| JP | 2001-313542 A | 11/2001 |
| JP | 2002-43892 A | 2/2002 |
| JP | 2002/037709 A1 | 5/2002 |
| JP | 2002-344347 A | 11/2002 |
| JP | 2003-209487 A | 7/2003 |

* cited by examiner freq(100.0MHz to 10.00GHz)

freq, Hz

RADIO COMMUNICATION APPARATUS, RADIO COMMUNICATION METHOD, ANTENNA APPARATUS AND FIRST DUPLEXER

This application is a divisional of U.S. patent application Ser. No. 10/738,421, filed Dec. 17, 2003, which is incorporated herein by reference.

BACKGROUND OF THE INVENTION

1. Field of the Invention

The present invention relates to a field of simultaneous transmission and reception of a signal in a communication system having a transmitter and a receiver such as a portable telephone. In particular, the invention relates to a radio communication apparatus in the communication system using a modulation method having an envelope component such as a CDMA method.

2. Related Art of the Invention

In recent years, a cellular radio communication systems have been rapidly increasing due to the pressing needs for mobile communication and development of communication technology.

An example of a radio communication apparatus used in the cellular radio communication system is shown in a block diagram in FIG. 31. In this drawing, reference numeral 1801 denotes an antenna, 1802 denotes a duplexer (antenna sharing apparatus), 1803 denotes a receiving circuit, and 1804 denotes a transmitting circuit.

In the radio communication apparatus shown in FIG. 31, a radio frequency signal transmitted from a base station is received by the antenna 1801 and is then inputted via the duplexer 1802 to the receiving circuit 1803. In receiving circuit 1803 the signal is high-frequency-amplified unnecessary waves outside a receiving band are eliminated and the signal is then converted into an intermediate-frequency signal. The intermediate-frequency signal is demodulated and converted into a base band signal. Predetermined signal processing is performed to a transmitting base band signal which is then inputted to a transmitting circuit 1804. A carrier wave signal is modulated so that the modulated carrier wave signal is converted into a radio frequency and amplified to a predetermined sending power to be sent via the duplexer 1802 from the antenna 1801 to the base station.

The receiving circuit 1803 uses a low-noise amplifier as a high-frequency amplifier. In the case where the transmitting signal leak is not completely attenuated by the duplexer it is inputted to the low-noise amplifier. The following three factors cause deterioration of reception.

Firstly, it is because of deterioration of a noise characteristic of the low-noise amplifier itself due to the transmitting signal leak of a large amount of power. FIG. 32 shows an example of a relationship between a transmitting signal leak level and a noise figure. It is caused because current noise increases due to increase in currents of the low-noise amplifier caused by a transmitting signal leak, or high-frequency thermal noise is down-converted in the receiving band or inversely low-frequency thermal noise is up-converted in the receiving band due to the transmitting signal leak.

Secondly, it is because of gain compression of the low-noise amplifier due to the transmitting signal leak of the large amount of power. FIG. 33 shows a relationship between the transmitting signal leak level and the gain. Normally, the noise figure of the circuit in the subsequent stage to the low-noise amplifier is lower than the noise figure of the low-noise amplifier by 5 to 10 dB. If the gain of the low-noise amplifier is sufficiently high, it is possible to reduce influence of the noise characteristic of the circuit in the subsequent stage. If the gain of the low-noise amplifier is reduced by the transmitting signal leak, however, the influence of the noise characteristic of the circuit in the subsequent stage becomes significant so that the reception is consequently deteriorated.

Thirdly, it is because of intermodulation due to the transmitting signal leak of the large amount of power. In the case of a portable telephone or the like adopting a CDMA method, its own transmitting wave has an amplitude variable component as shown in FIG. 34 for instance. For this reason, if there is a narrow-band jammer of an analog cellular system using a near band of a CDMA cellular system in the proximity of a wave desired to be received for instance, the amplitude variable component of the transmitting signal leak causes the intermodulation due to third order distortion of the low-noise amplifier. And as shown in FIG. 35, it moves to the jammer, and a part of it is added to the receiving band as interference.

The CDMA cellular system adopts so-called open-loop sending power control of increasing transmitting signal power when the radio communication apparatus is distant from the base station and a receiving signal level is low. In the case where the radio communication apparatus exists in a fringe area of a cell for instance, reception performance deteriorates at an accelerated pace due to the interference by the intermodulation action. In the worst case, there is a possibility that a call may be interrupted.

To avoid these problems, it is necessary to set an input 1 dB gain compression point (P1dB) of the low-noise amplifier provided on a receiving high-frequency unit at −5 to −3 dBm or so, and set an input third order intercept point (IIP3) thereof at +5 to 7 dBm or so. To realize this, however, it is necessary to increase current consumption to over 10 to over 20 mA. And there is a problem that, if done so, standby time of the CDMA radio communication apparatus is significantly reduced, which is not desirable.

"Radio Transceiver and its Receiving High-Frequency Unit and Control Unit" (refer to Japanese Patent Laid-Open No. 11-274968) and "Mobile Communication Apparatus" (refer to Japanese Patent Laid-Open No. 2000-286746) are known as past examples of the radio communication apparatus of improving the reduction of the standby time caused by deteriorated reception due to its own transmitting signal leak not completely attenuated by the duplexer. Either method comprises a mode of increasing the current consumption and implementing low distortion and a mode of implementing low current consumption, and the modes are switched such as the low distortion mode on simultaneous transmission and reception and the low current consumption mode during non-transmission time so as to improve standby time performance. As for the method of implementing the mode switching, Japanese Patent Laid-Open No. 11-274968 describes use of the method of switching two types of low-noise amplifiers with a high-frequency switch, and Japanese Patent Laid-Open No. 2000-286746 describes use of the method of switching the currents running in the low-noise amplifier.

A down mixer is used for the receiving circuit 1803 for the sake of frequency conversion. As for this down mixer, the reception deteriorates due to the transmitting signal leak as with the low-noise amplifier. If the low-noise amplifier is directly connected to the down mixer, the transmitting signal leak amplified by the low-noise amplifier is inputted to the down mixer so that the reception further deteriorates. If the current of the down mixer is increased in order to improve it, the current consumption more than that of the low-noise amplifier is required. For that reason, an inter-stage filter is normally used between the low-noise amplifier and the down mixer so as to reduce the transmitting signal leak inputted to the down mixer. The disclosures of the above-mentioned documents are incorporated herein by references in their entireties.

SUMMARY OF THE INVENTION

As for the above described radio communication apparatus in the past, however, it is necessary to finish switching to a low distortion mode before a transmitting circuit operates on simultaneous transmission and reception and maintain the low distortion mode until finishing the simultaneous transmission and reception. For that reason, standby time performance is little improved in the case of frequently switching transmission on and off. Current consumption of a control circuit for switching the modes also increases.

In addition, a radio portion becomes larger because an inter-stage filter is required between the low-noise amplifier and the down mixer.

In addition, in the case where the radio communication apparatus is near the base station, a receiving signal level becomes high and transmitting signal power becomes low. In this case, a noise characteristic of a transmitting signal deteriorates when a receiving signal inputted from an antenna 1801 is leaked to a transmitting circuit 1804 on a duplexer 1802 in the radio communication apparatus shown in FIG. 31.

In consideration of the above problems, an object of the present invention is to provide the radio communication apparatus and radio communication method capable of reducing deterioration of reception on simultaneous transmission and reception without reducing standby time.

Another object is to provide an antenna apparatus capable of outputting a differential signal for that purpose.

A further object of the present invention is to provide the radio communication apparatus and radio communication method capable of reducing the deterioration of the transmitting signal on simultaneous transmission and reception.

The $1^{st}$ aspect of the present invention is a radio communication apparatus comprising:

a first antenna;

a first transmitting apparatus of outputting a transmitting signal in a first frequency band;

a first duplexer, connected to said first antenna and having a single-phase input terminal and a balanced output terminal, of conveying said transmitting signal inputted to said single-phase input terminal to said first antenna and outputting a receiving signal in a second frequency band different from said first frequency band received from said first antenna substantially as a differential signal from said balanced output terminal; and a first receiving apparatus connected to said balanced output terminal and having a circuit in which a gain of a signal of a differential component is higher than that of a signal of an in-phase component, or a loss of the signal of the differential component is lower than that of the signal of the in-phase component.

The $2^{nd}$ aspect of the present invention is the radio communication apparatus according to the $1^{st}$ aspect of the present invention, wherein said first duplexer has a first phase shifter, a second phase shifter, a third phase shifter, a fourth phase shifter, a fifth phase shifter and a sixth phase shifter;

said first antenna is connected to said first phase shifter and said second phase shifter;

said first receiving apparatus is connected to said first phase shifter and said second phase shifter via said third phase shifter and said fourth phase shifter respectively;

said first transmitting apparatus is connected to said first phase shifter and said second phase shifter via said fifth phase shifter and said sixth phase shifter respectively;

said third phase shifter and said fourth phase shifter are connected to said fifth phase shifter and said sixth phase shifter respectively;

a difference in a phase shifting amount between said first phase shifter and said second phase shifter is substantially 90 degrees;

the difference in the phase shifting amount between said third phase shifter and said fourth phase shifter is substantially 90 degrees; and the difference in the phase shifting amount between said fifth phase shifter and said sixth phase shifter is substantially −90 degrees.

The $3^{rd}$ aspect of the present invention is a first duplexer comprising a single-phase input terminal connected to a first transmitting apparatus and a balanced output terminal connected to a first receiving apparatus, wherein:

said first transmitting apparatus outputs a transmitting signal in a first frequency band, conveys said transmitting signal inputted to said single-phase input terminal to said first antenna and outputs a receiving signal in a second frequency band different from said first frequency band received from said first antenna substantially as a differential signal to said balanced output terminal; and said first receiving apparatus has a circuit in which a gain of a signal of a differential component is higher than that of a signal of an in-phase component, or a loss of the signal of the differential component is lower than that of the signal of the in-phase component.

The $4^{th}$ aspect of the present invention is an antenna apparatus comprising:

a second antenna having a first feeding point of feeding a receiving signal and also having two or more polarized waves; and a third antenna placed along with said second antenna and having a second feeding point of feeding the receiving signal and also having two or more polarized waves, wherein:

said first feeding point is placed substantially on an exciting direction side of the receiving signal of said second antenna; and said second feeding point is placed substantially on an opposite side to the exciting direction of the receiving signal of said third antenna.

The $5^{th}$ aspect of the present invention is the antenna apparatus according to the $4^{th}$ aspect of the present invention, wherein said second antenna has a third feeding point of feeding a transmitting signal;

said third antenna has a fourth feeding point of feeding a transmitting signal;

said third feeding point is placed substantially on an opposite side to the exciting direction of the transmitting signal of said second antenna; and said fourth feeding point is placed substantially on the opposite side to the exciting direction of the transmitting signal of said third antenna.

The $6^{th}$ aspect of the present invention is a radio communication apparatus comprising:

a second transmitting apparatus of outputting a transmitting signal;

the antenna apparatus according to the $5^{th}$ aspect of the present invention;

a second duplexer, connected to said second antenna and said third antenna and having a single-phase input terminal and a balanced output terminal, of conveying said transmitting signal inputted to said single-phase input terminal to said second antenna and said third antenna and outputting a receiving signal received by said second antenna and said third antenna from said balanced output terminal; and a first receiving apparatus connected to said balanced output terminal and having a circuit in which a gain of a signal of a differential component is higher than that of a signal of an in-phase component, or a loss of the signal of the differential component is lower than that of the signal of the in-phase component.

The 7$^{th}$ aspect of the present invention is a radio communication apparatus comprising:

a first antenna;

a third transmitting apparatus of outputting a transmitting signal as a differential signal;

a third duplexer, connected to said first antenna and having a balanced input terminal and a single-phase output terminal, of conveying said transmitting signal inputted to said balanced input terminal as a single-phase signal to said first antenna and outputting a single-phase receiving signal received by said first antenna to said single-phase output terminal; and a second receiving apparatus connected to said single-phase output terminal.

The 8$^{th}$ aspect of the present invention is the radio communication apparatus according to the 7$^{th}$ aspect of the present invention, wherein said third duplexer has a seventh phase shifter, an eighth phase shifter, a ninth phase shifter, a tenth phase shifter, an eleventh phase shifter and a twelfth phase shifter;

said first antenna is connected to said seventh phase shifter and said eighth phase shifter;

said second receiving apparatus is connected to said seventh phase shifter and said eighth phase shifter via said ninth phase shifter and said tenth phase shifter respectively;

said third transmitting apparatus is connected to said seventh phase shifter and said eighth phase shifter via said eleventh phase shifter and said twelfth phase shifter respectively;

said ninth phase shifter and said tenth phase shifter are connected to said eleventh phase shifter and said twelfth phase shifter respectively;

a difference in a phase shifting amount between said seventh phase shifter and said eighth phase shifter is substantially −90 degrees;

the difference in the phase shifting amount between said ninth phase shifter and said tenth phase shifter is substantially 90 degrees;

the difference in the phase shifting amount between said eleventh phase shifter and said twelfth phase shifter is substantially −90 degrees.

The 9$^{th}$ aspect of the present invention is a radio communication apparatus comprising:

fourth and fifth antennas;

a third transmitting apparatus of outputting a transmitting signal as a differential signal;

a fourth duplexer, connected to said fourth antenna and said fifth antenna and having a balanced input terminal and a single-phase output terminal, of conveying said transmitting signal inputted to said balanced input terminal to said fourth antenna and said fifth antenna and outputting a receiving signal received by said fourth antenna and said fifth antenna as a single-phase signal to said single-phase output terminal; and a second receiving apparatus connected to said single-phase output terminal, and wherein said fourth and fifth antennas are formed and placed to radiate said transmitting signal substantially as the differential signal and convey said receiving signal substantially as an in-phase signal to said fourth duplexer.

The 10$^{th}$ aspect of the present invention is the radio communication apparatus according to the 9$^{th}$ aspect of the present invention, wherein said fourth and fifth antennas are formed and placed to convey said receiving signal as the differential signal to said third duplexer instead of being formed and placed to convey said receiving signal as an in-phase signal to said fourth duplexer; and said fourth duplexer converts said receiving signal inputted as the differential signal into the in-phase signal and outputs it as the single-phase signal to said single-phase output terminal.

The 11$^{th}$ aspect of the present invention is a radio communication apparatus comprising:

sixth and seventh antennas;

a third transmitting apparatus of outputting a transmitting signal as a differential signal;

a fifth duplexer, connected to said sixth antenna and said seventh antenna and having a balanced input terminal and a balanced output terminal, of conveying said transmitting signal inputted to said balanced input terminal to said sixth antenna and said seventh antenna and outputting a receiving signal received by said sixth antenna and said seventh antenna as the differential signal to said balanced output terminal, and outputting a part of said transmitting signal substantially as an in-phase signal to said balanced output terminal; and a first receiving apparatus connected to said balanced output terminal and having a circuit in which a gain of a signal of a differential component is higher than that of a signal of an in-phase component, or a loss of the signal of the differential component is lower than that of the signal of the in-phase component.

The 12$^{th}$ aspect of the present invention is the radio communication apparatus according to the 11$^{th}$ aspect of the present invention, wherein said fifth duplexer has a thirteenth phase shifter, a fourteenth phase shifter, a fifteenth phase shifter, a sixteenth phase shifter, a seventeenth phase shifter and an eighteenth phase shifter;

said sixth antenna and said seventh antenna are connected to said thirteenth phase shifter and said fourteenth phase shifter respectively;

said first receiving apparatus is connected to said thirteenth phase shifter and said fourteenth phase shifter via said fifteenth phase shifter and said sixteenth phase shifter respectively;

said third transmitting apparatus is connected to said thirteenth phase shifter and said fourteenth phase shifter via said seventeenth phase shifter and said eighteenth phase shifter respectively;

said fifteenth phase shifter and said sixteenth phase shifter are connected to said seventeenth phase shifter and said eighteenth phase shifter respectively;

a difference in a phase shifting amount between said thirteenth phase shifter and said fourteenth phase shifter is substantially −90 degrees;

the difference in the phase shifting amount between said fifteenth phase shifter and said sixteenth phase shifter is substantially 90 degrees; and the difference in the phase shifting amount between said seventeenth phase shifter and said eighteenth phase shifter is substantially 90 degrees.

The 13$^{th}$ aspect of the present invention is the radio communication apparatus according to any one of the 1$^{st}$, the 6$^{th}$, the 11$^{th}$ and the 12$^{th}$ aspects of the present invention, wherein said first receiving apparatus has an amplifier in which the gain of the signal of the differential component is higher than that of the signal of the in-phase component.

The 14$^{th}$ aspect of the present invention is the radio communication apparatus according to any one of the 1$^{st}$, the 6$^{th}$, the 11$^{th}$ and the 12$^{th}$ aspects of the present invention, wherein said first receiving apparatus has a filter in which the loss of the differential signal is lower than that of the signal of the in-phase component.

The 15$^{th}$ aspect of the present invention is the radio communication apparatus according to the 13$^{th}$ aspect of the present invention, wherein said first receiving apparatus has a down mixer of down-converting said receiving signal being connected to a subsequent stage to said amplifier; and said down mixer has the gain of the differential signal higher than that of the signal of the in-phase component or the loss of the differential signal lower than that of the signal of the in-phase component.

The 16$^{th}$ aspect of the present invention is the radio communication apparatus according to the 15$^{th}$ aspect of the present invention, having:

a first transistor of having one of the receiving signals as said differential signals inputted to a base side thereof; and a second transistor of having the other of the receiving signals as said differential signals inputted to the base side thereof, and wherein:

an emitter side of said first transistor is connected to an emitter side of said second transistor; and a connection point thereof is connected to a ground via a first inductor having a predetermined inductance.

The 17$^{th}$ aspect of the present invention is a radio communication apparatus comprising:

a second transmitting apparatus of outputting a transmitting signal;

an antenna apparatus;

a sixth duplexer, connected to said antenna apparatus and having a single-phase input terminal and a balanced output terminal, of conveying said transmitting signal inputted to said single-phase input terminal to said antenna apparatus and outputting a receiving signal received by said antenna apparatus from said balanced output terminal; and wherein:

said sixth duplexer has an impedance for a differential signal in a frequency band of said receiving signal higher than the impedance for a single-phase signal in the frequency band of said transmitting signal.

The 18$^{th}$ aspect of the present invention is the radio communication apparatus according to the 17$^{th}$ aspect of the present invention, wherein said sixth duplexer does not substantially pass the differential signal in the frequency band of said receiving signal but passes the single-phase signal in the frequency band of said transmitting signal substantially without a loss.

The 19$^{th}$ aspect of the present invention is the radio communication apparatus according to the 18$^{th}$ aspect of the present invention, wherein said sixth duplexer has two ¼ wavelength lines having length of substantially ¼ of the wavelength of the frequency band of said receiving signal, and said single-phase signal is conveyed to one side of each of said ¼ wavelength lines and said antenna apparatus is connected to the other side of each of said ¼ wavelength lines.

The 20$^{th}$ aspect of the present invention is the radio communication apparatus according to the 17$^{th}$ aspect of the present invention, wherein said sixth duplexer has a parallel resonance circuit to which said single-phase signal is conveyed at a middle point of the impedance thereof, and said parallel resonance circuit resonates in the frequency band of said receiving signal.

The 21$^{st}$ aspect of the present invention is a radio communication method comprising the steps of:

conveying to a first antenna a transmitting signal in a first frequency band inputted to a single-phase input terminal of a first duplexer;

outputting a receiving signal in a second frequency band different from said first frequency band received from said first antenna substantially as a differential signal from a balanced output terminal of said first duplexer; and as to said receiving signal substantially outputted as the differential signal, rendering a gain of a signal of a differential component higher than that of a signal of an in-phase component, or rendering a loss of the signal of the differential component lower than that of the signal of the in-phase component.

According to the present invention, it is possible to provide the radio communication apparatus and radio communication method in which the deterioration of the reception on simultaneous transmission and reception is reduced.

According to the present invention, it is also possible to provide the antenna apparatus capable of outputting the receiving signal as the differential signal.

According to the present invention, it is also possible to provide the radio communication apparatus and radio communication method in which the deterioration of the transmitting signal on simultaneous transmission and reception is reduced.

DESCRIPTION OF SYMBOLS

Figure 1:
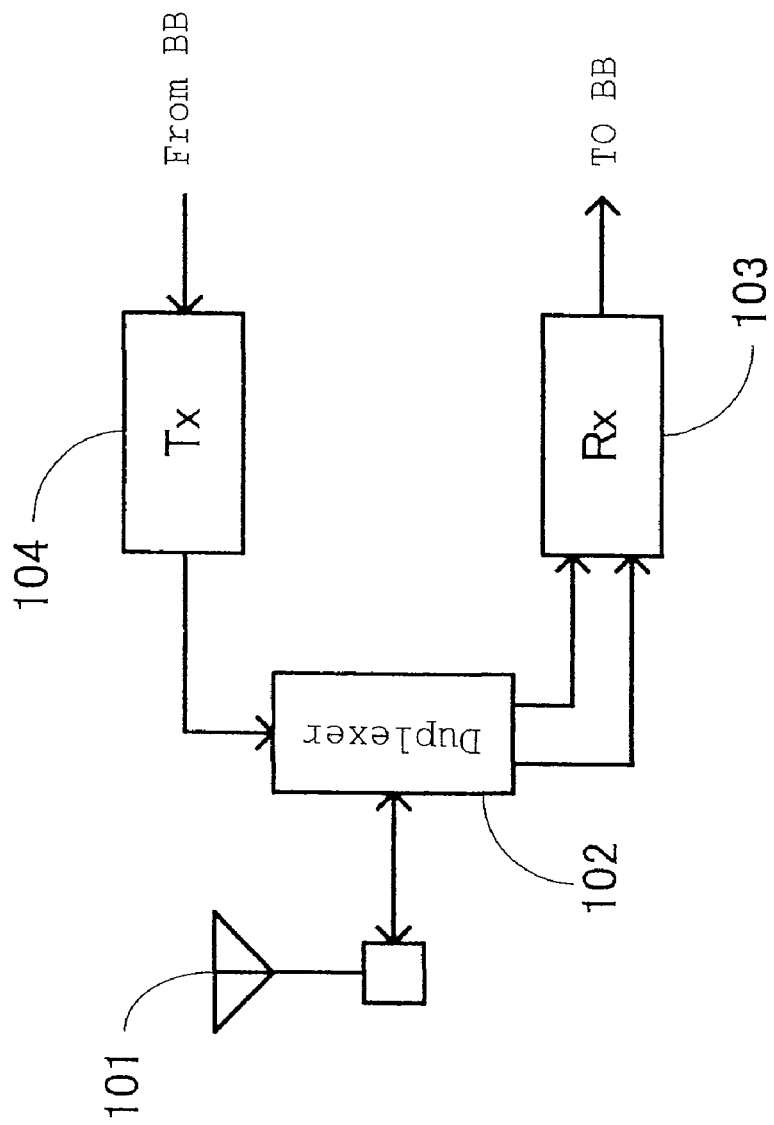
FIG. 1 is a diagram showing a configuration of a radio communication apparatus according to a first embodiment of the present invention.

101, 1101+, 1101−, 1401+, 1401−, 1601+, 1601−, 1701+, 1701− Antennas
102, 902, 1102, 1402, 1602, 1702 Duplexers
103, 1603 Receiving circuits
104, 1604 Transmitting circuits
905 Phase shifter

PREFERRED EMBODIMENTS OF THE INVENTION

Hereafter, embodiments of the present invention will be described by referring to the drawings.

First Embodiment

FIG. 1 is a circuit diagram of a radio communication apparatus related to a first embodiment of the present invention. In this diagram, reference numeral 101 denotes a single-phase input-output antenna corresponding to an antenna of the present invention as an example, 102 denotes a duplexer (antenna sharing apparatus) of which transmission input terminal is a single-phase input type, antenna input-output terminal is a single-phase input-output type, and receiving output terminal is a balanced output type as an example of a duplexer of the present invention, 103 denotes a receiving circuit of differential input as an example of a receiving apparatus of the present invention connected to the balanced output terminal and having a circuit in which a gain of a signal of a differential component is higher than that of a signal of an in-phase component, or a loss of the signal of the differential component is lower than that of the signal of the in-phase component, and 104 denotes a single-phase output transmitting circuit as an example of a transmitting apparatus of the present invention of outputting a transmitting signal in a first frequency band. The duplexer 102 outputs a signal in a frequency band (corresponding to a second frequency band of the present invention) of the receiving signal inputted from an antenna input-output terminal as a differential signal to the receiving output terminal, and outputs a part of the signal in the frequency band (corresponding to a first frequency band of the present invention) of a transmitting signal inputted from the transmission input terminal (transmitting signal leak) as an in-phase signal from the receiving output terminal.

As for the radio communication apparatus shown in FIG. 1, a radio frequency signal transmitted from the base station is received by the antenna 101 and is then inputted to the receiving circuit 103 via the duplexer 102 as with the conventional examples, where it is high-frequency-amplified and has unnecessary waves outside a receiving band eliminated and is then converted into an intermediate-frequency signal so that the received intermediate-frequency signal is demodulated and converted into a base band signal. In addition, predetermined signal processing is performed to a transmitting base band signal and then it is inputted to the transmitting circuit 104, where a carrier wave signal is modulated. The modulated carrier wave signal is converted into a radio frequency and amplified to predetermined sending power to be sent from the antenna 101 to the base station via the duplexer 102. A part of the transmitting signal inputted to the duplexer 102 leaks to the receiving circuit 103.

Figure 2:
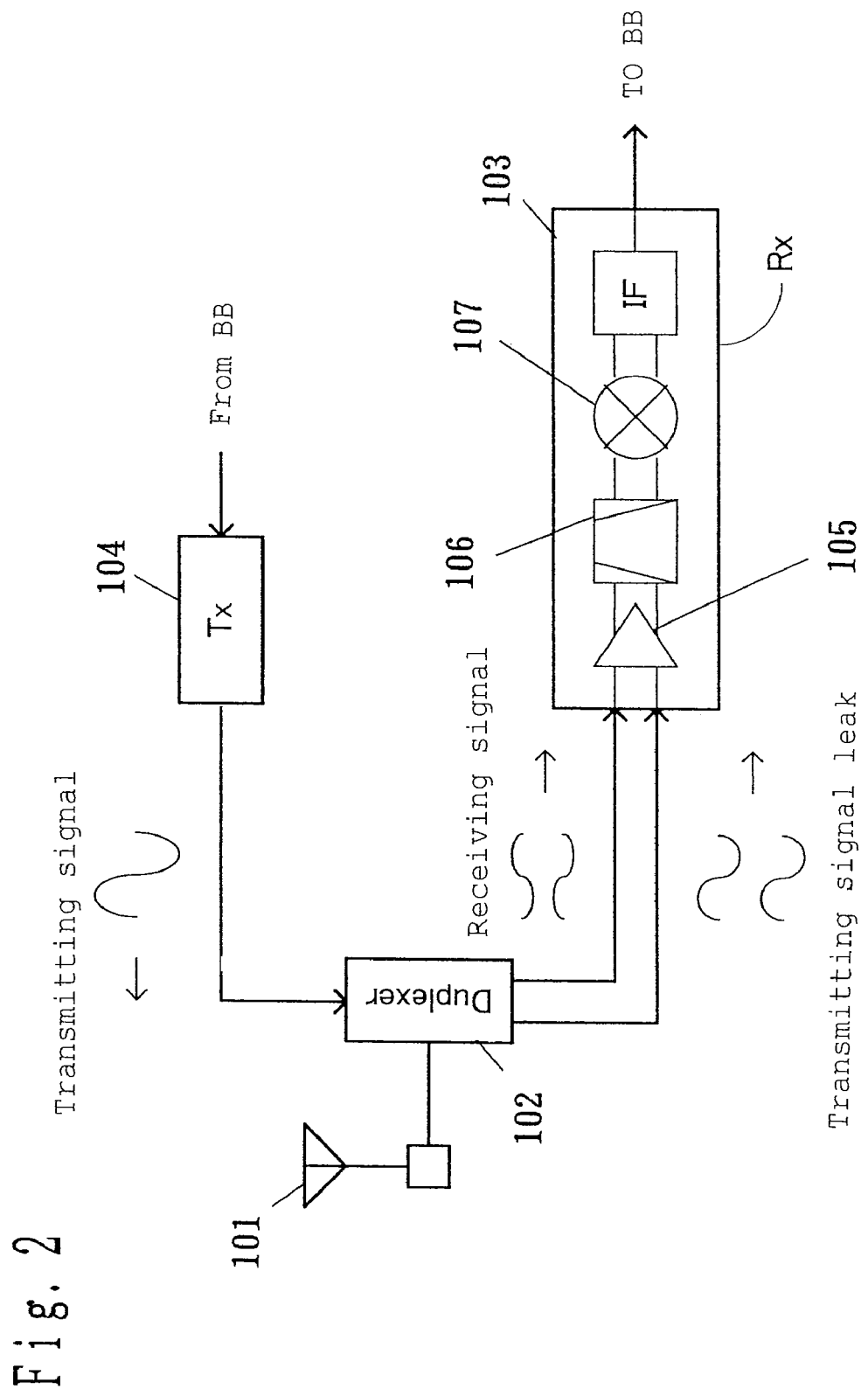
FIG. 2 is a diagram showing operation of the radio communication apparatus according to the first embodiment of the present invention.

Operation of the radio communication apparatus according to the first embodiment of the present invention will be described further in detail by using FIG. 2. A desired receiving signal received by the antenna 101 is inputted as a single-phase signal to the duplexer 102, and the inputted single-phase signal is converted into the differential signal and is inputted to the receiving circuit 103. On the other hand, the transmitting signal outputted from the transmitting circuit 104 is outputted as the single-phase signal from the duplexer 102 to the antenna 101, and a part of it leaks from the duplexer 102 to the receiving circuit 103. This transmitting signal leak is inputted as an in-phase signal to the receiving circuit 103. Here, a circuit configuration of a high common mode rejection ratio (CMRR) is used as the receiving circuit 103, and in particular as a low-noise amplifier 105 as an example of the amplifier of the present invention, an inter-stage filter 106 as an example of the filter of the present invention and a down mixer 107. Consequently, it is possible to reduce gain of the transmitting signal leak which is the in-phase signal compared to the gain of the receiving signal as the differential signal in the low-noise amplifier 105 and down mixer 107 of the receiving circuit 103. As described above, the inter-stage filter 106 selectively passes a desired differential wave and selectively suppresses an in-phase jammer. For this reason, it is possible to significantly attenuate the transmitting signal leak which is the in-phase signal compared to a single-phase (one input and one output) filter of the same size without a distinction between in-phase and differential.

Deterioration of a noise characteristic due to the transmitting signal leak which is a factor behind the deteriorated reception, gain compression and intermodulation distortion are caused by the low-noise amplifier 105 or the down mixer 107 saturated by the transmitting signal leak. As a factor therein, the level of the transmitting signal leak is significantly higher than that of the receiving signal. For this reason, if the receiving signal is amplified to a necessary level in the conventional radio communication apparatus, the transmitting signal leak is also amplified so that the low-noise amplifier 105 or the down mixer 107 became saturated. As for the radio communication apparatus in FIG. 1, however, it is possible to increase only the receiving signal so as to reduce saturation of the low-noise amplifier 105 or the down mixer 107.

Thus, the radio communication apparatus shown in FIG. 1 uses a circuit configuration in which the receiving signal is inputted as the differential signal to the receiving circuit 103 and the transmitting signal leak is inputted as the in-phase signal to the receiving circuit 103. And the circuit of a high common mode rejection ratio is used as the receiving circuit 103 so as to reduce deterioration of reception on simultaneous transmission and reception without increasing current consumption in the receiving circuit 103. Thus, it is also possible to reduce an attenuation amount of the frequency band of the transmitting signal of the duplexer 102 and consequently reduce the size of the duplexer 102.

A differential antenna may be used instead of the antenna 101.

In the case where the common mode rejection ratio of the low-noise amplifier 105 and the down mixer 107 is sufficiently high in the receiving circuit 103, it may be a configuration without using the inter-stage filter 106. In this case, the inter-stage filter 106 which is difficult to provide as an IC is not used, and so it becomes easier to provide radio ICs as one chip so as to allow miniaturization of the radio portion. This configuration is especially effective in the case of a direct conversion method.

Figure 3:
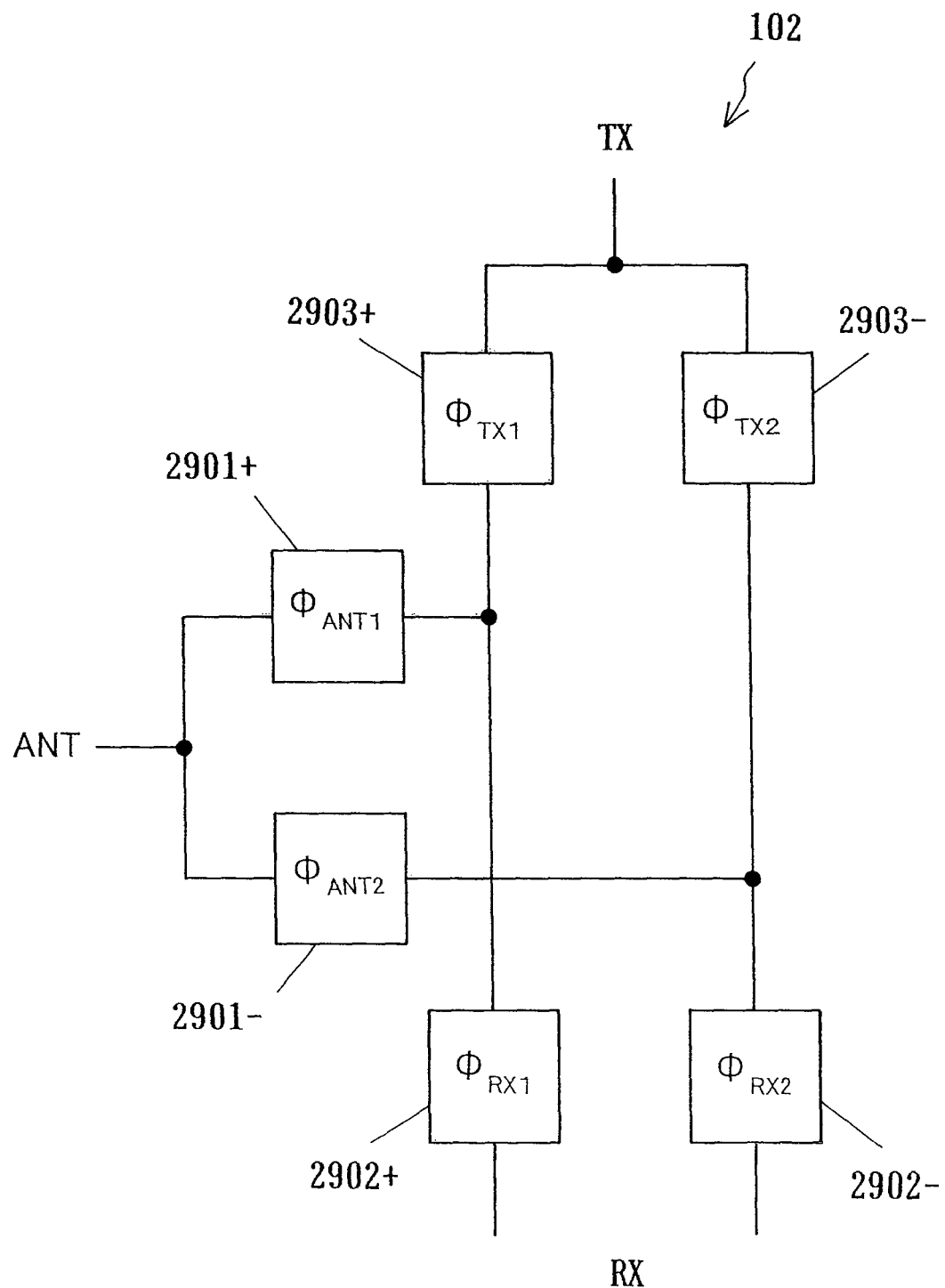
FIG. 3 is a circuit diagram showing a configuration example of a duplexer of the radio communication apparatus according to the first embodiment of the present invention.

FIG. 3 shows a configuration example of the duplexer 102.

In FIG. 3, a phase shifter 2901+ corresponds to a first phase shifter of the present invention, a phase shifter 2901− corresponds to a second phase shifter of the present invention, a phase shifter 2902+ corresponds to a third phase shifter of the present invention, a phase shifter 2902− corresponds to a fourth phase shifter of the present invention, a phase shifter 2903+ corresponds to a fifth phase shifter of the present invention, and a phase shifter 2903− corresponds to a sixth phase shifter of the present invention.

The receiving signal received by the antenna 101 is inputted to the receiving circuit 103 via the phase shifters 2901+, 2901− and the phase shifters 2902+, 2902− respectively. The transmitting signal outputted from the transmitting circuit 104 is inputted to the antenna 101 via the phase shifters 2903+, 2903− and the phase shifters 2901+, 2901− respectively.

Next, the operation of the duplexer 102 of the present invention will be described further in detail. If phase-change (shifting) amounts of the phase shifters 2901+, 2901−, 2902+, 2902−, 2903+ and 2903− are $\Phi_{ANT1}$, $\Phi_{ANT2}$, $\Phi_{RX1}$, $\Phi_{RX2}$, $\Phi_{TX1}$ and $\Phi_{TX2}$ respectively, the phase-change amounts are in the following relationship.

(Formula 1)

$$\Phi_{ANT1} - \Phi_{ANT2} = 90 \text{ deg.} \quad (1)$$

$$\Phi_{RX1} - \Phi_{RX2} = 90 \text{ deg.} \quad (2)$$

$$\Phi_{TX1} - \Phi_{TX2} = -90 \text{ deg.} \quad (3)$$

Thus, a single-phase receiving signal received by the antenna 101 is inputted as the differential signal to the receiving circuit 103. The single-phase transmitting signal outputted from the transmitting circuit 104 is inputted as the single-phase signal to the antenna 101. Furthermore, the single-phase transmitting signal outputted from the transmitting circuit 104 is inputted as the in-phase signal to the receiving circuit 103.

It is possible, by having such a configuration, to implement the duplexer 102 of outputting the signal received from the antenna 101 as the differential signal to the receiving circuit 103 and outputting the transmitting signal leak of the transmitting circuit 104 as the in-phase signal to the receiving circuit 103. Consequently, it is possible to reduce the deterioration of the reception on simultaneous transmission and reception.

It is also possible to use a filter satisfying a phase relationship of formulas (1) to (3) instead of the phase shifters 2901+, 2901−, 2902+, 2902−, 2903+ and 2903−.

Figure 4:
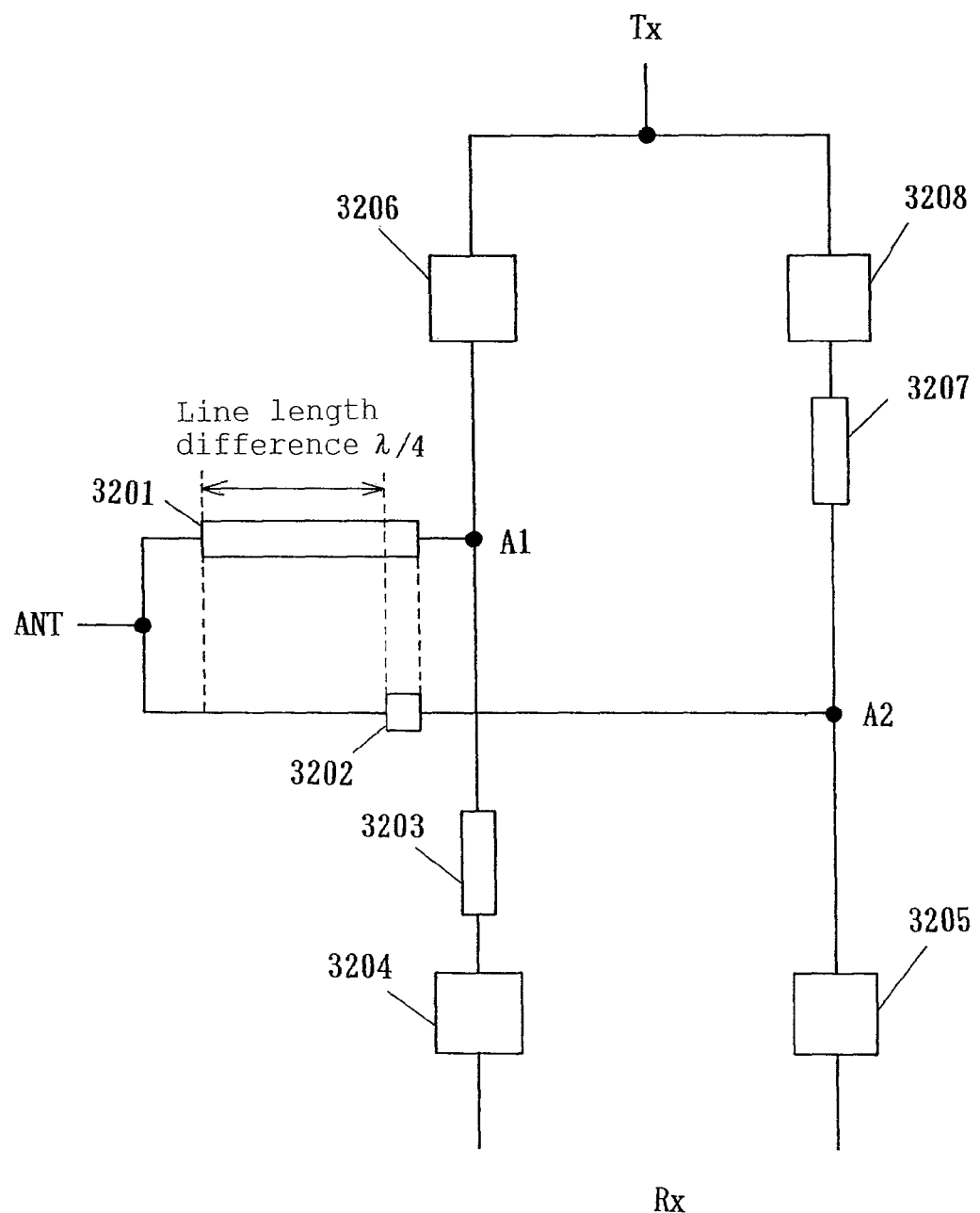
FIG. 4 is a circuit diagram showing a configuration example of the duplexer of the radio communication apparatus according to the first embodiment of the present invention.

The configuration shown in FIG. 4 may also be used to concretely implement the circuit in FIG. 3. In FIG. 4, lines 3201 and 3202 are corresponding to the phase shifters 2901+ and 2901− in FIG. 3 respectively, and the difference in line length between the lines 3201 and 3202 is a ¼ wavelength. A line 3203 is a ¼-wavelength line, and a band pass filter 3204 has a sufficiently low impedance for the signal in a transmit frequency band and has a characteristic of passing the signal in a receive frequency band. The line 3203 and band pass filter 3204 are corresponding to the phase shifter 2902+ shown in FIG. 3. A band pass filter 3205 has a sufficiently high impedance for the signal in the transmit frequency band and has the characteristic of passing the signal in the receive frequency band. The band pass filter 3205 is corresponding to the phase shifter 2902− shown in FIG. 3. A band pass filter 3206 has a sufficiently high impedance for the signal in the receive frequency band and has the characteristic of passing the signal in the transmit frequency band. The band pass filter 3206 is corresponding to the phase shifter 2903+ shown in FIG. 3. A band pass filter 3208 has a sufficiently low impedance for the signal in the receive frequency band and has the characteristic of passing the signal in the transmit frequency band. A line 3207 is a ¼ wavelength line. The band pass filter 3208 and line 3207 are corresponding to the phase shifter 2903− shown in FIG. 3.

The circuit of such a configuration is used so that the impedance on the receiving circuit 103 side in the transmit frequency band viewed from nodes A1 and A2 becomes sufficiently high and the loss of the signals sent from the transmitting circuit 104 to the antenna 101 is reduced. Furthermore, the impedance on the transmitting circuit 104 side in the receive frequency band viewed from nodes A1 and A2 becomes sufficiently high and the loss of the signals received from the antenna 101 to the receiving circuit 103 is reduced.

Figure 5:
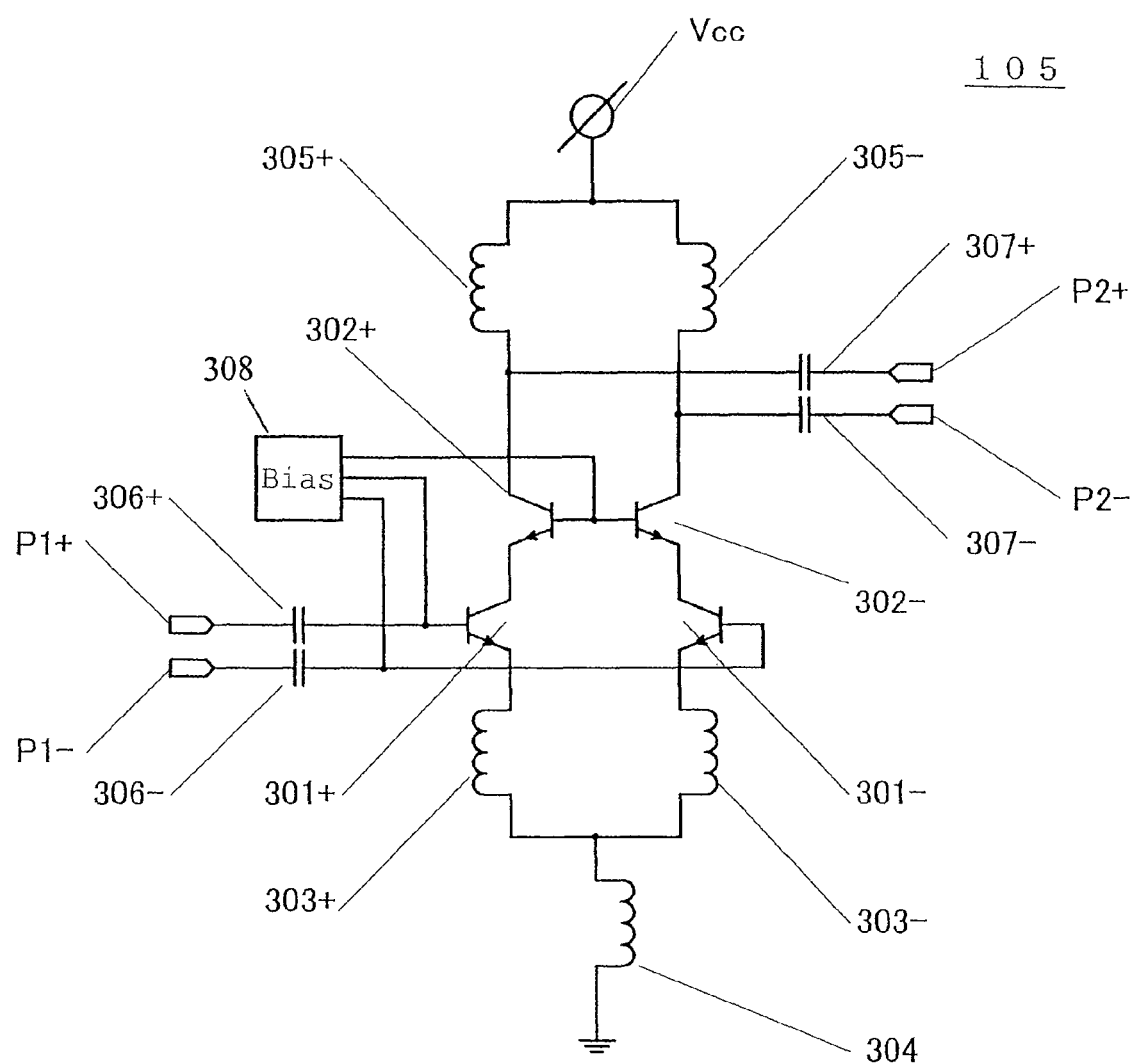
FIG. 5 is a diagram showing a circuit example of a low-noise amplifier of a receiving circuit of the radio communication apparatus according to the first embodiment of the present invention.

FIG. 5 shows a configuration example of the low-noise amplifier 105 of which common mode rejection ratio is high. In this diagram, reference numeral 301+ denotes an example of a first transistor of the present invention, and 301− denotes an example of a second transistor of the present invention. 302+ and 302− denote transistors, 303+, 303−, 304, 305+ and 305− denote inductors, 306+, 306−, 307+ and 307− denote capacitors, and 308 denotes a bias circuit. Input nodes P1+ and P1− are connected to bases of the transistors 301+ and 301− via the capacitors 306+ and 306− respectively, collectors of the transistors 301+ and 301− are connected to emitters of the transistors 302+ and 302− respectively, and the collectors of the transistors 302+ and 302− are connected to output nodes P2+ and P2− via the capacitors 307+ and 307− respectively. The emitters of the transistors 301+ and 301− are mutually connected via the inductors 303+ and 303−, and connection points of the inductors 303+ and 303− are connected to a ground node via the inductor 304 as an example of the first inductor of the present invention respectively. The bases of the transistors 302+ and 302− are mutually connected. A power supply voltage node Vcc is connected to the collectors of the transistors 302+ and 302− via the inductors 305+ and 305− respectively. The bias circuit 308 supplies bias to the bases of the transistors 301+, 301−, 302+ and 302−.

The operation of the low-noise amplifier 105 shown in FIG. 5 will be described further in detail. The differential signals inputted to the input nodes P1+ and P1− are amplified by using the connection point of the inductors 303+ and 303− as a virtual ground. On the other hand, the in-phase signal inputted to the input nodes P1+ and P1− are amplified by using the ground node connected to the inductor 304 as the ground. For that reason, if an inductor value of the inductor 304 is increased, the emitters of the transistors 301+ and 301− and the ground node are separated so that the gain of the in-phase signals becomes smaller than that of the differential signals. To be more specific, a signal voltage between the output nodes P2+ and P2− and the above connection point obtained against the differential signals is higher than the signal voltage between the output nodes P2+ and P2− and a ground point obtained against the in-phase signals. The impedance for the in-phase signals between the emitters of the transistors 301+ and 301− and the ground node becomes higher than the impedance for the differential signals so that, if the input nodes are matched with the differential signals, they will be mismatching for the in-phase signals. Consequently, on inputting the differential signals and in-phase signals of the same level, the in-phase signals to be outputted are significantly suppressed compared to the differential signals, that is, a high common mode rejection ratio can be obtained.

Figure 6:
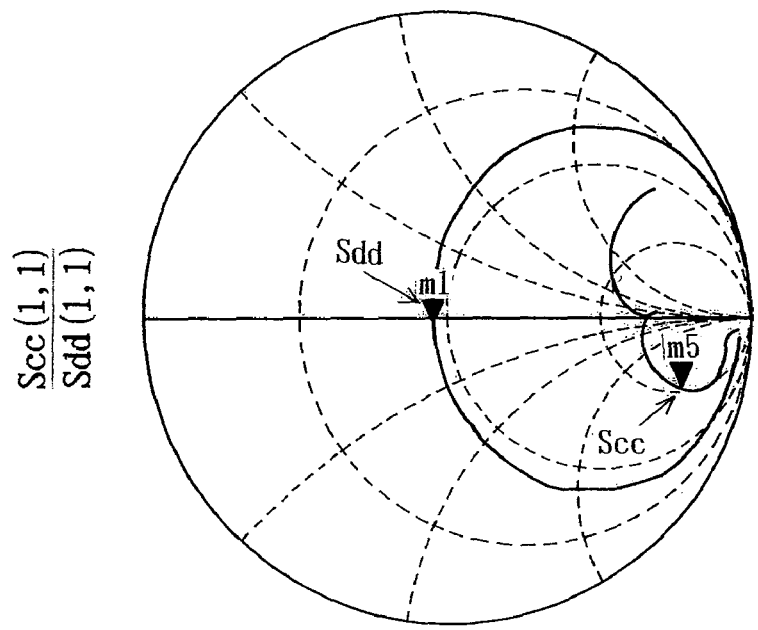
FIG. 6(a) is a diagram showing S11A for an S parameter differential component and an in-phase component of the low-noise amplifier of the receiving circuit of the radio communication apparatus according to the first embodiment of the present invention.
FIG. 6(b) is a diagram showing S21C for a differential component and the in-phase component of the low-noise amplifier of the receiving circuit of the radio communication apparatus according to the first embodiment of the present invention.
Figure 6:
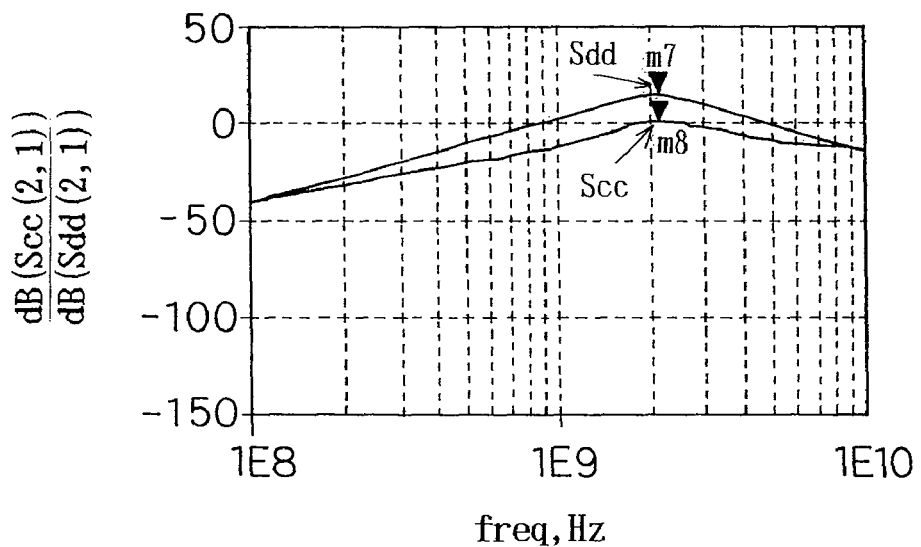

FIGS. 6(a)-6(b) shows simulation results of a mix mode S parameter of the low-noise amplifier 105. The inductors 303+ and 303− are at 1 nH, and the inductor 304 is at 8 nH. And the input nodes and output nodes have a matching circuit connected thereto so that S parameters Sdd 11 and Sdd 22 for the differential signals become 100Ω at 2.15 GHz. As can be seen in FIG. 6(a), Scc 11 becomes a mismatch if matched with Sdd 11. It can also be seen in FIG. 6(b) that Scc 21 is lower than Sdd 21 by 15 dB, that is, the common mode rejection ratio is 15 dB.

Thus, as for the low-noise amplifier 105 shown in FIG. 5, it is possible to render the impedance for the in-phase signals high compared to the impedance for the differential signals between the emitters of the transistors 301+ and 301− and the ground node so as to increase the common mode rejection ratio.

Figure 7B:
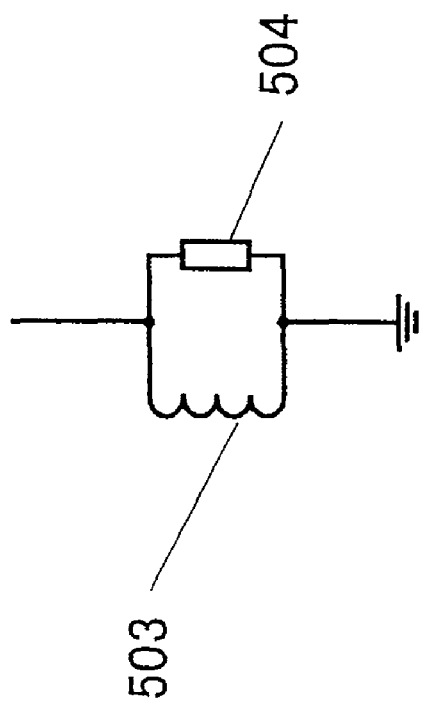
FIG. 7(b) is a diagram showing a part of a further circuit example of the low-noise amplifier of the receiving circuit of the radio communication apparatus according to the first embodiment of the present invention.
Figure 7A:
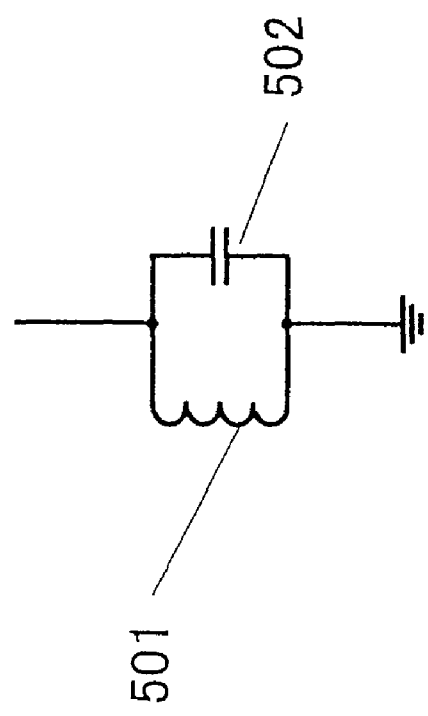
FIG. 7(a) is a diagram showing a part of another circuit example of the low-noise amplifier of the receiving circuit of the radio communication apparatus according to the first embodiment of the present invention.

As shown in FIG. 7(a), it is also possible to connect an inductor 501 as an example of a second inductor, instead of the inductor 304, to a capacitor 502 as an example of a first capacitor in parallel so as to use the circuit in parallel resonance at the frequency of the in-phase signals (transmitting signal leak). It is possible, by having such a configuration, to render the impedance for the in-phase signals high compared to the impedance for the differential signals between the emitters of the transistors 301+ and 301− and the ground node without using a large inductor difficult to render as the IC so as to increase the common mode rejection ratio. As shown in FIG. 7(b), it is also possible to use the circuit having an inductor 503 as another example of the second inductor and a resistance 504 connected in parallel. It is possible, by having such a configuration, to reduce the gain of the low-noise amplifier 105 for the in-phase signals by means of the loss in resistance without using the inductor difficult to render as the IC so as to increase the common mode rejection ratio.

Figure 8:
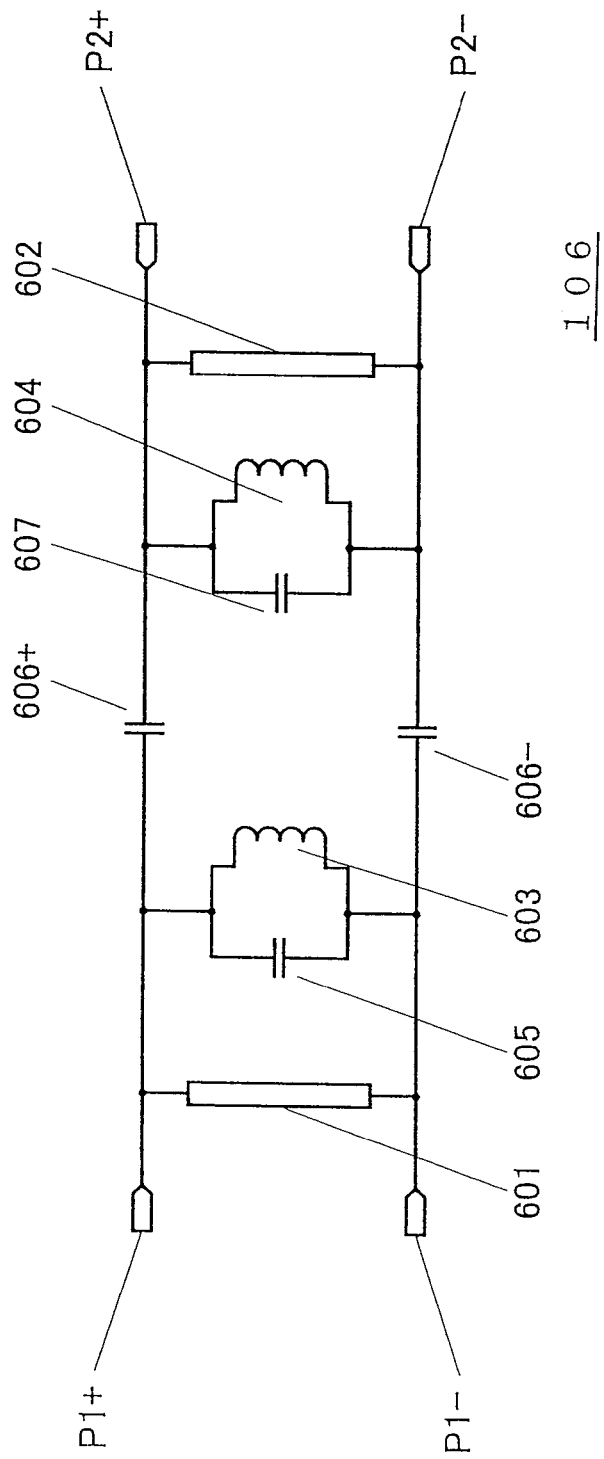
FIG. 8 is a diagram showing a circuit example of a filter of the receiving circuit of the radio communication apparatus according to the first embodiment of the present invention.

FIG. 8 shows a configuration example of the filter of a high common mode rejection ratio. In FIG. 8, reference numerals 601 and 602 denote wavelength lines of ½ of a passing frequency, 603 and 604 denote inductors, and 605, 606+, 606− and 607 denote capacitors. The input nodes P1+ and P1− are connected to the output nodes P2+ and P2− via the capacitors 606+ and 606−. The ½ wavelength line 601, inductor 603 and capacitor 605 are connected between the input nodes P1+ and P1−. The ½ wavelength line 602, inductor 604 and capacitor 607 are connected between the output nodes P2+ and P2−.

The operation of the filter shown in FIG. 8 will be described further in detail. The ½ wavelength lines 601 and 602 are open circuits for the differential signals, and are short circuits for the in-phase signals. For that reason, the differential signals inputted to the input nodes P1+ and P1− have the frequency selected by a band pass filter comprising the inductors 603 and 604 and capacitors 605, 606+, 606− and 607, and are then outputted to the output nodes P2+ and P2−. On the other hand, the in-phase signals inputted to the input nodes P1+ and P1− are reflected on the ½ wavelength lines 601 and 602, and so ideally they are not outputted to the output nodes P2+ and P2−. Therefore, the in-phase signals against the differential signals in the passing band are suppressed, that is, the common mode rejection ratio can be high.

Thus, as for the filter shown in FIG. 8, the common mode rejection ratio can be rendered higher by using the open circuits for the differential signals and the short circuits for the in-phase signals.

Figure 9A:
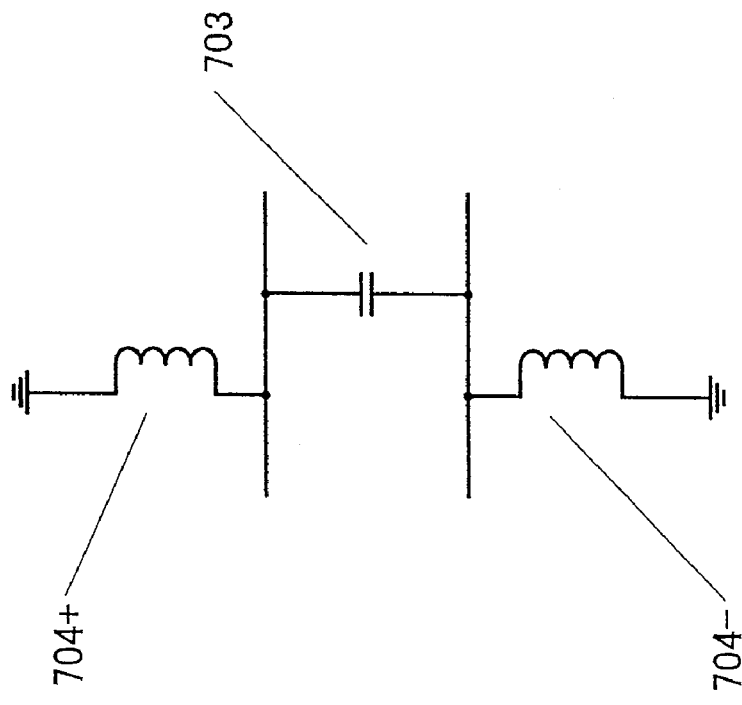
FIG. 9(a) is a diagram showing a part of another circuit example of the filter of the receiving circuit of the radio communication apparatus according to the first embodiment of the present invention.

The circuit shown in FIG. 9(a) may be used instead of the ½ wavelength lines 601 and 602. In FIG. 9(a), an inductor 701 is an example of a third inductor, a capacitor 702+ is an example of a second capacitor, and a capacitor 702− is an example of a third capacitor. The inductor 701 is connected between the input nodes P1+ and P1−, and the capacitors 702+ and 702− are connected between the input nodes P1+ and P1− and the ground respectively. At this time, if an inductance value of the inductor 701 is 2L and capacitance value of the capacitors 702+ and 702− is C respectively, the values of L and C are determined so that a frequency fd of the differential signals becomes as follows.

(Formula 2)

$$fd = 1/\{2\pi(LC)^{1/2}\}$$

Figure 9B:
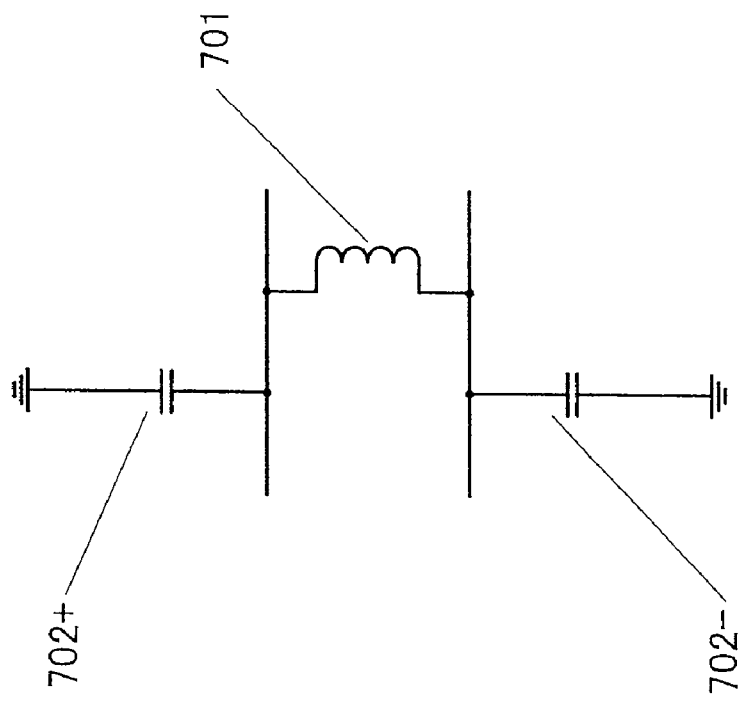
FIG. 9(b) is a diagram showing a part of a further circuit example of the filter of the receiving circuit of the radio communication apparatus according to the first embodiment of the present invention.

It is also possible to use the circuit shown in FIG. 9(b). In FIG. 9(b), a capacitor 703 is an example of a fourth capacitor, an inductor 704+ is an example of a fourth inductor, and an inductor 704− is an example of a fifth inductor. The capacitor 703 is connected between the input nodes P1+ and P1−, and the inductors 704+ and 704− are connected between the input nodes P1+, P1− and the ground. At this time, if the capacitance value of the capacitor 703 is 2C and the inductance value of the inductors 704+ and 704− is L respectively, the values of L and C are determined so that the frequency fd of the differential signals becomes as follows.

(Formula 3)

$$fd = 1/\{2\pi(LC)^{1/2}\}$$

It is possible, by having such a configuration, to implement a circuit open to the differential signals and of a low impedance to the in-phase signals in a lumped parameter circuit so as to allow miniaturization of the filter. In particular, the configuration in FIG. 9(a) is desirable in the case where the frequency band of the transmitting signal is high in comparison with that of the receiving signal, and the configuration in FIG. 9(b) is desirable in the case where the frequency band of the transmitting signal is low in comparison with that of the receiving signal.

Figure 10:
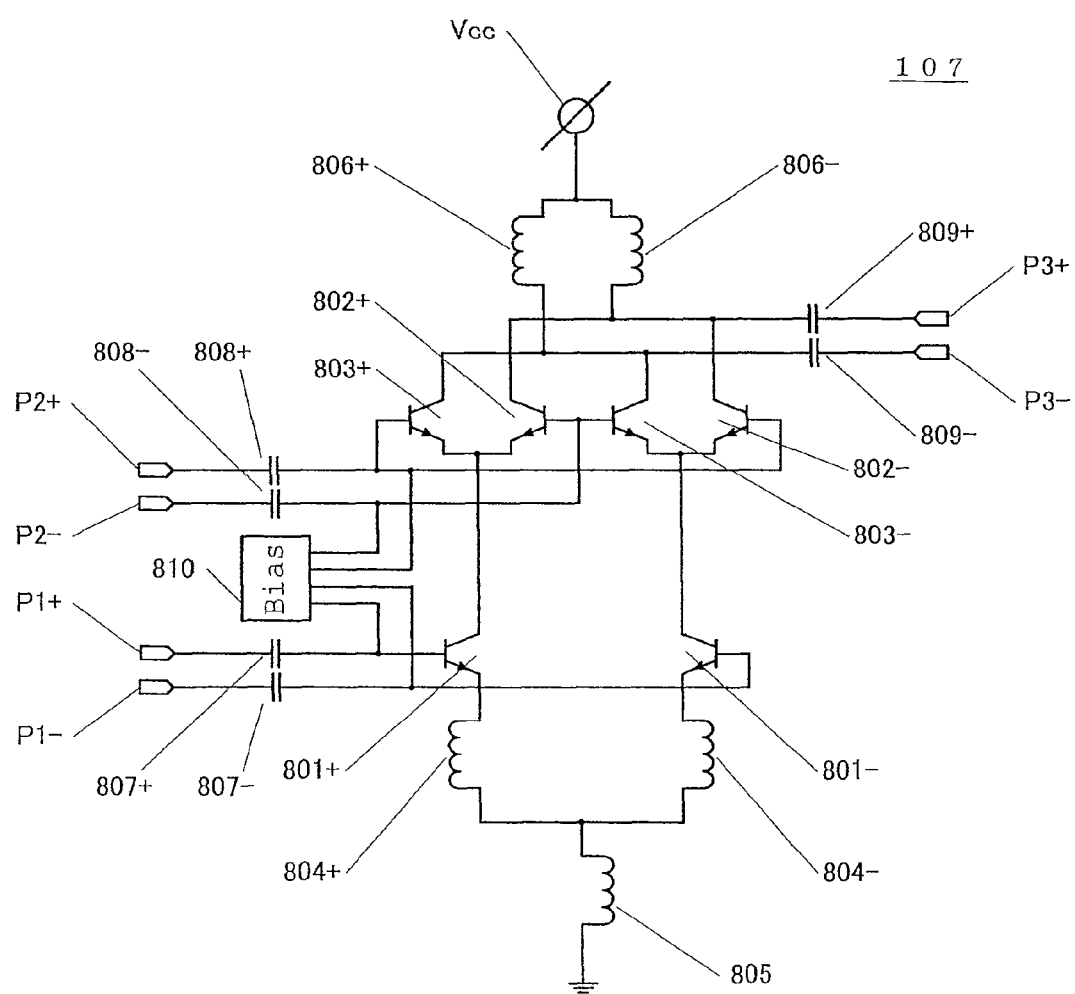
FIG. 10 is a diagram showing a circuit example of a down mixer of the receiving circuit of the radio communication apparatus according to the first embodiment of the present invention.

FIG. 10 shows a configuration example of the down mixer 107 of a high common mode rejection ratio. In FIG. 10, reference numeral 801+, 801−, 802+, 802−, 803+ and 803− denote transistors, 804+, 804−, 805, 806+ and 806− denote inductors, 807+, 807−, 808+, 808−, 809+ and 809− denote capacitors, and 810 denotes a bias circuit. The input nodes P1+ and P1− are connected to the bases of the transistors 801+ and 801− via the capacitors 807+ and 807− respectively, collectors of the transistors 801+ and 801− are connected to emitters of the transistors 802+, 802−, 803+ and 803− respectively. Both the collectors of the transistors 802+ and 802− are connected to output node P3+ via the capacitor 809+, and both the collectors of the transistors 803+ and 803− are connected to output node P3− via the capacitor 809−. The input node P2+ is connected to the transistors 802+ and 803− via the capacitor 808+, and the input nodes P2− is connected to the transistors 802− and 803+ via the capacitor 808−. The emitters of the transistors 801+ and 801− are mutually connected via the inductors 804+ and 804−, and the connection point of the inductors 804+ and 804− is connected to the ground node via the inductor 805. The collectors of the transistors 802+ and 802− are connected to the power supply voltage node Vcc via the inductor 806+, and the collectors of the transistors 803+ and 803− are connected to the power supply voltage node Vcc via the inductor 806−. The bias circuit 810 supplies the bias to the bases of the transistors 801+, 801−, 802+, 802−, 803+ and 803−.

The operation of the down mixer 107 shown in FIG. 10 will be described further in detail. RF signals received by the antenna are inputted from the input nodes P1+ and P1−, local signals outputted by a local oscillator are inputted from the input nodes P2+ and P2−, and an IF signal which is the frequency of the difference between the RF signal and the local signal and a higher harmonic and an intermodulation wave of each signal are outputted from the output nodes P3+ and P3−. The differential signals inputted to the input nodes P1+ and P1− are amplified by using the connection point of the inductors 804+ and 804− as a virtual ground. On the other hand, the in-phase signal inputted to the input nodes P1+ and P1− are amplified by using the ground node connected to the inductor 805 as the ground. For that reason, if the inductor value of the inductor 805 is increased, the emitters of the transistors 801+ and 801− and the ground node are separated so that the gain of the in-phase signals becomes smaller than that of the differential signals. The impedance for the in-phase signals becomes higher than the impedance for the differential signals between the emitters of the transistors 801+ and 801− and the ground node so that, if the input nodes are matched with the differential signals, they will be mismatching for the in-phase signals. Consequently, on inputting the differential signals and in-phase signals of the same level, the low-noise amplifier 105 has the in-phase signals to be outputted significantly suppressed compared to the differential signals, that is, a high common mode rejection ratio can be obtained.

Thus, the down mixer 107 shown in FIG. 10 can render the common mode rejection ratio higher by rendering the impedance for the in-phase signals higher than that for the differential signals between the emitters of the transistors 801+ and 801− and the ground node.

It is also possible to use the circuit shown in FIG. 7(a) instead of an inductor 705 as with the low-noise amplifier 105 shown in FIG. 5. And it is also possible to use the circuit shown in FIG. 7(b).

Second Embodiment

Figure 11:
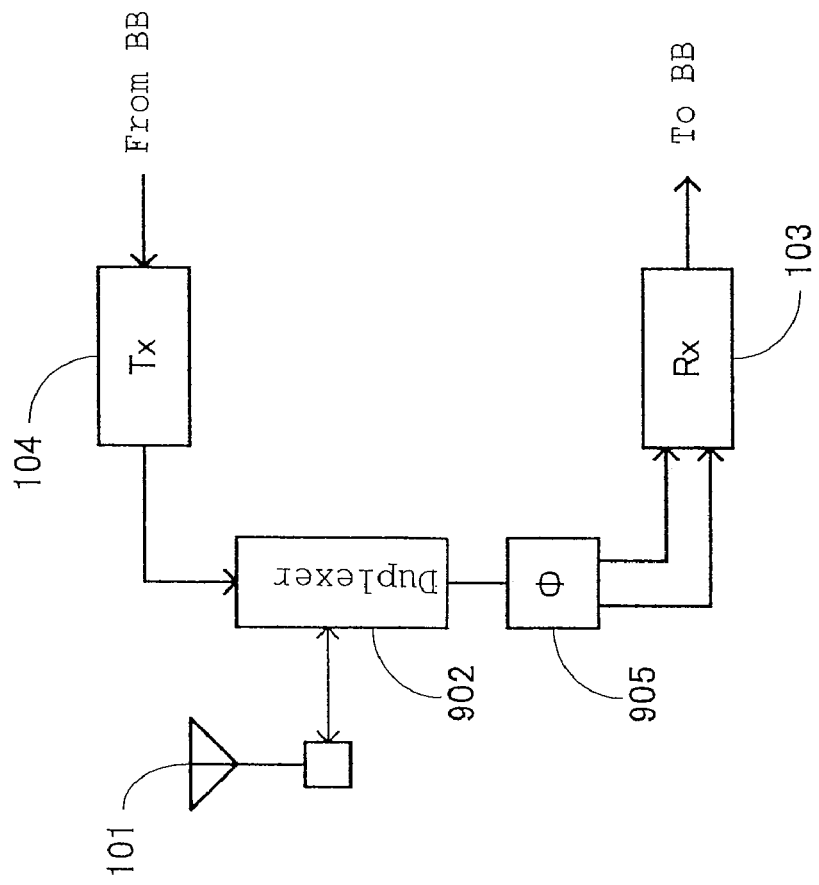
FIG. 11 is a diagram showing the configuration of the radio communication apparatus according to a second embodiment of the present invention.

FIG. 11 is a circuit diagram of the radio communication apparatus related to a second embodiment of the present invention. In FIG. 11, the same components as those shown in FIG. 1 are given the same symbols, and a description thereof will be omitted. In FIG. 11, reference numeral 902 denotes a duplexer of which terminals are single-phase input-output, and 905 denotes a phase shifter of single-phase input and balanced output which outputs the signals in the frequency band of the receiving signals as the differential signals and outputs the signals in the frequency band of the transmitting signals as the in-phase signals. Here, the duplexer of the present invention described in the first embodiment is corresponding as an example to the duplexer 902 and the phase shifter 905.

As for the radio communication apparatus shown in FIG. 11, the radio frequency signal transmitted from the base station is received by the antenna 101 as in FIG. 1 and is then inputted to the receiving circuit 103 via the duplexer 902 and the phase shifter 905, where it is converted into the base band signal. It is also constituted so that predetermined signal processing is performed to the transmitting base band signal and then it is inputted to the transmitting circuit 104, where it is converted into the radio frequency and amplified to the predetermined sending power to be sent from the antenna 101 to the base station via the duplexer 902. And a part of the transmitting signal inputted to the duplexer 902 leaks to the receiving circuit 103.

Operation of the radio communication apparatus shown in FIG. 11 will be described further in detail. The desired receiving signal received by the antenna 101 is inputted to the phase shifter 905 via the duplexer 902, where it is converted into the differential signal and is inputted to the receiving circuit 103. On the other hand, a part of the transmitting signal outputted from the transmitting circuit 104 leaks from the duplexer 902 to the phase shifter 905. This transmitting signal leak is converted into the in-phase signal by the phase shifter 905, and is inputted to the receiving circuit 103. Here, a circuit configuration of a high common mode rejection ratio (CMRR) is used as the receiving circuit 103, and in particular as the low-noise amplifier 105, the inter-stage filter 106 and the down mixer 107. Consequently, it is possible to reduce the gain of the transmitting signal leak which is the in-phase signal compared to the gain of the receiving signal as the differential signal in the low-noise amplifier 105 and the down mixer 107 of the receiving circuit 103. It is also possible, with the inter-stage filter 106, to significantly attenuate the transmitting signal leak which is the in-phase signal compared to a single-phase filter.

Thus, the radio communication apparatus shown in FIG. 11 uses a circuit configuration in which the receiving signal is inputted as the differential signal to the receiving circuit 103 and the transmitting signal leak is inputted as the in-phase signal to the receiving circuit 103. And the circuit of a high common mode rejection ratio is used as the receiving circuit 103 so as to reduce the deterioration of the reception on simultaneous transmission and reception without increasing current consumption in the receiving circuit 103. Thus, it is also possible to reduce an attenuation amount of the frequency band of the transmitting signal of the duplexer 902 and consequently reduce the size of the duplexer 902.

In the case where the common mode rejection ratio between the low-noise amplifier 105 and the down mixer 107 is sufficiently high in the receiving circuit 103, it may be a configuration without using the inter-stage filter 106. In this case, the inter-stage filter 106 which is difficult to render as the IC is not used, and so it becomes easier to render the radio ICs as one chip so as to allow miniaturization of the radio portion. This configuration is especially effective in the case of the direct conversion method.

Figure 12:
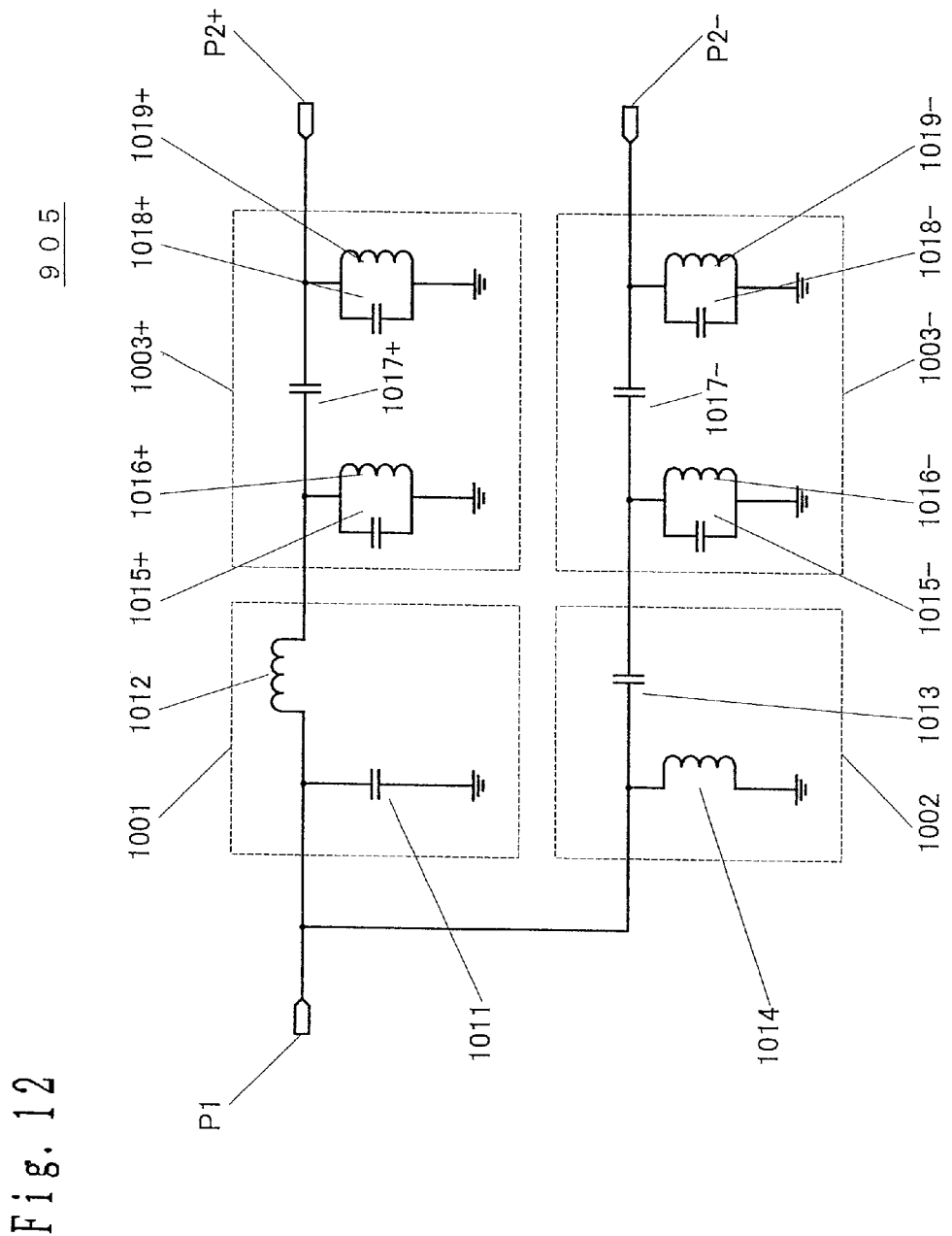
FIG. 12 is a diagram showing a circuit example of a phase shifter of the radio communication apparatus according to the second embodiment of the present invention.

FIG. 12 shows a configuration example of the phase shifter 905. In FIG. 12, reference numeral 1001 denotes a phase delay phase shift circuit, 1002 denotes a phase lead phase shift circuit, 1003+ and 1003− denote J-inverter type filter circuits which are examples of a first band pass filter and a second band pass filter. The input node P1 is connected to the phase shift circuits 1001 and 1002, the outputs of the phase shift circuits 1001 and 1002 are connected to the filter circuits 1003+ and 1003− respectively, and the outputs of the filter circuits 1003+ and 1003− are connected to the output nodes P2+ and P2− respectively.

The phase delay phase shift circuit 1001 is comprising a capacitor 1011 as an example of a fifth capacitor in parallel connection and an inductor 1012 as an example of a sixth inductance in series connection. And the phase lead phase shift circuit 1002 is comprising an inductor 1014 as an example of a seventh inductor in parallel connection and a capacitor 1013 as an example of a sixth capacitor in series connection. The filter circuit 1003+ is comprising a capacitor 1015+ and an inductor 1016+ in parallel connection, a capacitor 1017+ in series connection, and a capacitor 1018+ and an inductor 1019+ in parallel connection. The filter circuit 1003− is also comprising likewise. The filter circuits 1003+ and 1003− are band pass filters of passing the signals in the frequency band of the receiving signals. In this case, the signals in the frequency band of the transmitting signals are attenuated, which is not a problem because the transmitting signal leak is originally the jammer to be preferably suppressed.

The phase shifter shown in FIG. 12 will be described further in detail.

The frequency band of the receiving signals is the passing band of the filter circuits. For that reason, when the signals in the frequency band of the receiving signals inputted from the input node P1 are outputted to the output nodes P2+ and P2−, a phase difference between the signals is determined by a passing phase difference between the phase shift circuits 1001 and 1002. It is possible to have the passing phase difference of 180 degrees in a broad band between the phase shift circuits 1001 and 1002 by selecting the values of the capacitors 1011, 1013 and the inductors 1012, 1014. To be more specific, the signals in the frequency band of the receiving signals are outputted as the differential signals.

On the other hand, the frequency band of the transmitting signals is a blocking band of the filter circuits. For that reason, when the signals in the frequency band of the transmitting signals inputted from the input node P1 are outputted to the output nodes P2+ and P2−, the phase difference between the signals is significantly influenced by the filter circuits. Therefore, the signals in the frequency band of the transmitting signals have the phase difference between the phase shift circuits 1001 and 1002. However, it is possible, by slightly deviating the passing phase of the frequency band of the transmitting signals of the filter circuits 1003+ and 1003−, to have the passing phase difference of 0 degree between the output nodes P2+ and P2−. To be more specific, the signals in the frequency band of the transmitting signals are outputted as the in-phase signals.

Thus, it is possible, by using the phase shifter shown in FIG. 12, to implement the phase shifter which outputs the receiving signals as the differential signals and outputs the transmitting signal leak as the in-phase signal. Consequently, it is possible to reduce the deterioration of the reception on simultaneous transmission and reception.

It is also possible to use the low-noise amplifier 105 shown in FIG. 5, the filter shown in FIG. 8 and the down mixer 107 shown in FIG. 10 inside the receiving circuit 103.

According to the description of this embodiment, it was described that the phase shifter 905 is constituted separately from the duplexer 902. However, it may also be constituted so that functions of the phase shifter 905 are included in the duplexer 102 of the first embodiment.

Third Embodiment

Figure 13:
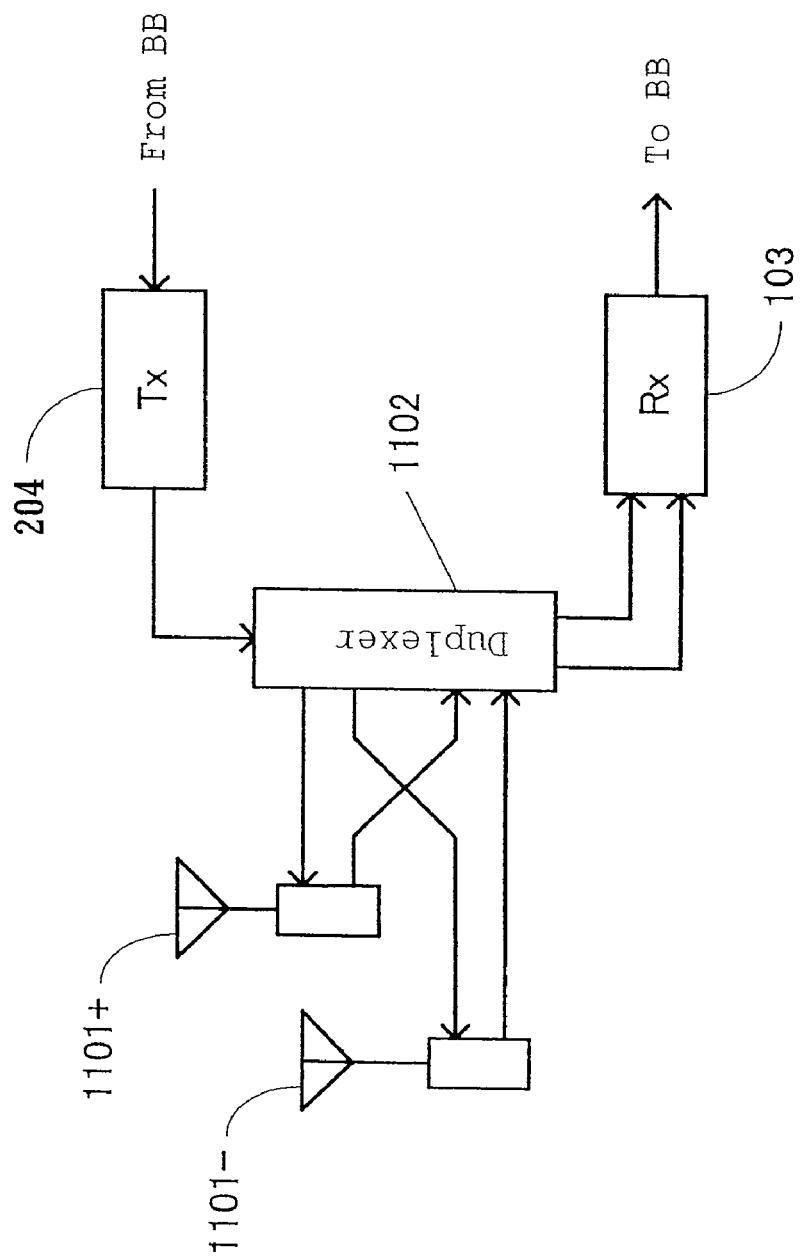
FIG. 13 is a diagram showing the configuration of the radio communication apparatus according to a third embodiment of the present invention.

FIG. 13 is a circuit diagram of the radio communication apparatus related to a third embodiment of the present invention. In FIG. 13, the same components as those shown in FIG. 1 are given the same symbols, and a description thereof will be omitted. In FIG. 13, antenna 1101+ is an example of one antenna of the present invention having a first feeding point of feeding a receiving signal and also having two or more polarized waves, antenna 1101− is an example of another antenna of the present invention placed along with the one antenna and having a second feeding point of feeding the receiving signal and also having two or more polarized waves, and a duplexer 1102 is an example of a duplexer of the present invention comprising separate terminals, that is, the transmission input terminal is the single-phase input type, the receiving output terminal is the balanced output type, and the antenna input-output terminal is the balanced input-output type.

As for the radio communication apparatus shown in FIG. 13, the radio frequency signal transmitted from the base station is received by the antennas 1101+ and 1101− as in FIG. 1 and is then inputted to the duplexer 1102. Furthermore, the signal outputted from the duplexer 1102 is inputted to the receiving circuit 103, where it is converted into the base band signal. The predetermined signal processing is performed to the transmitting base band signal and then it is inputted to the transmitting circuit 204 as an example of a second transmitting apparatus of the present invention of outputting a transmitting signal, where it is converted into the radio frequency and amplified to the predetermined sending power to be inputted to the duplexer 1102. Furthermore, it is constituted so that this signal is outputted from the duplexer 1102 to be sent to the base station from the antennas 1101+ and 1101−. And a part of the transmitting signal inputted to the duplexer 1102 leaks to the receiving circuit 103.

The operation of the radio communication apparatus according to the third embodiment of the present invention will be described further in detail. The desired receiving signal received by the antennas 1101+ and 1101− is inputted as the differential signal to the duplexer 1102, and is further inputted to the receiving circuit 103. On the other hand, the transmitting signal outputted from the transmitting circuit 204 is outputted as the in-phase signal from the duplexer 1102 to the antennas 1101+ and 1101−, and a part of it leaks as the in-phase signal from the duplexer 1102 to the receiving circuit 103. Here, the circuit configuration of a high common mode rejection ratio (CMRR) is used as the receiving circuit 103, and in particular as the low-noise amplifier 105, the inter-stage filter 106 and the down mixer 107. Consequently, it is possible to reduce the gain of the transmitting signal leak which is the in-phase signal compared to the gain of the receiving signal as the differential signal in the low-noise amplifier 105 and down mixer 107 of the receiving circuit 103. It is also possible, with the inter-stage filter 106, to significantly attenuate the transmitting signal leak which is the in-phase signal compared to the single-phase filter.

Thus, the radio communication apparatus shown in FIG. 13 uses the circuit configuration in which the receiving signal is inputted as the differential signal to the receiving circuit 103 and the transmitting signal leak is inputted as the in-phase signal to the receiving circuit 103. And the circuit of a high common mode rejection ratio is used as the receiving circuit 103 so as to reduce the deterioration of the reception on simultaneous transmission and reception without increasing the current consumption in the receiving circuit 103. Thus, it is also possible to reduce the attenuation amount of the frequency band of the transmitting signal of the duplexer 1102 and consequently reduce the size of the duplexer 1102.

The radio communication apparatus according to the third embodiment of the present invention has noise in the frequency band of the receiving signals outputted from the transmitting circuit 204 inputted as the in-phase signals to the receiving circuit 103. However, it is possible to reduce the gain of the transmitting signal leak as the in-phase signal compared to the gain of the receiving signal as the differential signal so as to reduce the deterioration of the reception due to the noise from the transmitting circuit 204.

Thus, the radio communication apparatus shown in FIG. 13 uses the circuit configuration in which the receiving signal is inputted as the differential signal to the receiving circuit 103 and the transmitting signal leak is inputted as the in-phase signal to the receiving circuit 103 and the circuit of a high common mode rejection ratio is used as the receiving circuit 103 so as to reduce the deterioration of the reception due to the noise from the transmitting circuit 204. Thus, it is thereby possible to reduce the attenuation amount of the frequency band of the receiving signals from the transmitting circuit 204 to the antennas 1101+ and 1101− in the duplexer 1102 and consequently reduce the size of the duplexer 1102.

In the case where the common mode rejection ratio of between the low-noise amplifier 105 and the down mixer 107 is sufficiently high in the receiving circuit 103, it is possible to constitute it without using the inter-stage filter 106. In this case, the inter-stage filter 106 which is difficult to render as the IC is not used, and so it becomes easier to render the radio ICs as one chip so as to allow miniaturization of the radio portion. This configuration is especially effective in the case of the direct conversion method.

Figure 14:
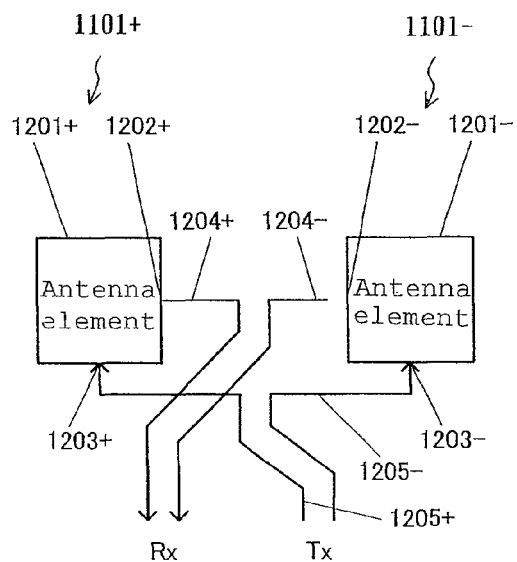
FIG. 14(a) is a diagram showing a configuration example of an antenna of the radio communication apparatus according to the third embodiment of the present invention.
FIG. 14(b) is a diagram showing a configuration example of the antenna of the radio communication apparatus according to the third embodiment of the present invention.
FIG. 14(c) is a diagram showing a configuration example of the antenna of the radio communication apparatus according to the third embodiment of the present invention.
Figure 14:
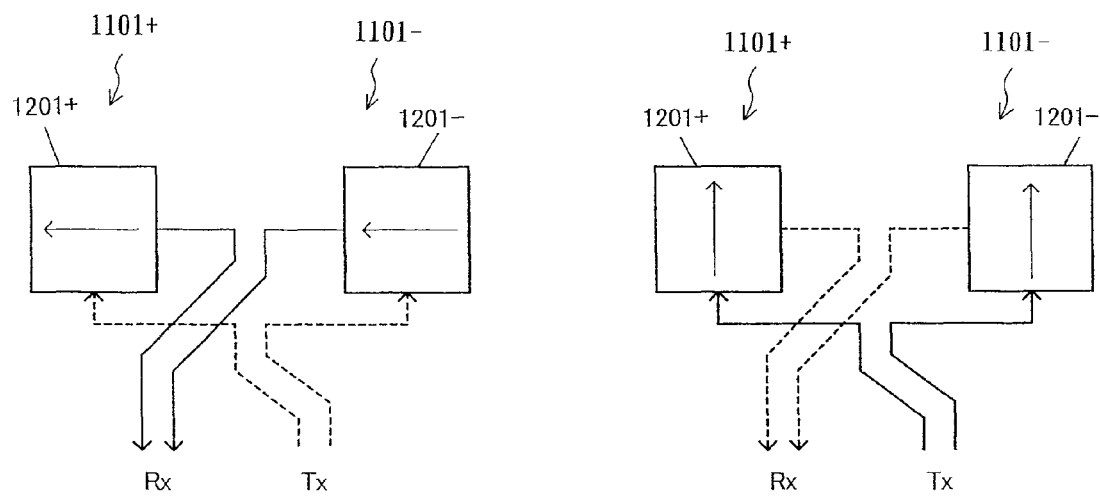

FIGS. 14(*a*)-14(*b*) shows configuration examples of the antennas 1101+ and 1101−. The following antennas 1101+ and 1101− show the examples constituted as patch antennas having two polarized waves.

In FIG. 14(*a*), reference numerals 1201+ and 1201− are antenna elements, a feeding point 1202+ is the feeding point for the receiving signals as an example of a second feeding point of the present invention, and a feeding point 1202− is the feeding point for the receiving signals as an example of a first feeding point of the present invention. A feeding point 1203+ is the feeding point for the transmitting signals as an example of a fourth feeding point of the present invention, and a feeding point 1203− is the feeding point for the transmitting signals as an example of a third feeding point of the present invention. Reference numerals 1204+ and 1204− are feeder lines for the receiving signals and 1205+ and 1205− are feeder lines for the transmitting signals. The receiving signals received by the antenna elements 1201+ and 1201− are inputted to the duplexer 1102 from the feeding points 1202+ and 1202− via the feeder lines 1204+ and 1204−. The transmitting signals outputted from the duplexer 1102 are inputted to the antenna elements 1201+ and 1201− from the feeding points 1203+ and 1203− via the feeder lines 1205+ and 1205−.

Next, the operation of the antenna apparatus of the present invention will be described further in detail by using FIGS. 14(*b*) and 14(*c*).

FIG. 14(*b*) shows the operation of the antennas 1101+ and 1101− on reception. The signals in the receive frequency band are received as the receiving signals in the polarized wave parallel to the direction in which the antenna elements 1201+ and 1201− are in line from the positions of the feeding points 1202+ and 1202−. And the excitation direction of the antenna elements 1201+ and 1201− becomes parallel to the polarized wave. In this case, reversed-phase signals are outputted from the feeding points 1202+ and 1202−, and the differential signals are conveyed to the duplexer 1102 and the receiving circuit 103 via the feeder lines 1204+ and 1204−. To be more specific, if the feeding point 1202+ is placed on the excitation direction side of the antenna element 1201+, and the feeding point 1202− is placed on the opposite side to the excitation direction of the antenna element 1201−, the differential signals are outputted from the feeder lines 1204+ and 1204−.

FIG. 14(*c*) shows the operation of the antennas 1101+ and 1101− on transmission. In-phase transmitting signals are inputted to the feeding points 1203+ and 1203− from the transmitting circuit 204 and the duplexer 1102 via the feeder lines 1205+ and 1205−. In this case, the antenna elements 1201+ and 1201− are excited in-phase. The transmitting signals are sent in a vertical polarized wave from the positions of the feeding points 1203+ and 1203− in the direction in which the antenna elements 1201+ and 1201− are in line.

It is possible, by having such a configuration, to implement the antenna apparatus of receiving the differential signals and sending the in-phase signals. In this case, the polarized waves of the differential signals are horizontal and those of the in-phase signals are vertical.

Figure 15:
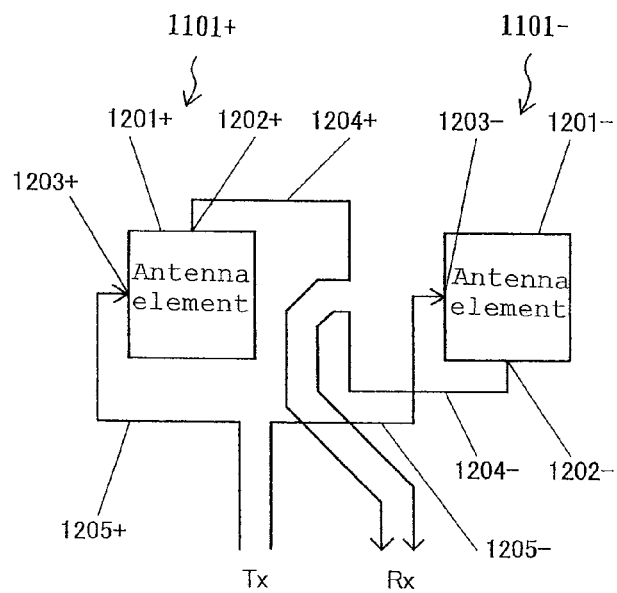
FIG. 15(a) is a diagram showing a configuration example of the antenna of the radio communication apparatus according to the third embodiment of the present invention.
FIG. 15(b) is a diagram showing a configuration example of the antenna of the radio communication apparatus according to the third embodiment of the present invention.
FIG. 15(c) is a diagram showing a configuration example of the antenna of the radio communication apparatus according to the third embodiment of the present invention.
Figure 15:
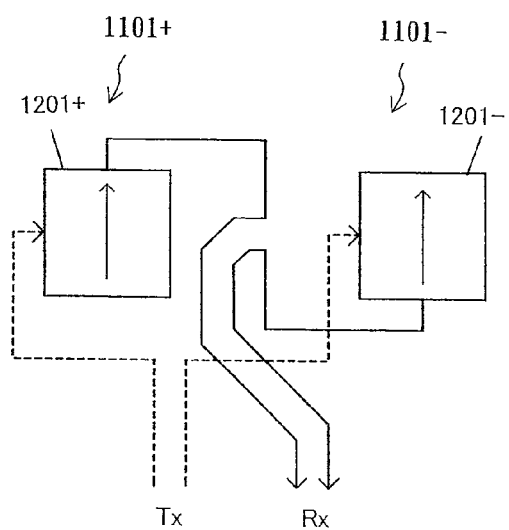
Figure 15:
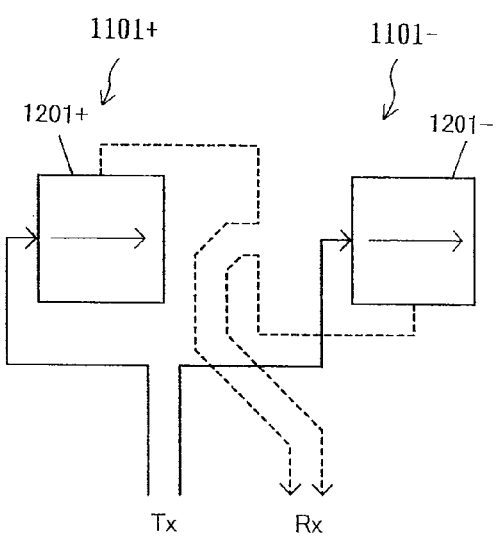

FIG. 15(*a*) shows another configuration example of the antennas 1101+ and 1101−.

In FIG. 15(*a*), the same components as those shown in FIG. 14 are given the same symbols, and a description thereof will be omitted.

Next, the operation of the antenna apparatus of the present invention will be described further in detail by using FIGS. 15B and 15C.

FIG. 15(*b*) shows the operation of the antennas 1101+ and 1101− on reception. The signals in the receive frequency band are received as the receiving signals in the polarized wave vertical to the direction in which the antenna elements 1201+ and 1201− are in line from the positions of the feeding points 1202+ and 1202−. And the excitation direction of the antenna elements 1201+ and 1201− becomes parallel to the polarized wave. In this case, the reversed-phase signals are outputted from the feeding points 1202+ and 1202−, and the differential signals are conveyed to the duplexer 1102 and the receiving circuit 103 via the feeder lines 1204+ and 1204−.

FIG. 15(*c*) shows the operation of the antennas 1101+ and 1101− on transmission. The in-phase transmitting signals are inputted to the feeding points 1203+ and 1203− from the transmitting circuit 204 and the duplexer 1102 via the feeder lines 1205+ and 1205−. In this case, the antenna elements 1201+ and 1201− are excited in-phase. The transmitting signals are sent in a horizontal polarized wave from the positions of the feeding points 1203+ and 1203− in the direction in which the antenna elements 1201+ and 1201− are in line.

It is possible, by having such a configuration, to implement the antenna apparatus of receiving the differential signals and sending the in-phase signals. In this case, the polarized waves of the differential signals are vertical and those of the in-phase signals are horizontal.

Figure 16:
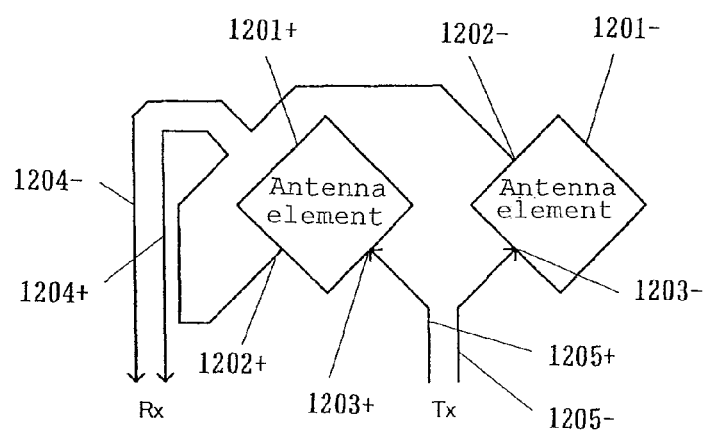
FIG. 16(a) is a diagram showing a configuration example of the antenna of the radio communication apparatus according to the third embodiment of the present invention.
FIG. 16(b) is a diagram showing a configuration example of the antenna of the radio communication apparatus according to the third embodiment of the present invention.
FIG. 16(c) is a diagram showing a configuration example of the antenna of the radio communication apparatus according to the third embodiment of the present invention.
Figure 16:
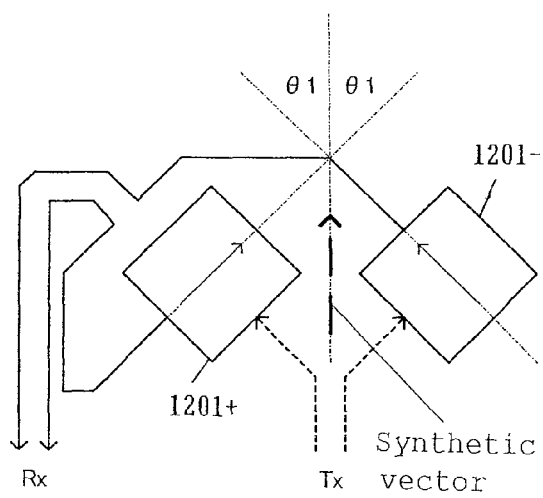
Figure 16:
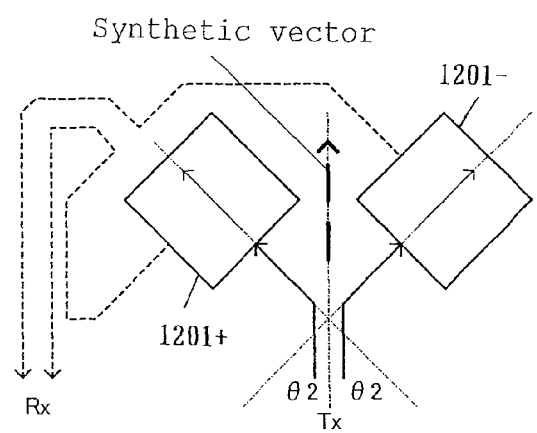

FIG. 16(*a*) shows another configuration example of the antennas 1101+ and 1101−.

In FIG. 16, the same components as those shown in FIG. 14 are given the same symbols, and a description thereof will be omitted.

Next, the operation of the antenna apparatus of the present invention will be described further in detail by using FIGS. 16B and 16C.

FIG. 16(*b*) shows the operation of the antennas 1101+ and 1101− on reception. The signals in the receive frequency band in the polarized wave vertical to the direction in which the antenna elements 1201+ and 1201− are in line are decomposed into the signals of which excitation direction is inclined by $\theta_1$ to the right and the signals of which excitation direction is inclined by $\theta_1$ to the left from the positions of the feeding points 1202+ and 1202− to the direction of the polarized wave, and are received by the antenna elements 1201+ and 1201−. In this case, the reversed-phase signals are outputted from the feeding points 1202+ and 1202−, and the differential signals are conveyed to the duplexer 1102 and the receiving circuit 103 via the feeder lines 1204+ and 1204−.

FIG. 16(*c*) shows the operation of the antennas 1101+ and 1101− on transmission. The in-phase transmitting signals are inputted to the feeding points 1203+ and 1203− from the transmitting circuit 204 and the duplexer 1102 via the feeder lines 1205+ and 1205−. In this case, the transmitting signals are sent in a vertical polarized wave from the positions of the feeding points 1203+ and 1203− in the direction in which the antenna elements 1201+ and 1201− are in line. To be more precise, the excitation directions of the antenna elements 1201+ and 1201− are the direction inclined by $\theta_2$ to the right and the direction inclined by $\theta_2$ to the left to their respective polarized wave directions, and a synthetic vector thereof is the polarized wave direction.

It is possible, by having such a configuration, to implement the antenna apparatus of receiving the differential signals and sending the in-phase signals. In this case, both the polarized waves of the differential signals and in-phase signals are vertical.

It is desirable that $\theta_1$ and $\theta_2$ are 45 degrees.

It is also possible to use plane array antennas other than the patch antennas as the antenna elements 1201+ and 1201−.

It is also possible to have the configuration in which input impedance of the feeding points 1202+ and 1202− are different form the input impedance of the feeding points 1203+ and 1203−. It is possible, by having such a configuration, to reduce the transmitting signal leak from the transmitting circuit 204 to the receiving circuit 103.

It is also possible, with the antenna apparatus comprising the above-mentioned antennas 1101+ and 1101−, to output the receiving signals as the differential signals without using the phase shifter 905 and so on.

Fourth Embodiment

Figure 17:
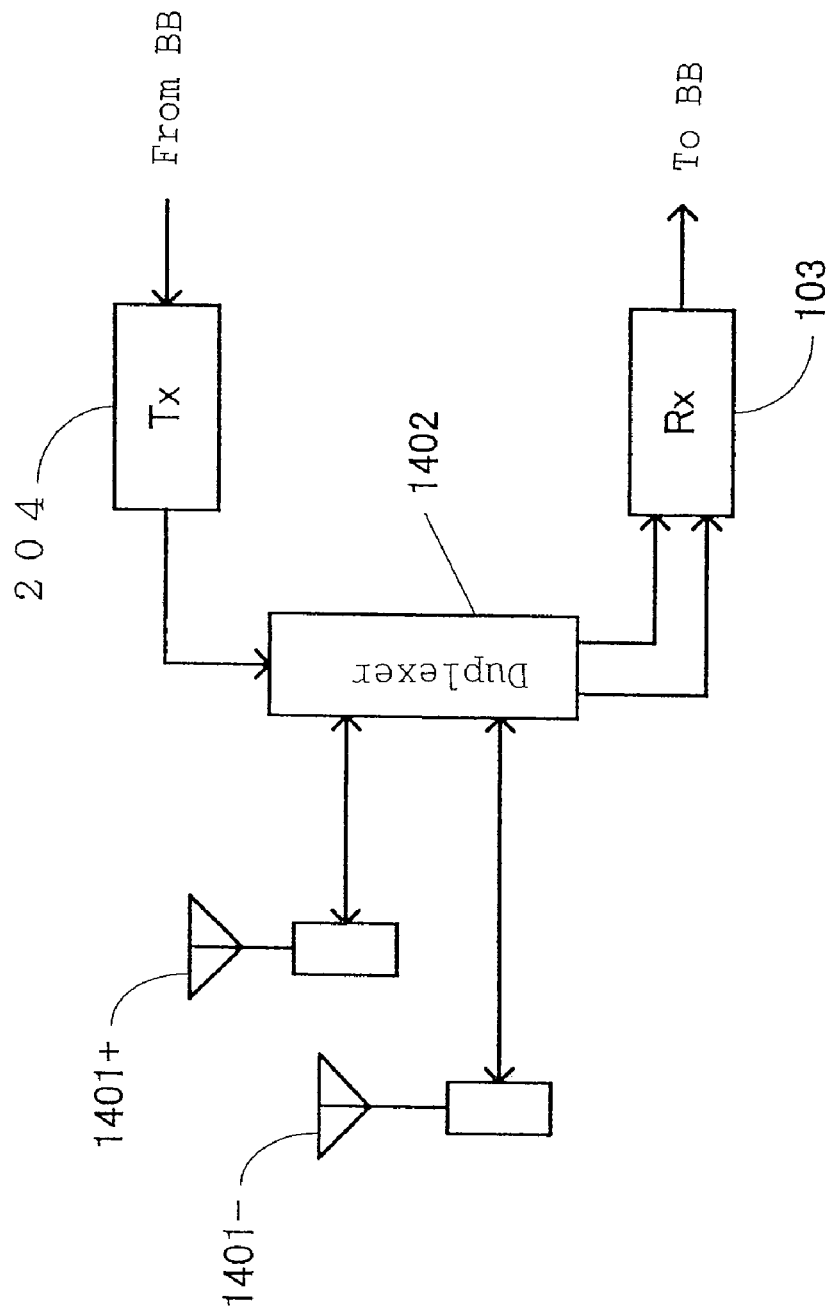
FIG. 17 is a diagram showing the configuration of the radio communication apparatus according to a fourth embodiment of the present invention.

FIG. 17 is a circuit diagram of the radio communication apparatus related to a third embodiment of the present invention. In FIG. 17, the same components as those shown in FIG. 1 are given the same symbols, and a description thereof will be omitted. In FIG. 17, antenna 1401+ is another example of said one antenna of the present invention and antenna 1401− is another example of said another antenna thereof which are described in the third embodiment. A duplexer 1402 is another example of the duplexer of the present invention in which the transmission input terminal is the single-phase input type, the receiving output terminal is the balanced output type, and the antenna input-output terminal is the balanced input-output type.

As for the radio communication apparatus shown in FIG. 17, the radio frequency signal transmitted from the base station is received by the antennas 1401+ and 1401− as in FIG. 1 and is then inputted to the duplexer 1402. Furthermore, the signal outputted from the duplexer 1402 is inputted to the receiving circuit 103, where it is converted into the base band signal. The predetermined signal processing is performed to the transmitting base band signal and then it is inputted to the transmitting circuit 104, where it is converted into the radio frequency and amplified to the predetermined sending power to be inputted to the duplexer 1402. Furthermore, it is constituted so that this signal is outputted from the duplexer 1402 to be sent to the base station from the antennas 1401+ and 1401−. And a part of the transmitting signal inputted to the duplexer 1402 leaks to the receiving circuit 103.

The operation of the radio communication apparatus according to the fourth embodiment of the present invention will be described further in detail. The desired receiving signal received by the antennas 1401+ and 1401− is inputted as the differential signal to the duplexer 1402, and is further inputted to the receiving circuit 103. On the other hand, the transmitting signal outputted from the transmitting circuit 204 is outputted as the in-phase signal from the duplexer 1402 to the antennas 1401+ and 1401−, and a part of it leaks as the in-phase signal from the duplexer 1402 to the receiving circuit 103. Here, the circuit configuration of a high common mode rejection ratio (CMRR) is used as the receiving circuit 103, and in particular as the low-noise amplifier 105, the inter-stage filter 106 and the down mixer 107. Consequently, it is possible to reduce the gain of the transmitting signal leak which is the in-phase signal compared to the gain of the receiving signal as the differential signal in the low-noise amplifier 105 and the down mixer 107 of the receiving circuit 103. It is also possible, with the inter-stage filter 106, to significantly attenuate the transmitting signal leak which is the in-phase signal compared to the single-phase filter.

Thus, the radio communication apparatus shown in FIG. 17 uses the circuit configuration in which the receiving signal is inputted as the differential signal to the receiving circuit 103 and the transmitting signal leak is inputted as the in-phase signal to the receiving circuit 103. And the circuit of a high common mode rejection ratio is used as the receiving circuit 103 so as to reduce the deterioration of the reception on simultaneous transmission and reception without increasing the current consumption in the receiving circuit 103. Thus, it is also possible to reduce the attenuation amount of the frequency band of the transmitting signal of the duplexer 1402 and consequently reduce the size of the duplexer 1402.

The radio communication apparatus according to the fourth embodiment of the present invention has noise in the frequency band of the receiving signals outputted from the transmitting circuit 204 inputted as the in-phase signals to the receiving circuit 103. For that reason, it is possible to reduce the gain of the transmitting signal leak as the in-phase signal compared to the gain of the receiving signal as the differential signal so as to reduce the deterioration of the reception due to the noise from the transmitting circuit 204.

Thus, the radio communication apparatus shown in FIG. 17 uses the circuit configuration in which the receiving signal is inputted as the differential signal to the receiving circuit 103 and the transmitting signal leak is inputted as the in-phase signal to the receiving circuit 103 so that the circuit of a high common mode rejection ratio is used as the receiving circuit 103 so as to reduce the deterioration of the reception due to the noise from the transmitting circuit 204. Thus, it is thereby possible to reduce the attenuation amount of the frequency band of the receiving signals from the transmitting circuit 204 to the antennas 1401+ and 1401− in the duplexer 1402 and consequently reduce the size of the duplexer 1402.

In the case where the common mode rejection ratio between the low-noise amplifier 105 and down mixer 107 is sufficiently high in the receiving circuit 103, it is possible to constitute it without using the inter-stage filter 106. In this case, the inter-stage filter 106 which is difficult to render as the IC is not used, and so it becomes easier to render the radio ICs as one chip so as to allow miniaturization of the radio portion. This configuration is especially effective in the case of the direct conversion method.

FIG. 18(a) shows a configuration example of the antennas 1401+ and 1401−.

In FIG. 18(a), reference numerals 1501+ and 1501− are the antenna elements, 1502+, 1502− are the feeding points for the receiving signals and transmitting signals, and 1503+, 1503− are the feeding lines for the receiving signals and transmitting signals. The receiving signals received by the antenna elements 1501+ and 1501− are inputted to the duplexer 1402 from the feeding points 1502+ and 1502− via the feeder lines 1503+ and 1503−. The transmitting signals outputted from the duplexer 1402 are inputted to the antenna elements 1501+ and 1501− from the feeding points 1502+ and 1502− via the feeder lines 1503+ and 1503−.

Next, the operation of the antenna apparatus of the present invention will be described further in detail by using FIGS. 18(b) and 18(c).

FIG. 18(b) shows the operation of the antennas 1401+ and 1401− on reception. In the case where the signals in the receive frequency band are received as the receiving signals in the polarized wave parallel to the direction in which the antenna elements 1501+ and 1501− are in line, the excitation direction of the antenna elements 1501+ and 1501− becomes parallel to the polarized wave. And the reversed-phase signals are outputted from the feeding points 1502+ and 1502−, and the differential signals are conveyed to the duplexer 1402 and the receiving circuit 103 via the feeder lines 1504+ and 1504−. In the case where the signals in the receive frequency band are received as the receiving signals in the polarized wave vertical to the direction in which the antenna elements 1501+ and 1501− are in line, they are conveyed as the in-phase signals to the receiving circuit 103 based on the same manner so as to be attenuated in the receiving circuit 103.

FIG. 18(c) shows the operation of the antennas 1401+ and 1401− on transmission. The in-phase transmitting signals are inputted to the feeding points 1502+ and 1502− from the transmitting circuit 204 and the duplexer 1402 via the feeder lines 1503+ and 1503−. In this case, the antenna elements 1501+ and 1501− are excited in-phase. The transmitting signals are sent from the positions of the feeding points 1502+ and 1502− in a polarized wave vertical to the direction in which the antenna elements 1501+ and 1501− are in line. On the other hand, the polarized waves which are horizontal to the direction in which the antenna elements 1501+ and 1501− are in line are mutually cancelled. The first and third feeding points of the present invention are corresponding to the feeding point 1502– as an example, and the second and fourth feeding points of the present invention are corresponding to the feeding point 1502+ as an example.

It is possible, by having such a configuration, to implement the antenna apparatus of receiving the differential signals and sending the in-phase signals. In this case, the polarized waves of the differential signals are horizontal and those of the in-phase signals are vertical. Furthermore, it is possible to share the feeding points and feeding lines between the receiving signals and the transmitting signals so as to reduce the required space of the feeding lines.

Figure 19:
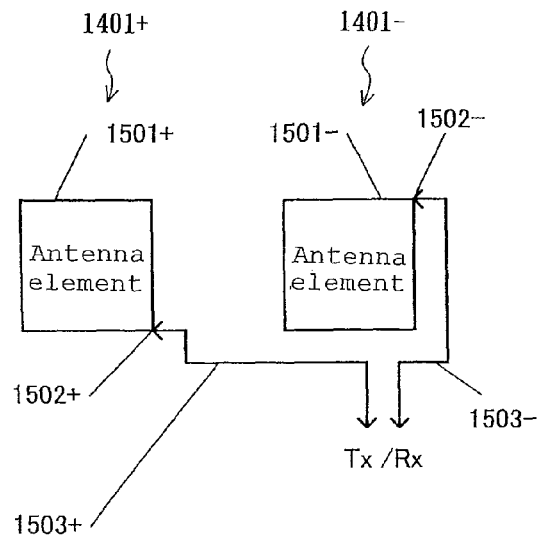
FIG. 19(a) is a diagram showing a configuration example of the antenna of the radio communication apparatus according to the fourth embodiment of the present invention.
FIG. 19(b) is a diagram showing a configuration example of the antenna of the radio communication apparatus according to the fourth embodiment of the present invention.
FIG. 19(c) is a diagram showing a configuration example of the antenna of the radio communication apparatus according to the fourth embodiment of the present invention.
Figure 19:
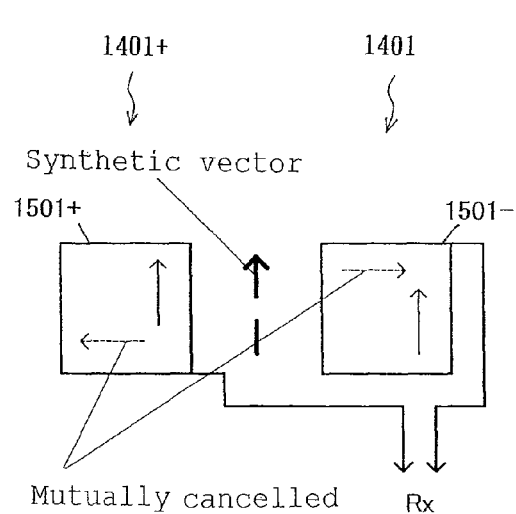
Figure 19:
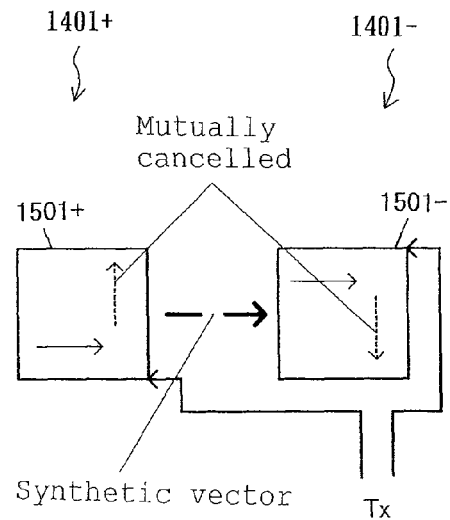

FIG. 19(*a*) shows another configuration example of the antennas 1401+ and 1401–.

Figure 18:
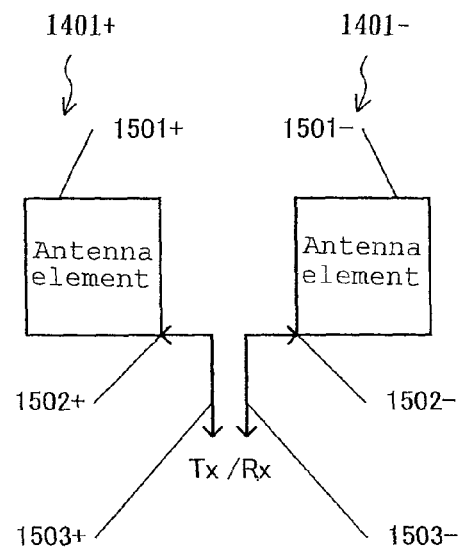
FIG. 18(a) is a diagram showing a configuration example of the antenna of the radio communication apparatus according to the fourth embodiment of the present invention.
FIG. 18(b) is a diagram showing a configuration example of the antenna of the radio communication apparatus according to the fourth embodiment of the present invention.
FIG. 18(c) is a diagram showing a configuration example of the antenna of the radio communication apparatus according to the fourth embodiment of the present invention.
Figure 18:
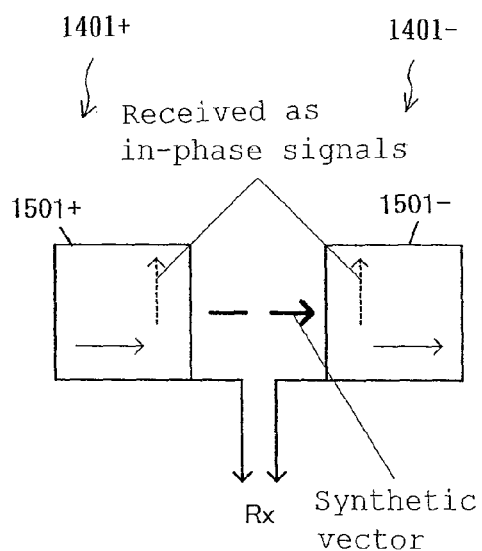
Figure 18:
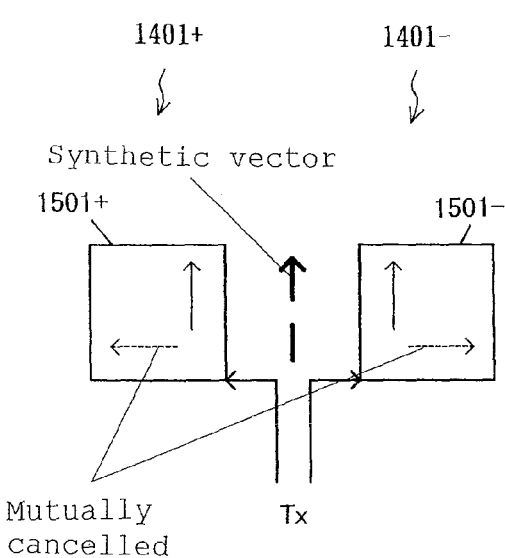

In FIG. 19(*a*), the same components as those shown in FIG. 18 are given the same symbols, and a description thereof will be omitted.

In FIGS. 19(*b*) and 19(*c*), the receiving signals are excited almost vertically to the direction in which the antenna elements 1501+ and 1501– are in line. The receiving signals of the antenna element 1501– are excited in an opposite direction to the receiving signals of the antenna element 1501+. The transmitting signals are excited almost horizontally to the direction in which the antenna elements 1501+ and 1501– are in line. The transmitting signals of the antenna element 1501– are excited in the same direction as the transmitting signals of the antenna element 1501+.

It is possible, by having such a configuration, to implement the antenna apparatus of receiving the differential signals and sending the in-phase signals. In this case, the polarized waves of the differential signals are vertical and those of the in-phase signals are horizontal. Furthermore, it is possible to share the feeding points and feeding lines between the receiving signals and the transmitting signals so as to reduce required space of the feeding lines.

Figure 29:
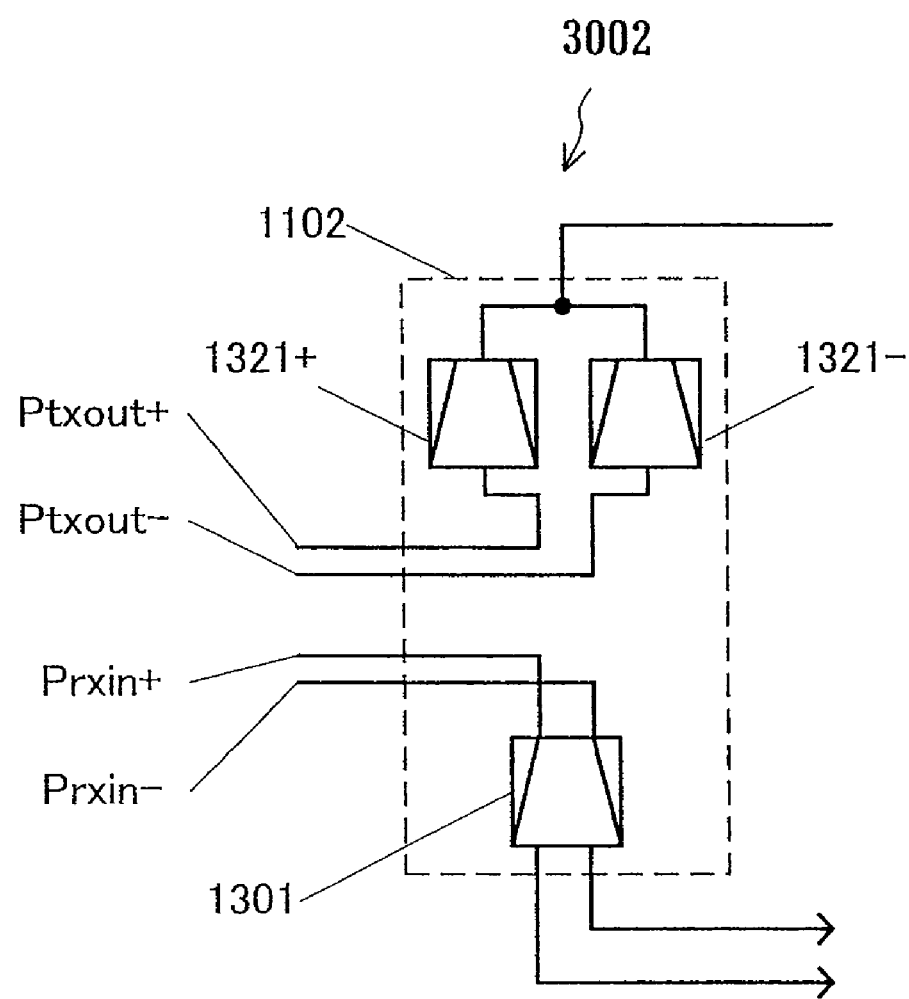
FIG. 29 is a diagram showing a configuration example of the duplexer of the radio communication apparatus according to the ninth embodiment of the present invention.

As for the duplexer 1402, it is also possible to use the configuration in which Prxin+ and Ptxout+, and Prxin– and Ptxout– in FIGS. 29, 30A and 30B are connected respectively.

It is also possible to use the low-noise amplifier 105 shown in FIG. 5, the filter shown in FIG. 8 and the down mixer 107 shown in FIG. 10 in the receiving circuit 103.

Fifth Embodiment

Figure 20:
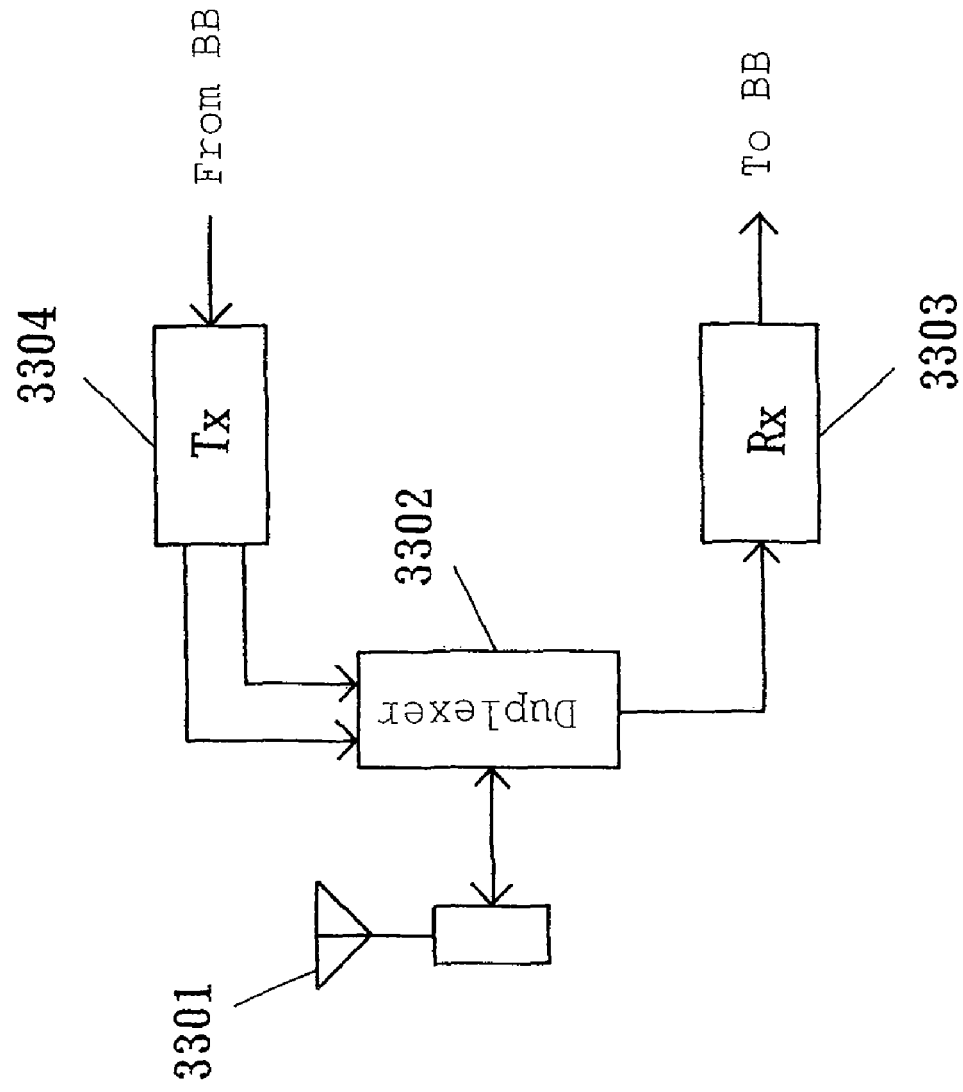
FIG. 20 is a diagram showing the configuration of the radio communication apparatus according to a fifth embodiment of the present invention.
Figure 24:
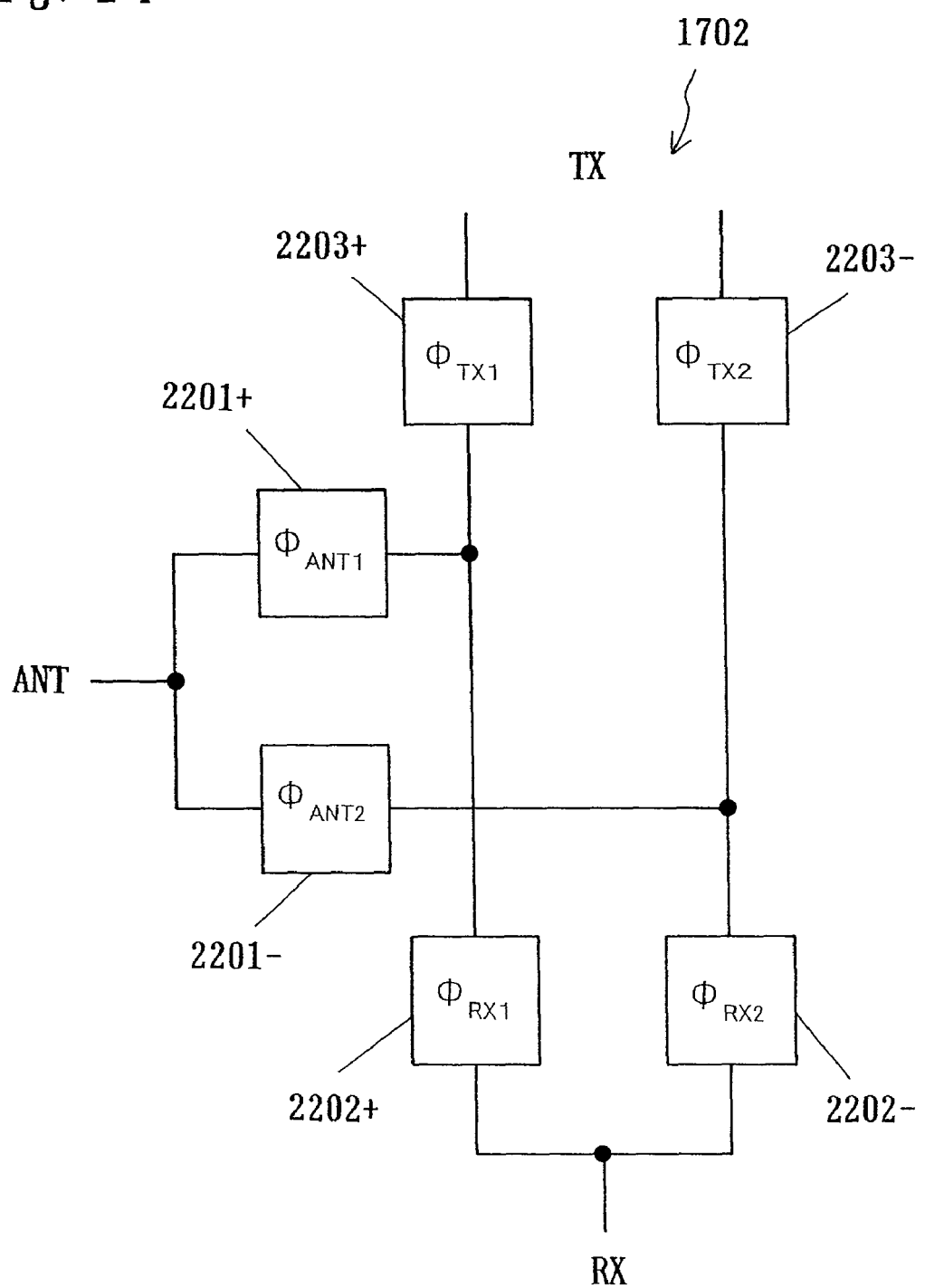
FIG. 24 is a diagram showing the configuration of the duplexer of the radio communication apparatus according to the fifth embodiment of the present invention.

FIG. 20 is a circuit diagram of the radio communication apparatus related to a fifth embodiment of the present invention. In FIG. 20, an antenna 3301 is a single-phase input-output antenna corresponding to the antenna of the present invention described in the first embodiment as another example, a duplexer 3302 is corresponding to the duplexer of the present invention as an example, and its transmission input terminal is the balanced input type, its antenna input-output terminal is the single-phase input-output type, and its receiving output terminal is the single-phase output type. A receiving circuit 3303 has an input terminal of the single-phase type, and a transmitting circuit 3304 has as an output terminal of the balanced type and outputs differential transmitting signals. FIG. 24 shows a configuration example of the duplexer 3302.

In FIG. 24, a phase shifter 2201+ is corresponding to a first phase shifter of the present invention, a phase shifter 2201– is corresponding to a second phase shifter of the present invention, a phase shifter 2202+ is corresponding to a third phase shifter of the present invention, a phase shifter 2202– is corresponding to a fourth phase shifter of the present invention, a phase shifter 2203+ is corresponding to a fifth phase shifter of the present invention, and a phase shifter 2203– is corresponding to a sixth phase shifter of the present invention.

The receiving signal received by the antenna 3301 is inputted to the receiving circuit 3303 via the phase shifters 2201+, 2201– and the phase shifters 2202+, 2202– respectively. The transmitting signal outputted from the transmitting circuit 3304 is inputted to the antenna 3301 via the phase shifters 2203+, 2203– and the phase shifters 2201+, 2201– respectively.

Next, the operation of the duplexer 3302 will be described further in detail. If phase-change amounts of the phase shifters 2201+, 2201–, 2202+, 2202–, 2203+ and 2203– are $\Phi_{ANT1}$, $\Phi_{ANT2}$, $\Phi_{RX1}$, $\Phi_{RX2}$, $\Phi_{TX1}$ and $\Phi_{TX2}$ respectively, the phase-change amounts are in the following relationship.

(Formula 4)

$$\Phi_{ANT1} - \Phi_{ANT2} = -90 \text{ deg.} \quad (4)$$

$$\Phi_{RX1} - \Phi_{RX2} = 90 \text{ deg.} \quad (5)$$

$$\Phi_{TX1} - \Phi_{TX2} = -90 \text{ deg.} \quad (6)$$

Thus, a single-phase receiving signal received by the antenna 3301 is inputted as the single-phase signal to the receiving circuit 3303. The differential transmitting signal outputted from the transmitting circuit 3304 is also inputted as the single-phase signal to the antenna 3301. Furthermore, the differential transmitting signal outputted from the transmitting circuit 3304 is cancelled before being inputted to the receiving circuit 3303.

Thus, the radio communication apparatus shown in FIG. 20 can reduce the deterioration of the reception on simultaneous transmission and reception without increasing the current consumption in the receiving circuit 3303 by using the circuit configuration in which the receiving signal is inputted as the single-phase signal to the receiving circuit 3303 and the transmitting signal is inputted as the differential signal to the duplexer 3302. It can also reduce the deterioration of the reception due to the noise from the transmitting circuit 3304.

In the case where the common mode rejection ratio between the low-noise amplifier 105 and the down mixer 107 is sufficiently high in the receiving circuit 3303, it may be a configuration without using the inter-stage filter 106. In this case, the inter-stage filter 106 which is difficult to render as the IC is not used, and so it becomes easier to render the radio ICs as one chip so as to allow the miniaturization of the radio portion. This configuration is especially effective in the case of the direct conversion method.

The radio communication apparatus according to the fifth embodiment of the present invention has the noise in the frequency band of the receiving signals outputted from the transmitting circuit 3304 mutually cancelled in single-phase receiving output of the duplexer 3302. For that reason, it can reduce the deterioration of the reception due to the noise from the transmitting circuit 3304.

It is also possible to use the filter satisfying a phase relationship of (4) to (6) instead of the phase shifters 2201+, 2201–, 2202+, 2202–, 2203+ and 2203–.

Figure 21:
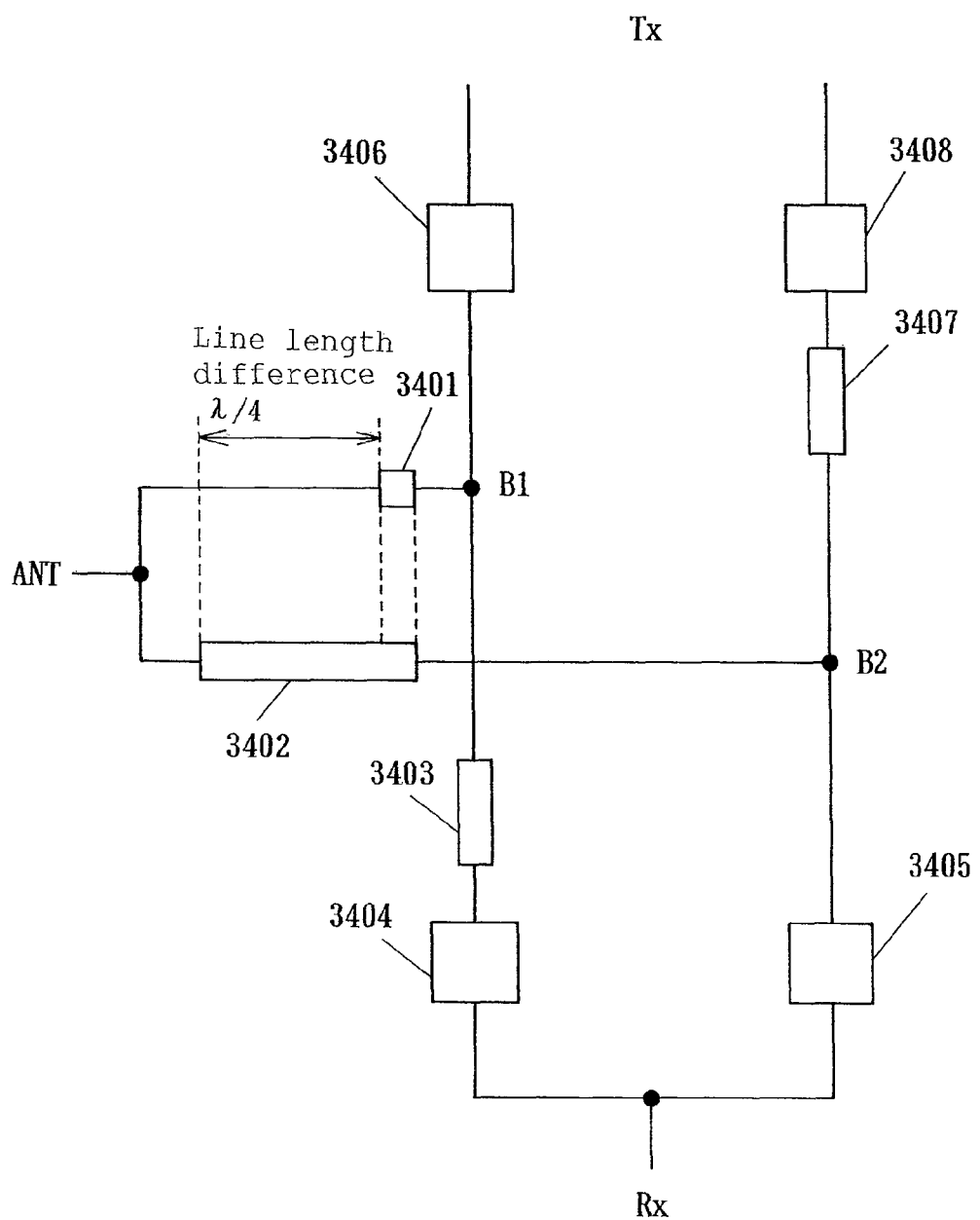
FIG. 21 is a diagram showing a configuration example of a duplexer of the radio communication apparatus according to the fifth embodiment of the present invention.

The configuration shown in FIG. 21 may also be used to concretely implement the circuit in FIG. 24. In FIG. 21, lines 3401 and 3402 are corresponding to the phase shifters 2201+ and 2201– in FIG. 24 respectively, and the difference in line length between the lines 3401 and 3402 is a ¼ wavelength. A line 3403 is a ¼-wavelength line, and a band pass filter 3404 has a sufficiently low impedance for the signal in the transmit frequency band and has the characteristic of passing the signal in the receive frequency band. The line 3403 and band pass filter 3404 are corresponding to the phase shifter 2202+ shown in FIG. 24. A band pass filter 3405 has a sufficiently high impedance for the signal in the transmit frequency band and has the characteristic of passing the signal in the receive frequency band. The band pass filter 3405 is corresponding to the phase shifter 2202– shown in FIG. 24. A band pass filter 3406 has a sufficiently high impedance for the signal in the receive frequency band and has the characteristic of passing the signal in the transmit frequency band. The band pass filter 3406 is corresponding to the phase shifter 2203+ shown in FIG. 24. A band pass filter 3408 has a sufficiently low impedance for the signal in the receive frequency band and has the characteristic of passing the signal in the transmit frequency band. A line 3407 is a ¼ wavelength line. The band pass filter 3408 and line 3407 are corresponding to the phase shifter 2203– shown in FIG. 24.

The circuit of such a configuration is used so that the impedance on the receiving circuit 3303 side in the transmit frequency band viewed from nodes B1 and B2 becomes sufficiently high and the loss of the signals sent from the transmitting circuit 3304 to the antenna 3301 is reduced. Furthermore, the impedance on the transmitting circuit 3304 side in the receive frequency band viewed from nodes B1 and B2 becomes sufficiently high and the loss of the signals received from the antenna 3301 to the receiving circuit 3303 is reduced.

Sixth Embodiment

Figure 22:
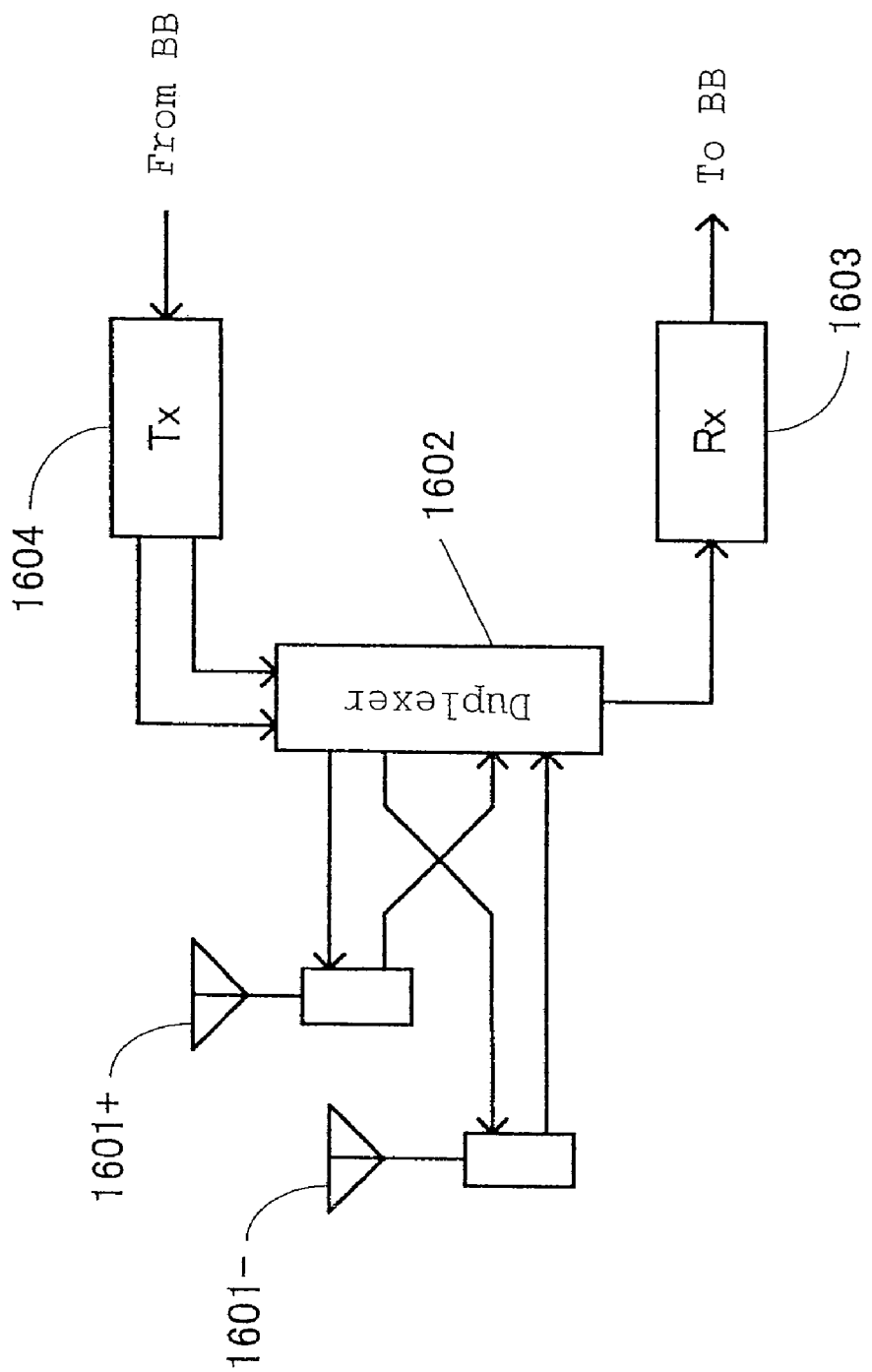
FIG. 22 is a diagram showing the configuration of the radio communication apparatus according to a sixth embodiment of the present invention.

FIG. 22 is the circuit diagram of the radio communication apparatus related to a sixth embodiment of the present invention. In FIG. 22, antenna 1601+ is an example of one antenna of the present invention, antenna 1601– is an example of another antenna of the present invention. A duplexer 1602 is an example of a duplexer of the present invention comprising separate terminals, that is, the receiving output terminal is the single-phase output type, the transmission input terminal is the balanced input type, and the antenna input-output terminal is the balanced input-output type.

As for the radio communication apparatus shown in FIG. 22, the radio frequency signal transmitted from the base station is received by the antennas 1601+ and 1601– as in FIG. 1 and is then inputted to the duplexer 1602. Furthermore, the signal outputted from the duplexer 1602 is inputted to the receiving circuit 1603 as an example of a receiving apparatus of the present invention connected to said single-phase output terminal, where it is converted into the base band signal. The predetermined signal processing is performed to the transmitting base band signal and then it is inputted to a transmitting circuit 1604 as an example of a third transmitting apparatus of the present invention of outputting a transmitting signal as a differential signal, where it is converted into the radio frequency and amplified to the predetermined sending power to be inputted to the duplexer 1602. Furthermore, it is constituted so that this signal is outputted from the duplexer 1602 to be sent to the base station from the antennas 1601+ and 1601–. And a part of the transmitting signal inputted to the duplexer 1602 leaks to the receiving circuit 1603.

The operation of the radio communication apparatus according to the sixth embodiment of the present invention will be described further in detail. The desired receiving signal received by the antennas 1601+ and 1601– is inputted as the in-phase signal to the duplexer 1602, where it becomes the single-phase signal and is inputted to the receiving circuit 1603. On the other hand, the transmitting signal outputted from the transmitting circuit 1604 is outputted as the differential signal from the duplexer 1602 to the antennas 1601+ and 1601–. Here, the transmitting signals are the differential signals and are mutually cancelled in the single-phase receiving output so that the transmitting signal leak from the duplexer 1602 can be attenuated compared to the case of the single-phase signal.

Thus, the radio communication apparatus shown in FIG. 22 uses the circuit configuration in which the receiving signal is inputted as the single-phase signal to the receiving circuit 1603 and the transmitting signal is inputted as the differential signal to the duplexer 1602. It can thereby reduce the deterioration of the reception on simultaneous transmission and reception without increasing the current consumption in the receiving circuit 1603.

The radio communication apparatus according to the sixth embodiment of the present invention has the noise in the frequency band of the receiving signals outputted from the transmitting circuit 1604 mutually cancelled in the single-phase receiving output of the duplexer 1602. For that reason, it can reduce the deterioration of the reception due to the noise from the transmitting circuit 1604.

Thus, the radio communication apparatus shown in FIG. 22 uses the circuit configuration in which the receiving signal is inputted as the single-phase signal to the receiving circuit 1603 and the transmitting signal is inputted as the differential signal to the duplexer 1602 so as to reduce the deterioration of the reception due to the noise from the transmitting circuit 1604.

In the case where the common mode rejection ratio of the low-noise amplifier 105 and the down mixer 107 is sufficiently high in the receiving circuit 1603, it is possible to constitute it without using the inter-stage filter 106. In this case, the inter-stage filter 106 which is difficult to render as the IC is not used, and so it becomes easier to render the radio ICs as one chip so as to allow miniaturization of the radio portion. This configuration is especially effective in the case of the direct conversion method.

It is also possible to use the configuration in which, as to the antennas shown as the antennas 1601+ and 1601– in FIG. 16, the receiving output thereof is transmission input and the transmission input thereof is the receiving output.

Figure 30:
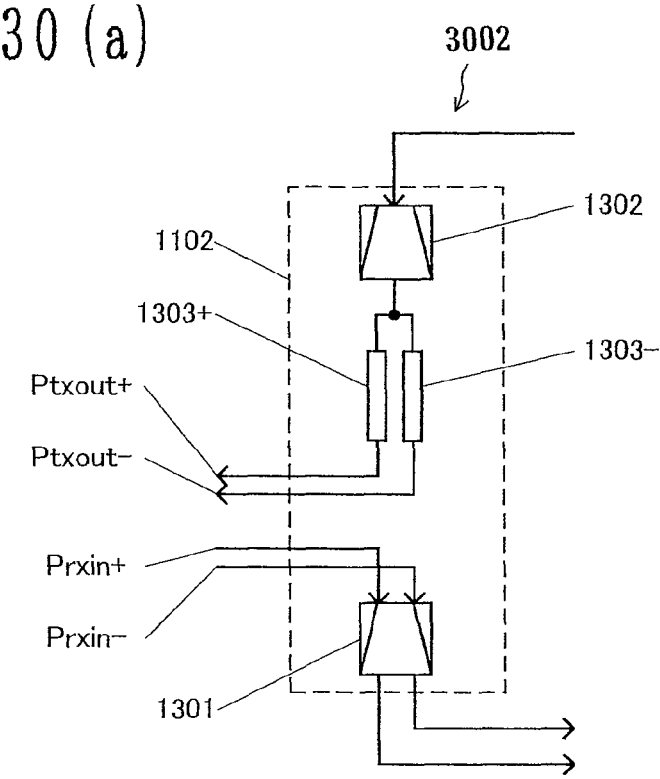
FIG. 30(a) is a diagram showing a configuration example of the duplexer of the radio communication apparatus according to the ninth embodiment of the present invention.
FIG. 30(b) is a diagram showing a configuration example of the duplexer of the radio communication apparatus according to the ninth embodiment of the present invention.
Figure 30:
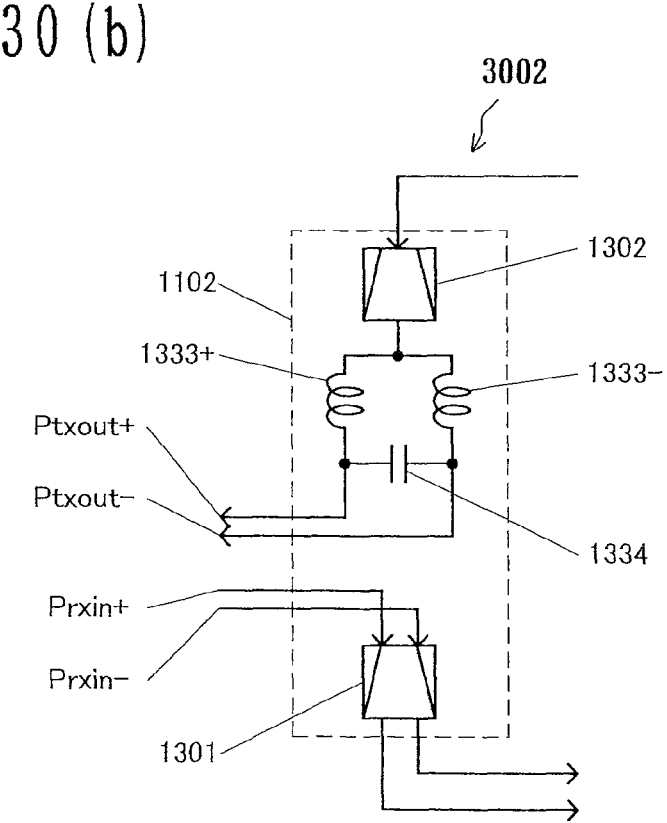
Figure 31:
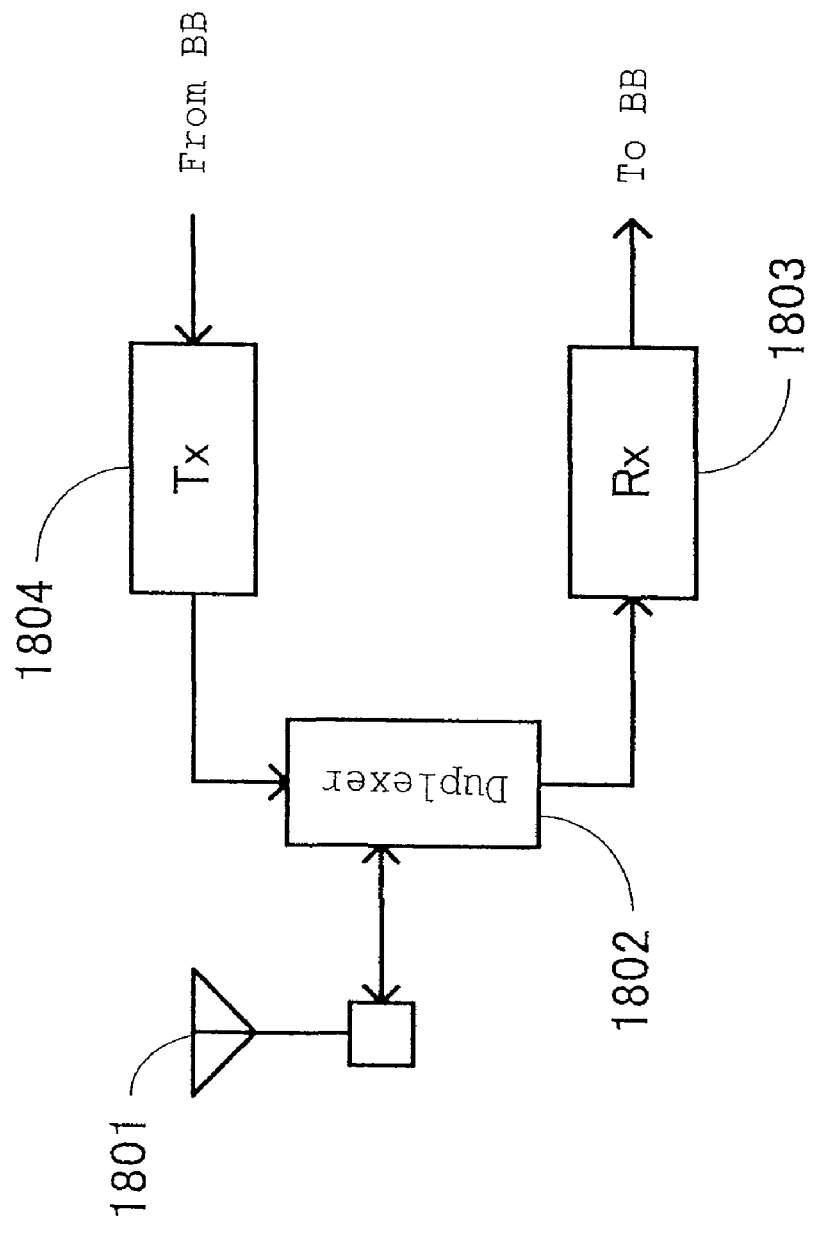
FIG. 31 is a diagram showing the configuration of the radio communication apparatus in the prior art.
Figure 32:
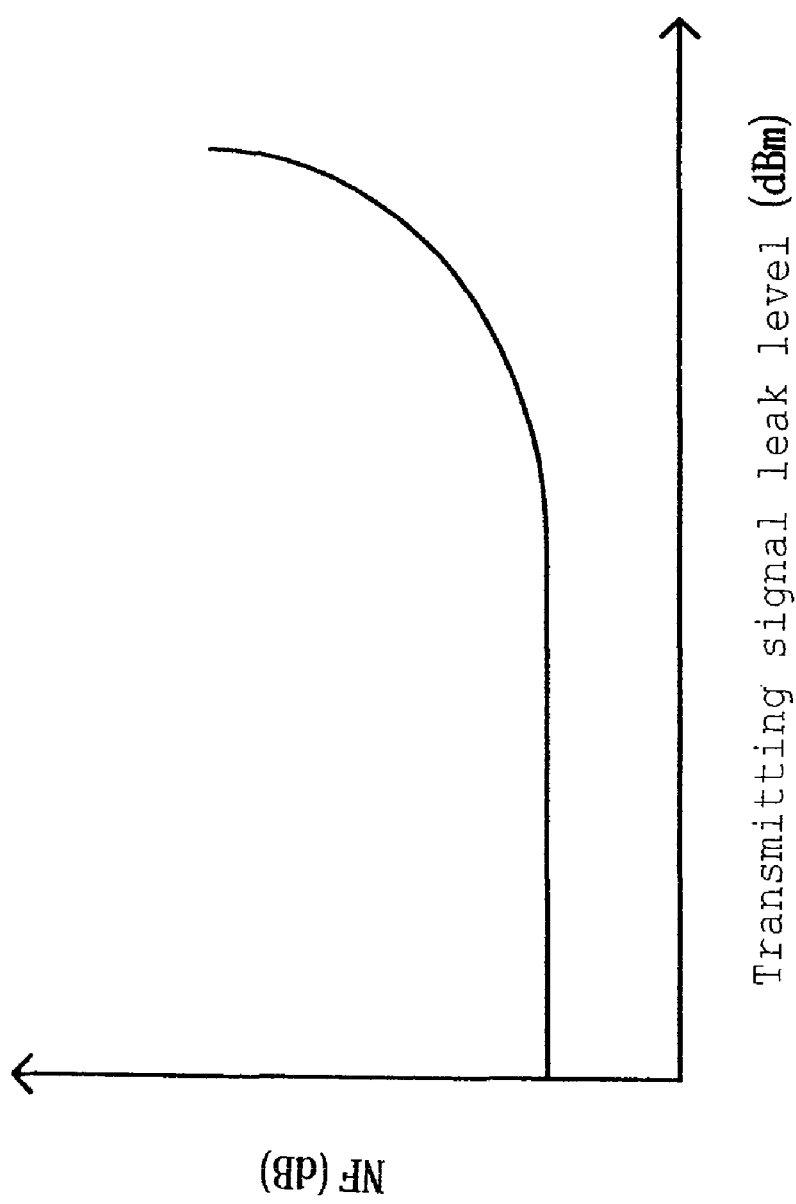
FIG. 32 is a diagram showing the relationship between a transmission jammer leak level and a noise figure of the low-noise amplifier of the radio communication apparatus in the prior art.
Figure 33:
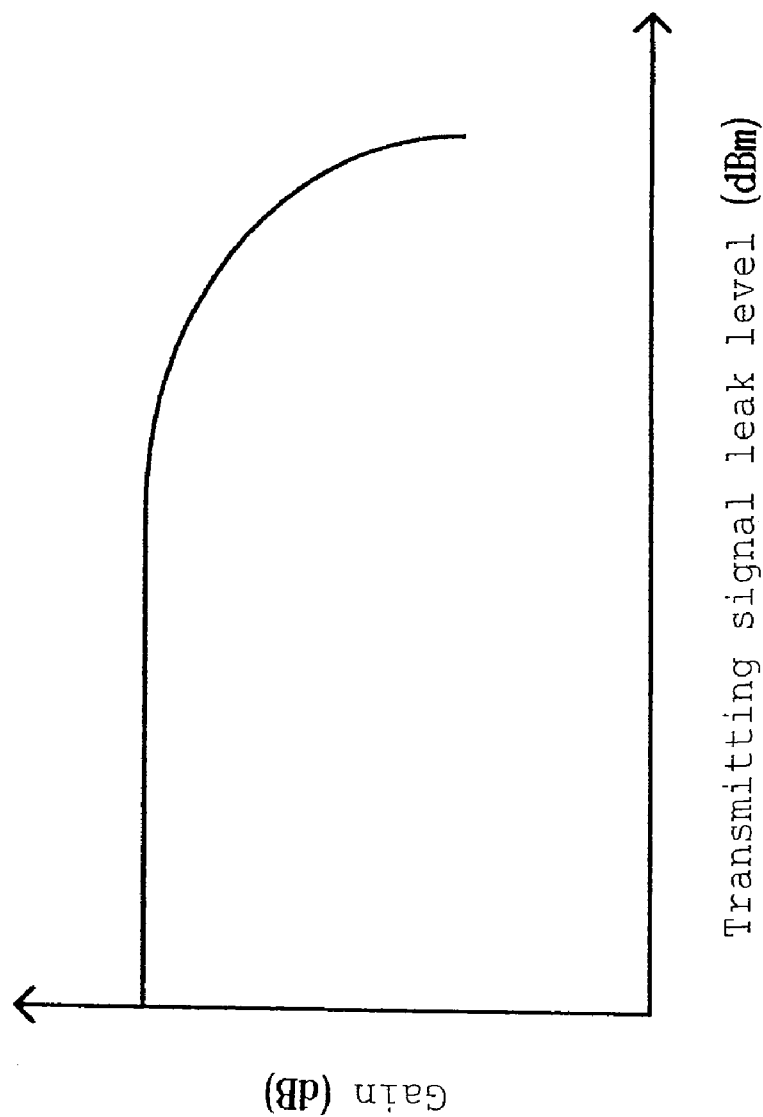
FIG. 33 is a diagram showing the relationship between the transmission jammer leak level and a gain of the low-noise amplifier of the radio communication apparatus in the prior art.
Figure 34:
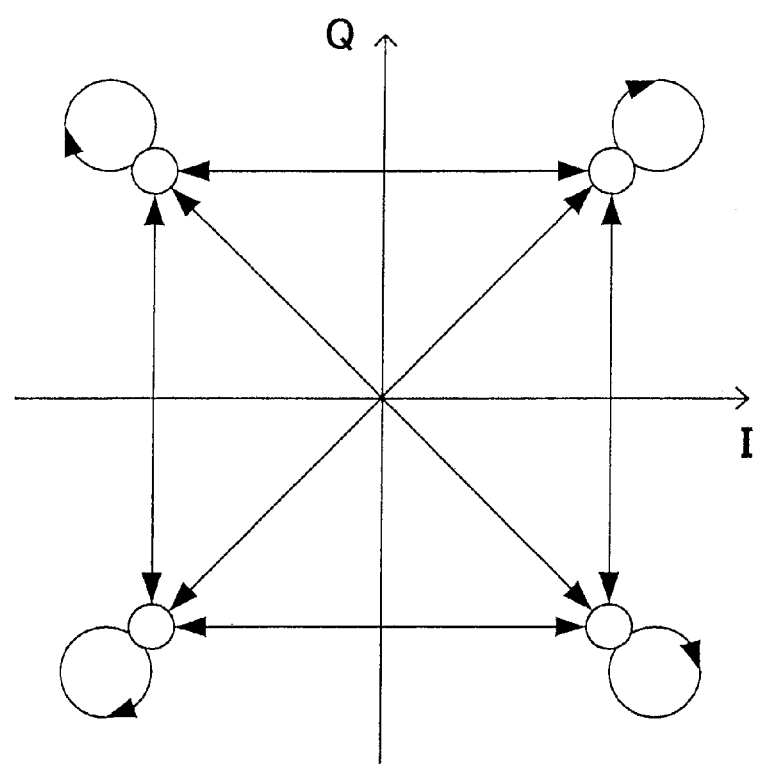
FIG. 34 is a diagram showing phase transition of a QPSK modulated wave of the radio communication apparatus in the prior art.
Figure 35:
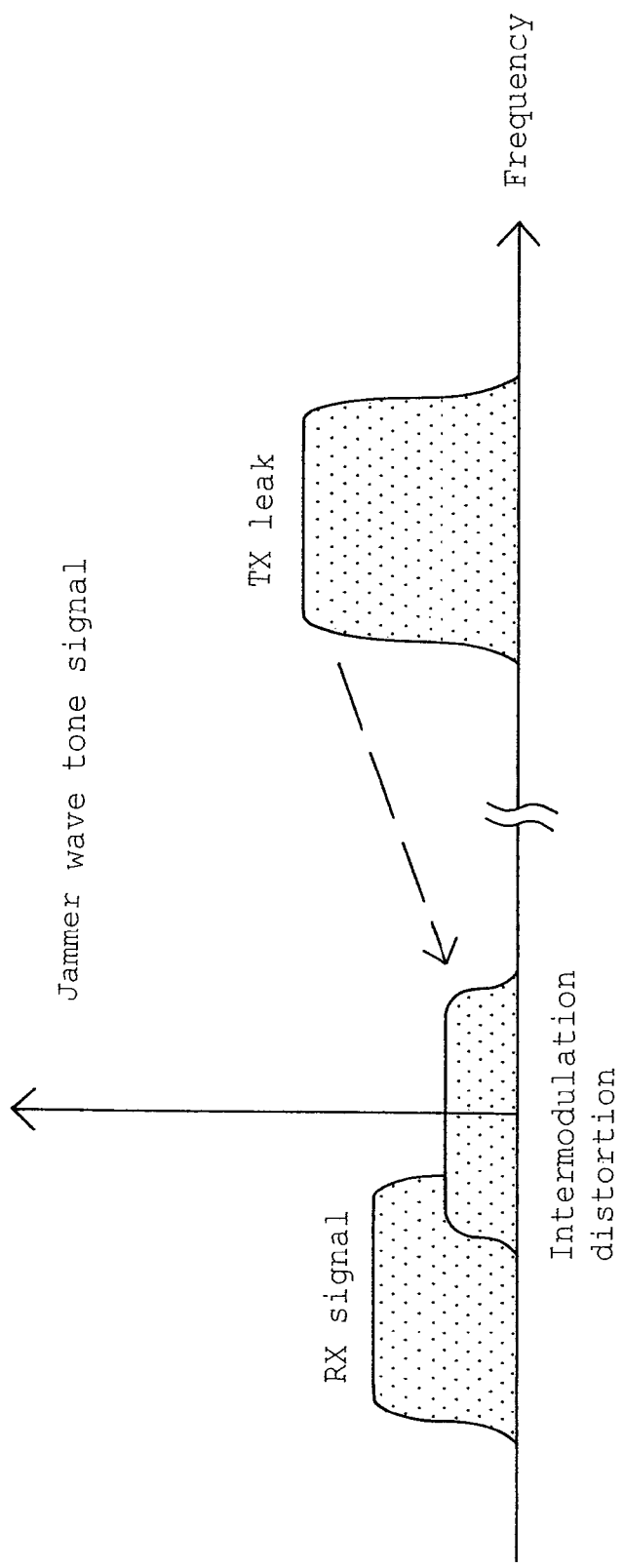
FIG. 35 is a diagram showing a mechanism of intermodulation jamming due to a high-power modulation jammer of the radio communication apparatus in the prior art.

It is also possible to use the configuration in which, as to the duplexer 1602, the receiving output thereof shown in FIGS. 29 and 30 is the transmission input and the transmission input thereof is the receiving output.

Seventh Embodiment

Figure 23:
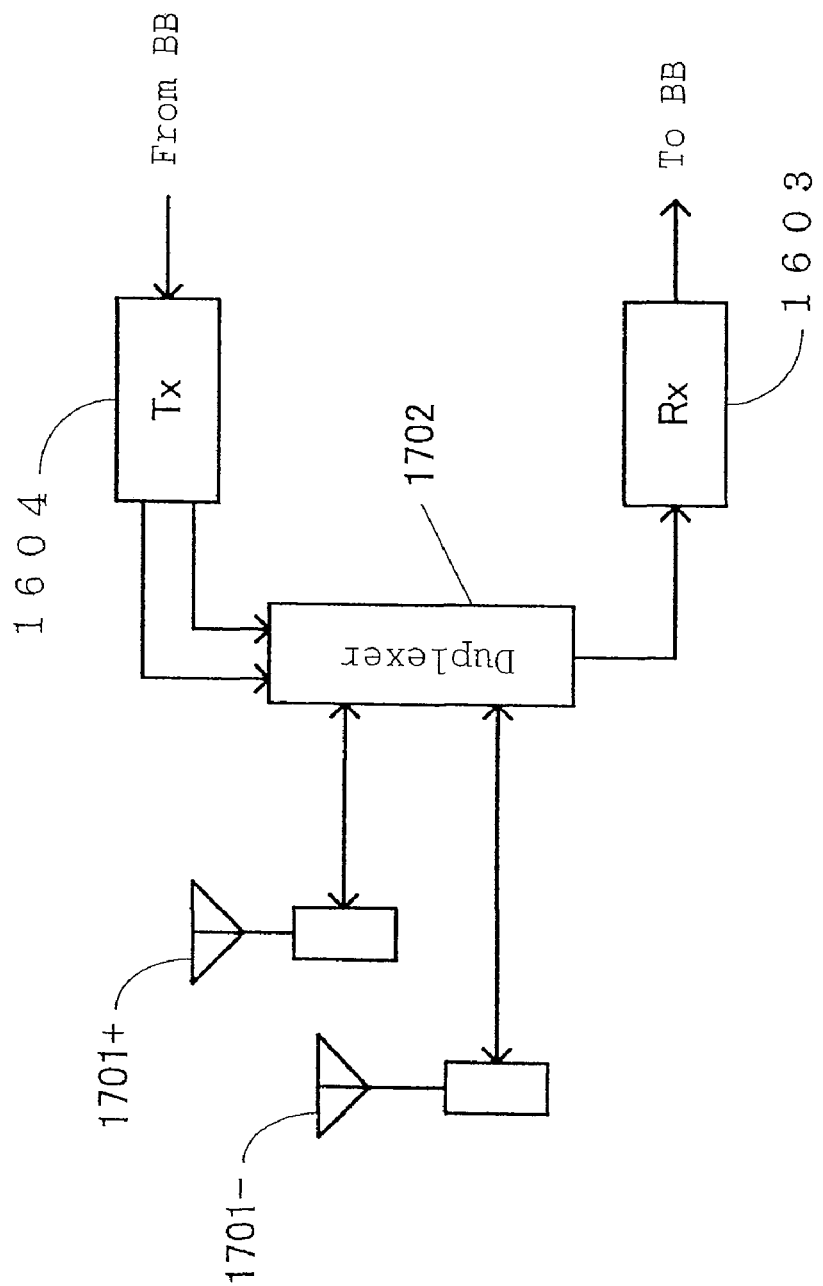
FIG. 23 is a diagram showing the configuration of the radio communication apparatus according to a seventh embodiment of the present invention.

FIG. 23 is a circuit diagram of the radio communication apparatus related to a seventh embodiment of the present invention. In FIG. 23, the same components as those shown in FIG. 22 are given the same symbols, and a description thereof will be omitted. In FIG. 23, antenna 1701+ is another example of said one antenna of the present invention and antenna 1701– is another example of said another antenna thereof. A duplexer 1702 is another example of the duplexer of the present invention in which the transmission input terminal is the single-phase input type, the receiving output terminal is the balanced output type, and the antenna input-output terminal is the balanced input-output type.

As for the radio communication apparatus shown in FIG. 23, the radio frequency signal transmitted from the base station is received by the antennas 1701+ and 1701– as in FIG. 1 and is then inputted to the duplexer 1702. Furthermore, the signal outputted from the duplexer 1702 is inputted to the receiving circuit 1603, where it is converted into the base band signal. The predetermined signal processing is performed to the transmitting base band signal and then it is inputted to the transmitting circuit 1604, where it is converted into the radio frequency and amplified to the predetermined sending power to be inputted to the duplexer 1702. Furthermore, it is constituted so that this signal is outputted from the duplexer 1702 to be sent to the base station from the antennas 1701+ and 1701−.

The operation of the radio communication apparatus according to the seventh embodiment of the present invention will be described further in detail. The desired receiving signal received by the antennas 1701+ and 1701− is inputted as the in-phase signal to the duplexer 1702, where it becomes the single-phase signal and is inputted to the receiving circuit 1603. On the other hand, the transmitting signal outputted from the transmitting circuit 1604 is outputted as the differential signal from the duplexer 1702 to the antennas 1701+ and 1701−. Here, the transmitting signals are the differential signals and are mutually cancelled in the single-phase receiving output so that the transmitting signal leak from the duplexer 1702 can be attenuated compared to the case of the single-phase signal.

Thus, the radio communication apparatus shown in FIG. 23 uses the circuit configuration in which the receiving signal is inputted as the single-phase signal to the receiving circuit 1603 and the transmitting signal is inputted as the differential signal to the duplexer 1702. It can thereby reduce the deterioration of the reception on simultaneous transmission and reception without increasing the current consumption in the receiving circuit 1603.

In the case where the common mode rejection ratio of the low-noise amplifier 105 and the down mixer 107 is sufficiently high in the receiving circuit 1603, it is possible to constitute it without using the inter-stage filter 106. In this case, the inter-stage filter 106 which is difficult to render as the IC is not used, and so it becomes easier to render the radio ICs as one chip so as to allow miniaturization of the radio portion. This configuration is especially effective in the case of the direct conversion method.

The radio communication apparatus according to the seventh embodiment of the present invention has the noise in the frequency band of the receiving signals outputted from the transmitting circuit 1604 mutually cancelled in the single-phase receiving output of the duplexer 1702. For that reason, it can reduce the deterioration of the reception due to the noise from the transmitting circuit 1604.

Thus, the radio communication apparatus shown in FIG. 23 uses the circuit configuration in which the receiving signal is inputted as the single-phase signal to the receiving circuit 1603 and the transmitting signal is inputted as the differential signal to the duplexer 1702 so as to reduce the deterioration of the reception due to the noise from the transmitting circuit 1604.

It is also possible to use the antennas shown in FIG. 19 as the antennas 1701+ and 1701−.

As for the duplexer 1702, it is also possible to use the configuration in which Prxin+ and Ptxout+, and Prxin− and Ptxout− in FIGS. 29, 30A and 30B are connected respectively, and the receiving output thereof is the transmission input and the transmission input thereof is the receiving output.

Eighth Embodiment

Figure 25:
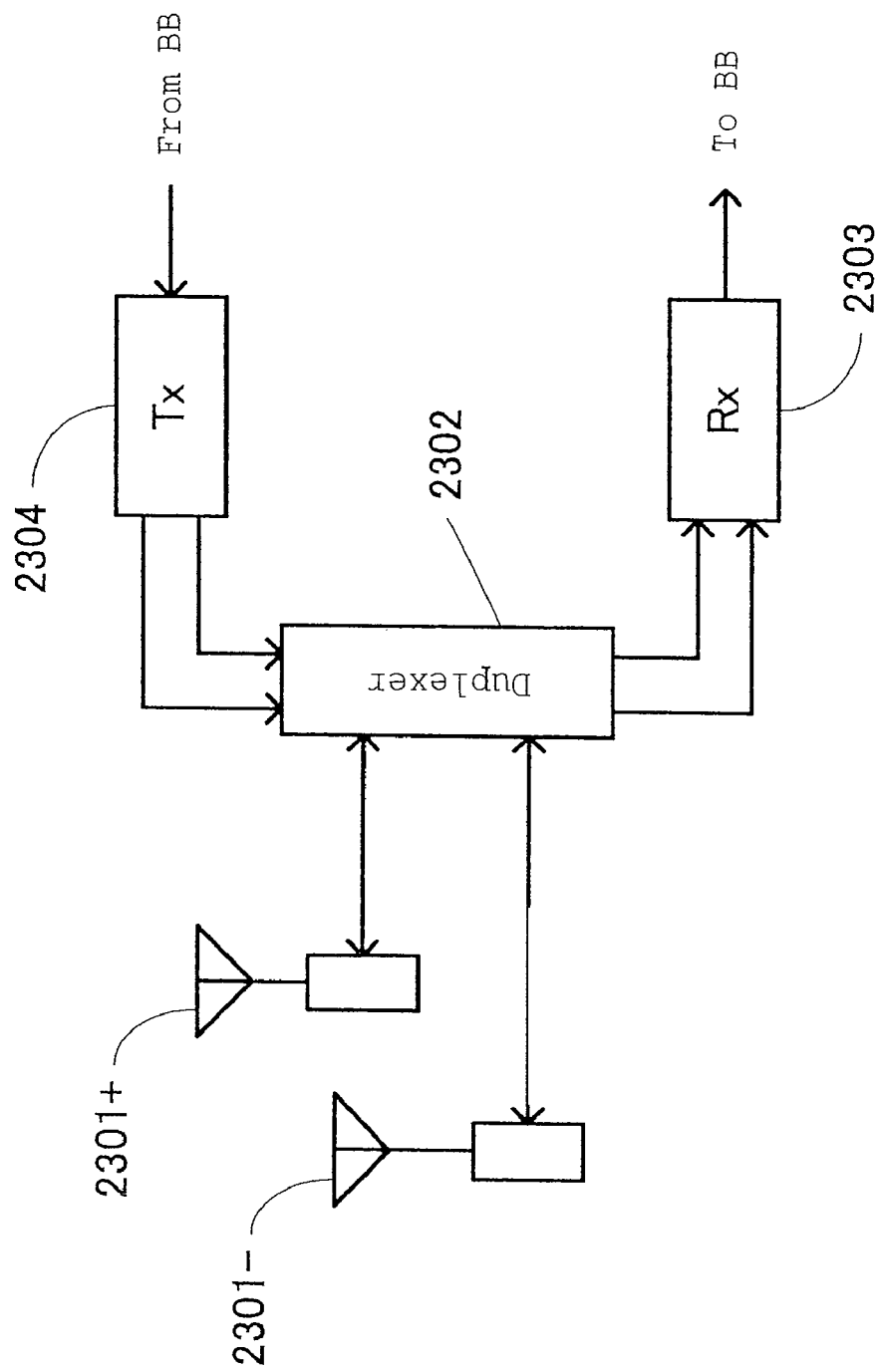
FIG. 25 is a diagram showing the configuration of the radio communication apparatus according to an eighth embodiment of the present invention.

FIG. 25 is a circuit diagram of the radio communication apparatus related to an eighth embodiment of the present invention. In FIG. 25, an antenna 2301+ is an example of one antenna of the present invention and antenna 2301− is an example of another antenna thereof. A duplexer 2302 is an example of the duplexer of the present invention in which the receiving output terminal is the balanced input type, the transmission input terminal is the balanced output type, and the antenna input-output terminal is the balanced input-output type. Reference numeral 2303 denotes the receiving circuit of the differential input as another example of the first receiving apparatus of the present invention described in the first embodiment, and 2304 denotes the transmitting circuit of the differential output as an example of the third transmitting apparatus of the present invention described in the sixth embodiment.

As for the radio communication apparatus shown in FIG. 25, the radio frequency signal transmitted from the base station is received by the antennas 2301+ and 2301− as in FIG. 1 and is then inputted via the duplexer 2302 to the receiving circuit 2303, where it is converted into the base band signal. It is constituted so that the predetermined signal processing is performed to the transmitting base band signal and then it is inputted to the transmitting circuit 2304, where it is converted into the radio frequency and amplified to the predetermined sending power to be sent to the base station from the antennas 2301 via the duplexer 2302. A part of the transmitting signal inputted to the duplexer 2302 leaks to the receiving circuit 2303.

The operation of the radio communication apparatus according to the eighth embodiment of the present invention will be described further in detail. The desired receiving signal received by the antennas 2301+ and 2301− is inputted as the differential signal to the duplexer 2302, and is further inputted to the receiving circuit 2303. On the other hand, the transmitting signal outputted from the transmitting circuit 2304 is outputted as the differential signal from the duplexer 2302 to the antennas 2301+ and 2301−, and a part of it leaks as the in-phase signals from the duplexer 2302 to the receiving circuit 2303. Here, the circuit configuration of a high common mode rejection ratio (CMRR) is used as the receiving circuit 2303, and in particular as a low-noise amplifier 105, an inter-stage filter 106 and a down mixer 107. Consequently, it is possible to reduce the gain of the transmitting signal leak which is the in-phase signal compared to the gain of the receiving signal as the differential signal in the low-noise amplifier 105 and down mixer 107 of the receiving circuit 2303. It is also possible, with the inter-stage filter 106, to significantly attenuate the transmitting signal leak which is the in-phase signal compared to the single-phase filter.

Thus, the radio communication apparatus shown in FIG. 25 uses the circuit configuration in which the receiving signal is inputted as the differential signal to the receiving circuit 2303 and the transmitting signal leak is inputted as the in-phase signal to the receiving circuit 2303. And the circuit of a high common mode rejection ratio is used as the receiving circuit 2303 so as to reduce the deterioration of the reception on simultaneous transmission and reception without increasing the current consumption in the receiving circuit 2303.

In the case where the common mode rejection ratio of the low-noise amplifier 105 and the down mixer 107 is sufficiently high in the receiving circuit 2303, it is possible to constitute it without using the inter-stage filter 106. In this case, the inter-stage filter 106 which is difficult to render as the IC is not used, and so it becomes easier to render the radio ICs as one chip so as to allow the miniaturization of the radio portion. This configuration is especially effective in the case of the direct conversion method.

Figure 26:
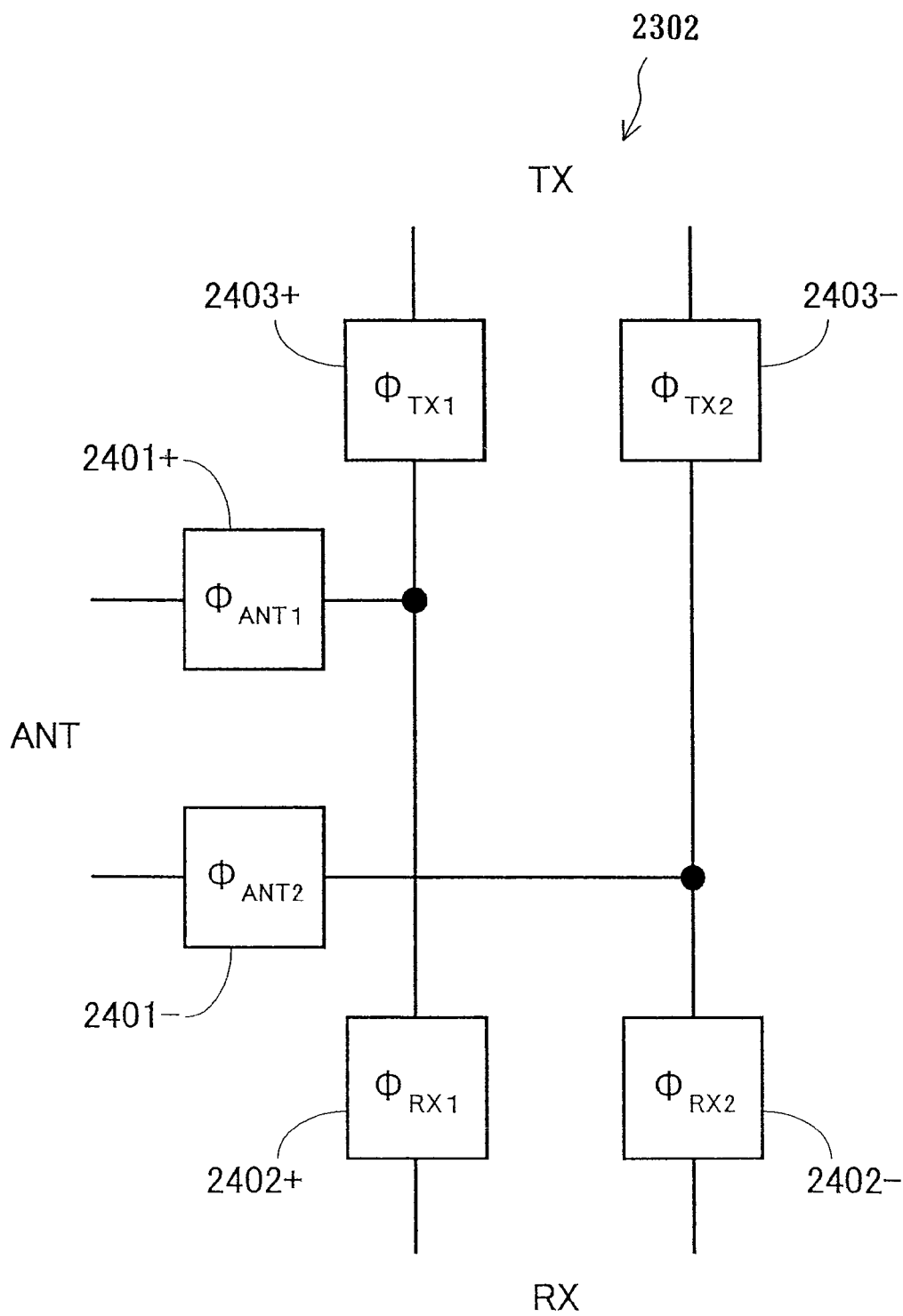
FIG. 26 is a diagram showing a configuration example of the duplexer of the radio communication apparatus according to the eighth embodiment of the present invention.

FIG. 26 shows a configuration example of the duplexer 2302.

In FIG. 26, a phase shifter 2401+ is corresponding to a first phase shifter of the present invention, a phase shifter 2401− is corresponding to a second phase shifter of the present invention, a phase shifter 2402+ is corresponding to a third phase shifter of the present invention, a phase shifter 2402− is corresponding to a fourth phase shifter of the present invention, a phase shifter 2403+ is corresponding to a fifth phase shifter of the present invention, and a phase shifter 2403− is corresponding to a sixth phase shifter of the present invention.

The receiving signal received by the antennas 2301+ and 2301− is inputted to the receiving circuit 2303 via the phase shifters 2401+, 2401− and the phase shifters 2402+, 2402− respectively. The transmitting signal outputted from the transmitting circuit 2304 is inputted to the antennas 2301+ and 2301− via the phase shifters 2403+, 2403− and 2401+, 2401− respectively.

Next, the operation of the duplexer of the present invention will be described further in detail. If the phase-change amounts of the phase shifters 2401+, 2401−, 2402+, 2402−, 2403+ and 2403− are $\Phi_{ANT1}$, $\Phi_{ANT2}$, $\Phi_{RX1}$, $\Phi_{RX2}$, $\Phi_{TX1}$ and $\Phi_{TX2}$, the phase-change amounts are in the following relationship.

(Formula 5)

$$\Phi_{ANT1} - \Phi_{ANT2} = -90 \text{ deg.} \quad (7)$$

$$\Phi_{RX1} - \Phi_{RX2} = 90 \text{ deg.} \quad (8)$$

$$\Phi_{TX1} - \Phi_{TX2} = 90 \text{ deg.} \quad (9)$$

Thus, the differential receiving signal received by the antennas 2301+ and 2301− is inputted as the differential signal to the receiving circuit 2303. The differential transmitting signal outputted from the transmitting circuit 2304 is also inputted as the differential signal to the antennas 2301+ and 2301−. Furthermore, the differential transmitting signal outputted from the transmitting circuit 2304 is inputted as the in-phase signal to the receiving circuit 2303.

It is possible, by having such a configuration, to implement the duplexer of outputting the signal received from the antenna as the differential signal to the receiving circuit and outputting the output signal leak of the transmitting circuit as the in-phase signal to the receiving circuit. Consequently, it is possible to reduce the deterioration of the reception on simultaneous transmission and reception.

Figure 27:
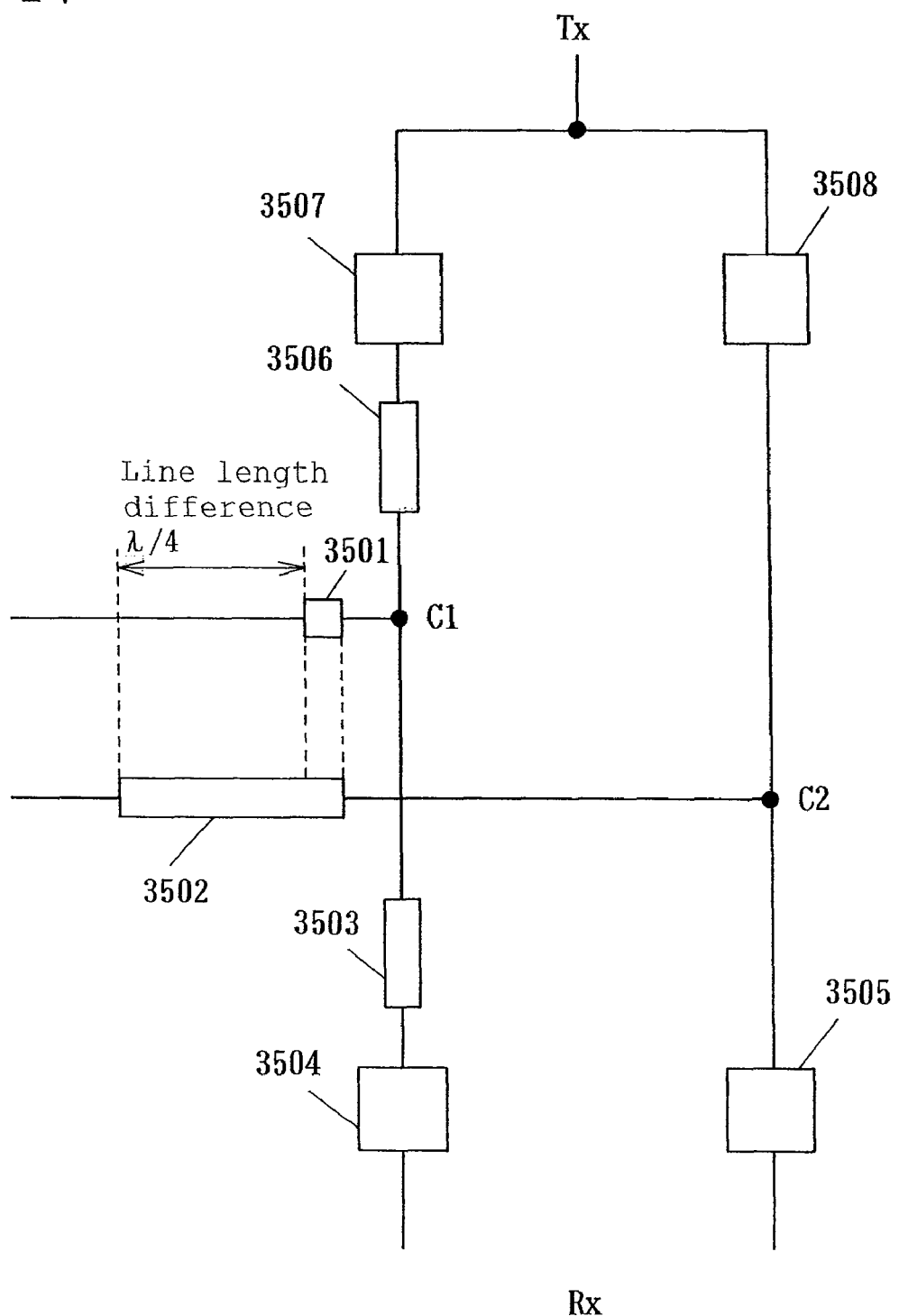
FIG. 27 is a diagram showing the configuration of the duplexer of the radio communication apparatus according to the eighth embodiment of the present invention.

The configuration shown in FIG. 27 may also be used to concretely implement the circuit in FIG. 26. In FIG. 27, lines 3501 and 3502 are corresponding to the phase shifters 2401+ and 2401− in FIG. 26 respectively, and the difference in line length between the lines 3501 and 3502 is a ¼ wavelength. A line 3503 is a ¼-wavelength line, and a band pass filter 3504 has a sufficiently low impedance for the signal in the transmit frequency band and has the characteristic of passing the signal in the receive frequency band. The line 3503 and the band pass filter 3504 are corresponding to the phase shifter 2402+ shown in FIG. 26. A band pass filter 3505 has a sufficiently high impedance for the signal in the transmit frequency band and has the characteristic of passing the signal in the receive frequency band. The band pass filter 3505 is corresponding to the phase shifter 2402− shown in FIG. 26. A line 3506 is a ¼-wavelength line, and a band pass filter 3507 has a sufficiently low impedance for the signal in the receive frequency band and has the characteristic of passing the signal in the transmit frequency band. The line 3506 and the band pass filter 3507 are corresponding to the phase shifter 2403+ shown in FIG. 26. A band pass filter 3508 has a sufficiently high impedance for the signal in the receive frequency band and has the characteristic of passing the signal in the transmit frequency band. The band pass filter 3508 is corresponding to the phase shifter 2403− shown in FIG. 26.

The circuit of such a configuration is used so that the impedance on the receiving circuit 2303 side in the transmit frequency band viewed from nodes C1 and C2 becomes sufficiently high and the loss of the signals sent from the transmitting circuit 2304 to the antennas 2301+ and 2301− is reduced. Furthermore, the impedance on the transmitting circuit 2304 side in the receive frequency band viewed from the nodes C1 and C2 becomes sufficiently high and the loss of the signals received from the antennas 2301+ and 2301− to the receiving circuit 2303 is reduced.

It is also possible to use the filter satisfying the phase relationship of the formulas (7) to (9) instead of the phase shifters 2401+, 2401−, 2402+, 2402−, 2403+ and 2403−.

It is also possible to use the low-noise amplifier 105 shown in FIG. 5, the filter shown in FIG. 8 and the down mixer 107 shown in FIG. 10 inside the receiving circuit 2303.

Ninth Embodiment

Figure 28:
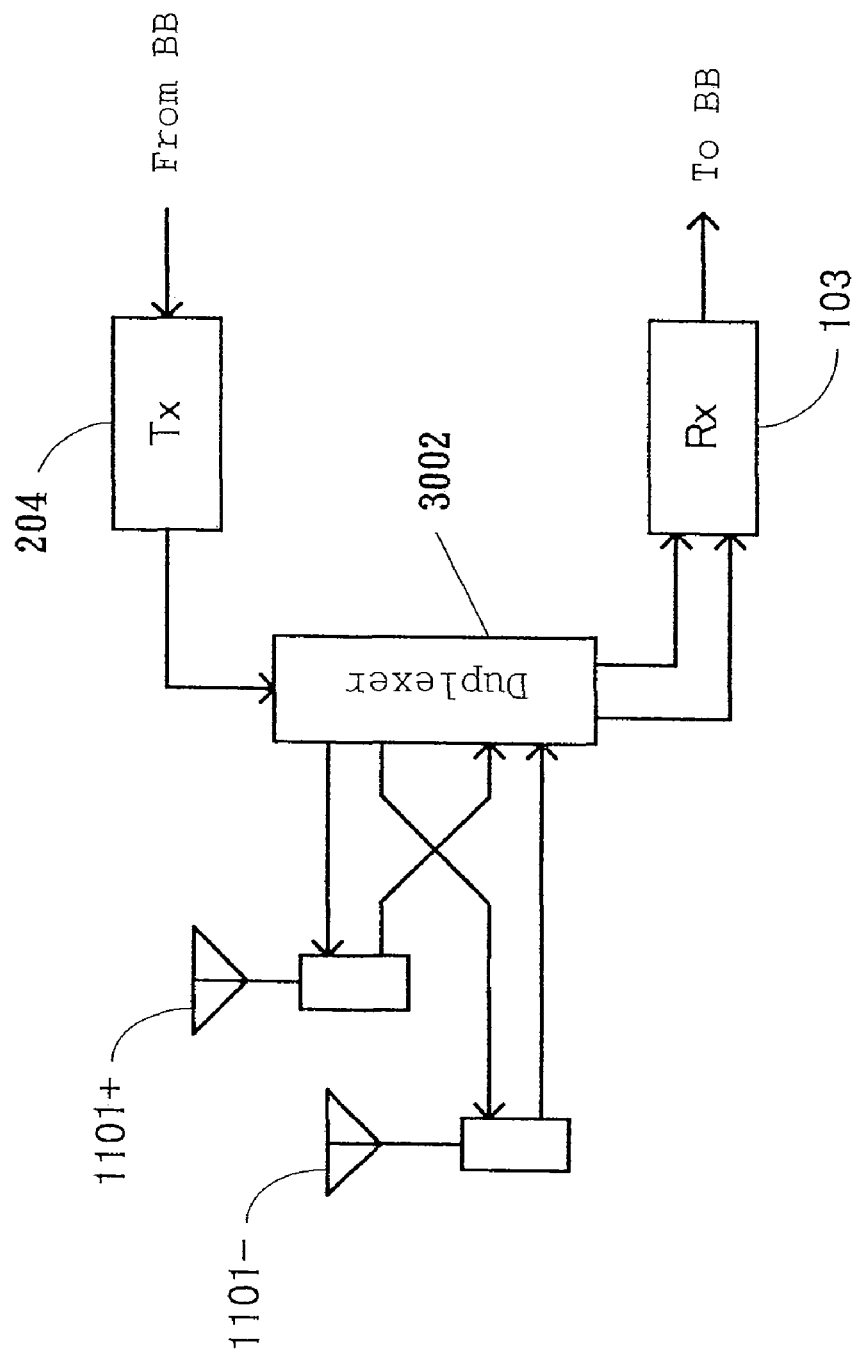
FIG. 28 is a diagram showing the configuration of the radio communication apparatus according to a ninth embodiment of the present invention.

FIG. 28 shows the radio communication apparatus according to a ninth embodiment of the present invention. The radio communication apparatus shown in FIG. 28 has the same configuration as the one shown in FIG. 13 except that a duplexer 3002 is different, and so a description thereof will be omitted.

The duplexer 3002 corresponding to duplexer of the present invention as an example plays a role of reducing the transmitting signal leak to the receiving circuit and also plays a role of preventing deterioration of the noise characteristic of the transmitting signal due to a part of the receiving signal leaking to the transmitting circuit. FIG. 29 shows an example of the configuration of such a duplexer 3002. In FIG. 29, 1321+ and 1321− denote examples of a third band pass filter and a fourth band pass filter of the present invention. The transmitting signals outputted from the transmitting circuit 204 are distributed to the filters 1321+ and 1321−. The transmitting signals outputted from the filters 1321+ and 1321− are inputted to the antennas 1101+ and 1101− respectively.

The filters 1321+ and 1321− selectively pass the signals in the frequency band of the transmitting signals. In this case, the input impedance of the filters 1321+ and 1321− for the differential signals in the frequency band of the receiving signals is sufficiently high compared with the input impedance for the in-phase signals in the frequency band of the transmitting signals.

When sending the transmitting signals from the antennas 1101+ and 1101−, it is possible, by having such a configuration, to implement the duplexer having reduced the loss of the transmitting signals caused by connecting the input nodes Pxrin+ and Pxrin− to the antennas 1101+ and 1101−. Furthermore, it is possible, when receiving the receiving signals with the antennas 1101+ and 1101−, to implement the duplexer having reduced the loss of the receiving signals caused by connecting the output nodes Ptxout+ and Ptxout− to the antennas 1101+ and 1101−.

FIG. 30(a) shows another configuration example of the duplexer 3002. Reference numerals 1301 and 1302 denote the filters, and 1303+ and 1303− denote the ¼-wavelength lines in the frequency band of the receiving signals. The desired receiving signals received by the antennas 1101+ and 1101− are inputted to the receiving circuit 103 via the filter 1301. The transmitting signals outputted from the transmitting circuit 204 are distributed to the ¼-wavelength lines 1303+ and 1303− via the filter 1302. The transmitting signals outputted from the ¼-wavelength lines 1303+ and 1303− are inputted to the antennas 1101+ and 1101− respectively.

As the transmitting signals inputted via the filter 1302 are the in-phase signals, they are outputted from the output nodes Ptxout+ and Ptxout− to the antennas 1101+ and 1101− via the ¼-wavelength lines 1303+ and 1303−.

The receiving signals received by the antennas 1101+ and 1101− are inputted to the receiving circuit from the input nodes Pxrin+ and Pxrin− via the filter 1301, while a part thereof leaks to the output nodes Ptxout+ and Ptxout−. In this case, the receiving signals are the differential signals, and so the connection point between the ¼-wavelength lines 1303+ and 1303− can be regarded as a virtual ground. Furthermore, the length of the ¼-wavelength lines 1303+ and 1303− is a ¼ wavelength of the frequency band of the receiving signals so that the impedance on the transmitting circuit side viewed from the output nodes Ptxout+ and Ptxout− becomes very high and the receiving signal leak to the transmitting circuit 104 is significantly reduced.

It is possible, by having this configuration, to constitute the circuit on the transmission side with the ¼-wavelength lines 1303+ and 1303− and one filter 1302 which are inexpensive.

FIG. 30(b) shows a further configuration example of the duplexer 3002. The transmitting signals outputted from the transmitting circuit 204 are distributed to an inductor 1333+ and an inductor 1333− via the filter 1302. A capacitor 1334 is connected between the inductor 1333+ and inductor 1333−, but it does not influence the transmitting signals which are the in-phase signals. The transmitting signals outputted from the inductor 1333+ and inductor 1333− are inputted to the antennas 1101+ and 1101− respectively.

The receiving signals received by the antennas and leaked to the output nodes Ptxout+ and Ptxout− are the differential signals. For that reason, they are influenced by the capacitor 1334. To be more specific, the capacitor 1334 can be regarded as the capacitor virtually grounded at the center of the electrodes constituting the capacitor 1334. In that case, it is equivalent to a state in which the capacitor having a capacitance twice larger than that of the capacitor 1334 is connected to each of the output nodes Ptxout+ and Ptxout−, and the capacitors having a capacitance twice larger than that are connected in series. The connection point between the inductor 1333+ and inductor 1333− may also be regarded as a virtual ground point. Here, it should be designed with a resonance frequency of the capacitor having a capacitance twice larger than that of the inductor 1333+ and the capacitor 1334 as the frequency of the receiving signals. Thus, the impedance on the transmitting circuit 204 side viewed from the output node Ptxout+ becomes very high and the receiving signal leak to the transmitting circuit is significantly reduced. Likewise, the receiving signal leak to the transmitting circuit 204 on the output node Ptxout− is also significantly reduced.

It is possible, by having this configuration, to implement the duplexer 3002 comprising the inductors and capacitor, which is inexpensive and small-size.

It is also possible to use the capacitors instead of the inductors 1333+ and 1333− or use the inductor instead of the capacitor 1334.

It is also possible to use the capacitors connected in parallel with the inductors 1333+ and 1333− respectively instead of the capacitor 1334.

As for the above, if the input impedance of the filters 1321+ and 1321− for the differential signals in the frequency band of the receiving signals are even a little higher than the input impedance for the in-phase signals in the frequency band of the transmitting signals, the same effect as above can be obtained in greater or lesser degrees.

As for the duplexer in FIGS. 29, 30(a) and 30(b), in the case of connecting it to the antennas shown in FIG. 18, the configuration in which Ptxout+ and Pxrin+, Ptxout− and Pxrin− are connected respectively should be used.

In the description so far, the in-phase signals include the cases where they are not strictly the in-phase signals but are substantially the in-phase signals. In addition, the differential signals include the cases where they are not strictly the differential signals but are substantially the differential signals. The same effect can be obtained even in such cases.

According to the present invention, it is possible to reduce the deterioration of the reception or transmission on simultaneous transmission and reception, and is available as a radio communication apparatus or radio communication method.

What is claimed is:

1. A radio communication apparatus comprising:
an antenna;
a transmitting apparatus of outputting a transmitting signal as a differential signal;
a duplexer, connected to said antenna and having a balanced input terminal and a single-phase output terminal, of conveying said transmitting signal inputted to said balanced input terminal as a single-phase signal to said antenna and outputting a single-phase receiving signal received by said antenna to said single-phase output terminal; and
a receiving apparatus connected to said single-phase output terminal.

2. The radio communication apparatus according to claim 1, wherein said duplexer has a first phase shifter, a second phase shifter, a third phase shifter, a fourth phase shifter, a fifth phase shifter and a sixth phase shifter;
said antenna is connected to said first phase shifter and said second phase shifter;
said receiving apparatus is connected to said first phase shifter and said second phase shifter via said third phase shifter and said fourth phase shifter respectively;
said transmitting apparatus is connected to said first phase shifter and said second phase shifter via said fifth phase shifter and said sixth phase shifter respectively;
said third phase shifter and said fourth phase shifter are connected to said fifth phase shifter and said sixth phase shifter respectively;
a difference in a phase shifting amount between said first phase shifter and said second phase shifter is substantially −90 degrees;
the difference in the phase shifting amount between said third phase shifter and said fourth phase shifter is substantially 90 degrees;
the difference in the phase shifting amount between said fifth phase shifter and said sixth phase shifter is substantially −90 degrees.

3. A radio communication apparatus comprising:
one and another antennas;
a transmitting apparatus of outputting a transmitting signal as a differential signal;
a duplexer, connected to said one antenna and said another antenna and having a balanced input terminal and a single-phase output terminal, of conveying said transmitting signal inputted to said balanced input terminal to said one antenna and said another antenna and outputting a receiving signal received by said one antenna and said another antenna as a single-phase signal to said single-phase output terminal; and
a receiving apparatus connected to said single-phase output terminal, and wherein said one and another antennas are formed and placed to radiate said transmitting signal substantially as the differential signal and convey said receiving signal substantially as an in-phase signal to said duplexer.

4. The radio communication apparatus according to claim 3, wherein said one and another antennas are formed and placed to convey said receiving signal as the differential signal to said duplexer instead of being formed and placed to convey said receiving signal as an in-phase signal to said duplexer; and
    said duplexer converts said receiving signal inputted as the differential signal into the in-phase signal and outputs it as the single-phase signal to said single-phase output terminal.

5. A radio communication apparatus comprising:
  one and another antennas;
  a transmitting apparatus of outputting a transmitting signal as a differential signal;
  a duplexer, connected to said one antenna and said another antenna and having a balanced input terminal and a balanced output terminal, of conveying said transmitting signal inputted to said balanced input terminal to said one antenna and said another antenna and outputting a receiving signal received by said one antenna and said another antenna as the differential signal to said balanced output terminal, and outputting a part of said transmitting signal substantially as an in-phase signal to said balanced output terminal; and
  a receiving apparatus connected to said balanced output terminal and having a circuit in which a gain of a signal of a differential component is higher than that of a signal of an in-phase component, or a loss of the signal of the differential component is lower than that of the signal of the in-phase component.

6. The radio communication apparatus according to claim 5, wherein said duplexer has a first phase shifter, a second phase shifter, a third phase shifter, a fourth phase shifter, a fifth phase shifter and a sixth phase shifter;
    said one antenna and said another antenna are connected to said first phase shifter and said second phase shifter respectively;
    said receiving apparatus is connected to said first phase shifter and said second phase shifter via said third phase shifter and said fourth phase shifter respectively;
    said transmitting apparatus is connected to said first phase shifter and said second phase shifter via said fifth phase shifter and said sixth phase shifter respectively;
    said third phase shifter and said fourth phase shifter are connected to said fifth phase shifter and said sixth phase shifter respectively;
    a difference in a phase shifting amount between said first phase shifter and said second phase shifter is substantially −90 degrees;
    the difference in the phase shifting amount between said third phase shifter and said fourth phase shifter is substantially 90 degrees; and
    the difference in the phase shifting amount between said fifth phase shifter and said sixth phase shifter is substantially 90 degrees.

7. The radio communication apparatus according to claim 6, wherein said receiving apparatus has an amplifier in which the gain of the signal of the differential component is higher than that of the signal of the in-phase component.

8. The radio communication apparatus according to claim 7, wherein said receiving apparatus has a down mixer of down-converting said receiving signal being connected to a subsequent stage to said amplifier; and
    said down mixer has the gain of the differential signal higher than that of the signal of the in-phase component or the loss of the differential signal lower than that of the signal of the in-phase component.

9. The radio communication apparatus according to claim 8, having:
    a first transistor of having one of the receiving signals as said differential signals inputted to a base side thereof; and
    a second transistor of having the other of the receiving signals as said differential signals inputted to the base side thereof, and wherein:
    an emitter side of said first transistor is connected to an emitter side of said second transistor; and
    a connection point thereof is connected to a ground via a first inductor having a predetermined inductance.

10. The radio communication apparatus according to claim 6, wherein said receiving apparatus has a filter in which the loss of the differential signal is lower than that of the signal of the in-phase component.

11. The radio communication apparatus according to claim 5, wherein said receiving apparatus has an amplifier in which the gain of the signal of the differential component is higher than that of the signal of the in-phase component.

12. The radio communication apparatus according to claim 5, wherein said receiving apparatus has a filter in which the loss of the differential signal is lower than that of the signal of the in-phase component.

13. The radio communication apparatus according to claim 11, wherein said receiving apparatus has a down mixer of down-converting said receiving signal being connected to a subsequent stage to said amplifier; and
    said down mixer has the gain of the differential signal higher than that of the signal of the in-phase component or the loss of the differential signal lower than that of the signal of the in-phase component.

14. The radio communication apparatus according to claim 13, having:
    a first transistor of having one of the receiving signals as said differential signals inputted to a base side thereof; and
    a second transistor of having the other of the receiving signals as said differential signals inputted to the base side thereof, and wherein:
    an emitter side of said first transistor is connected to an emitter side of said second transistor; and
    a connection point thereof is connected to a ground via a first inductor having a predetermined inductance.

* * * * *